(12) United States Patent
Yamamoto

(10) Patent No.: US 12,347,837 B2
(45) Date of Patent: Jul. 1, 2025

(54) BATTERY PACK AND BATTERY SYSTEM

(71) Applicant: KABUSHIKI KAISHA TOSHIBA, Tokyo (JP)

(72) Inventor: Hirofumi Yamamoto, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 976 days.

(21) Appl. No.: 17/443,052

(22) Filed: Jul. 20, 2021

(65) Prior Publication Data

US 2021/0351456 A1 Nov. 11, 2021

Related U.S. Application Data

(63) Continuation of application No. PCT/JP2019/002519, filed on Jan. 25, 2019.

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/647* (2015.04);
(Continued)

(58) Field of Classification Search
CPC ............. H01M 10/613; H01M 10/647; H01M 10/653; H01M 10/6554; H01M 10/6555;
(Continued)

(56) References Cited

U.S. PATENT DOCUMENTS 10,727,549 B2 7/2020 Omura
2012/0028107 A1* 2/2012 Sugita ............... H01M 10/6555
429/156

(Continued)

FOREIGN PATENT DOCUMENTS

EP 2 530 763 A1 12/2012
JP 2002-216726 A 8/2002
(Continued)

OTHER PUBLICATIONS

English translation of KR Publication 101792751, Oct. 2017.*
(Continued)

*Primary Examiner* — Brittany L Raymond
(74) *Attorney, Agent, or Firm* — Maier & Maier, PLLC

(57) ABSTRACT

According to one embodiment, a battery pack includes a battery module, a frame and a sheet member. The battery module includes a plurality of batteries, and includes a module bottom surface. The frame and the sheet member have electrical insulating property, and a frame sidewall of the frame forms a storage space of the battery module. A frame protrusion portion protrudes from the frame sidewall to the inner peripheral side and supports the battery module from a side toward which the module bottom surface faces. The frame forms a through-hole having a protrusion end of the frame protrusion portion as at least a part of an edge. The sheet member is in close contact with the module bottom surface of the battery module.

18 Claims, 34 Drawing Sheets

(51) Int. Cl.
  *H01M 10/647* (2014.01)
  *H01M 10/653* (2014.01)
  *H01M 50/209* (2021.01)
  *H01M 50/24* (2021.01)
  *H01M 50/249* (2021.01)
  *H01M 50/251* (2021.01)

(52) U.S. Cl.
  CPC ....... *H01M 10/653* (2015.04); *H01M 50/209* (2021.01); *H01M 50/24* (2021.01); *H01M 50/249* (2021.01); *H01M 50/251* (2021.01); *H01M 2220/10* (2013.01); *H01M 2220/20* (2013.01)

(58) Field of Classification Search
  CPC ... H01M 50/209; H01M 50/249; H01M 50/24
  See application file for complete search history.

(56) References Cited

U.S. PATENT DOCUMENTS

| | | | |
|---|---|---|---|
| 2013/0004822 | A1 | 1/2013 | Hashimoto et al. |
| 2013/0029121 | A1 | 1/2013 | Hartig |
| 2013/0029192 | A1 | 1/2013 | Oya |
| 2014/0248515 | A1* | 9/2014 | Wayne ................ H01M 10/655 429/82 |
| 2014/0370340 | A1 | 12/2014 | Kimura et al. |
| 2015/0044538 | A1* | 2/2015 | Katayama ......... H01M 10/6554 429/120 |
| 2018/0138559 | A1 | 5/2018 | Omura |
| 2018/0205045 | A1 | 7/2018 | Schröder et al. |

FOREIGN PATENT DOCUMENTS

| | | | |
|---|---|---|---|
| JP | 2008-204990 A | | 9/2008 |
| JP | 2010-192207 A | | 9/2010 |
| JP | 2011-34775 A | | 2/2011 |
| JP | 2012-69337 A | | 4/2012 |
| JP | 2013-12441 A | | 1/2013 |
| JP | 2013-12464 A | | 1/2013 |
| JP | 2013-125617 A | | 6/2013 |
| JP | WO 2013/084937 A1 | | 6/2013 |
| JP | WO 2013/084938 A1 | | 6/2013 |
| JP | 2014-216113 A | | 11/2014 |
| JP | WO 2016/174855 A1 | | 11/2016 |
| JP | 2018-106822 A | | 7/2018 |
| JP | 2018-185923 A | | 11/2018 |
| KR | 101792751 | * | 10/2017 |
| WO | WO 2020/152857 A1 | | 7/2020 |

OTHER PUBLICATIONS

International Search Report issued Apr. 23, 2019 in PCT/JP2019/002519 (with English translation), 7 pages.
Russian Office Action issued Mar. 25, 2022 in Russian Patent Application No. 2021118950/07(039882) (with English language translation), 11 pages.

* cited by examiner

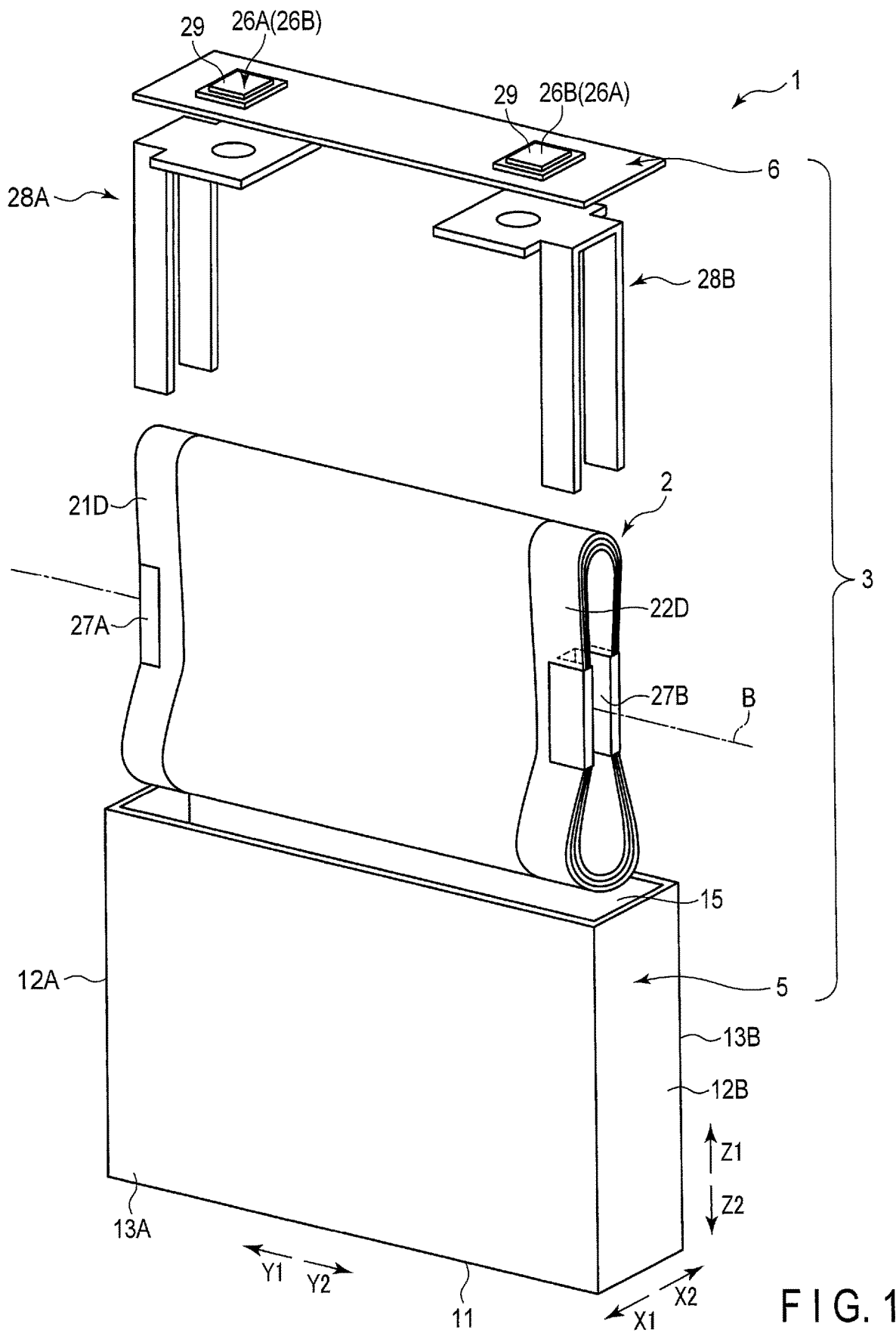
F I G. 1

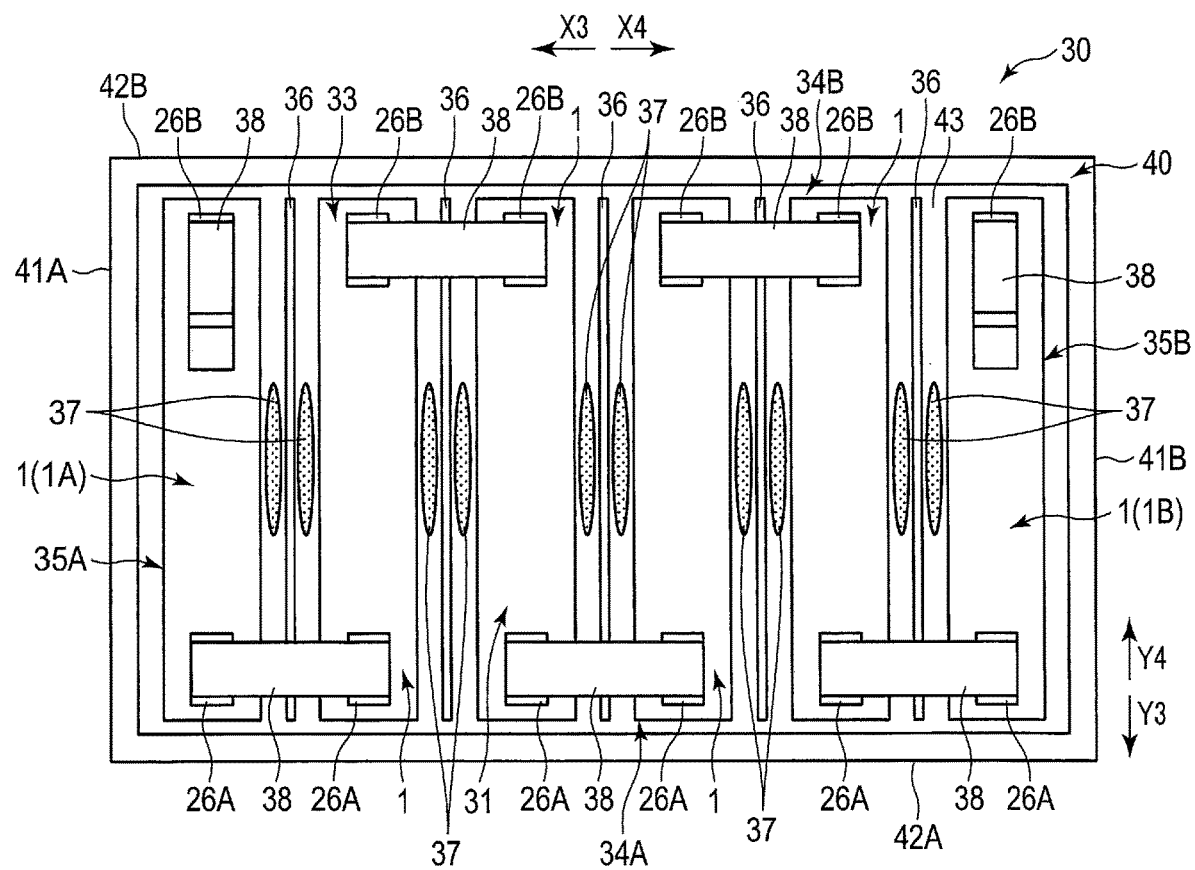
F I G. 4

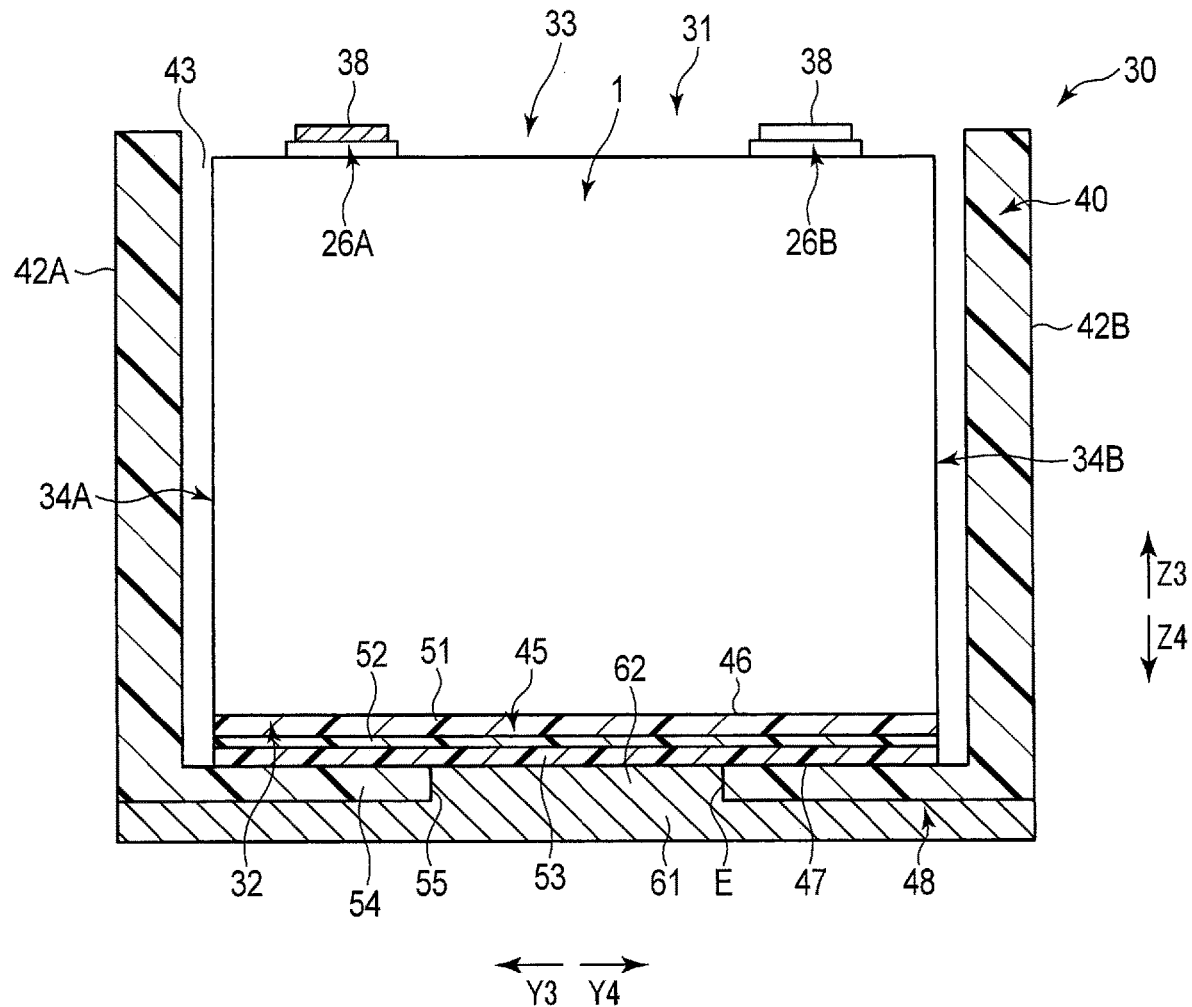
F I G. 11A

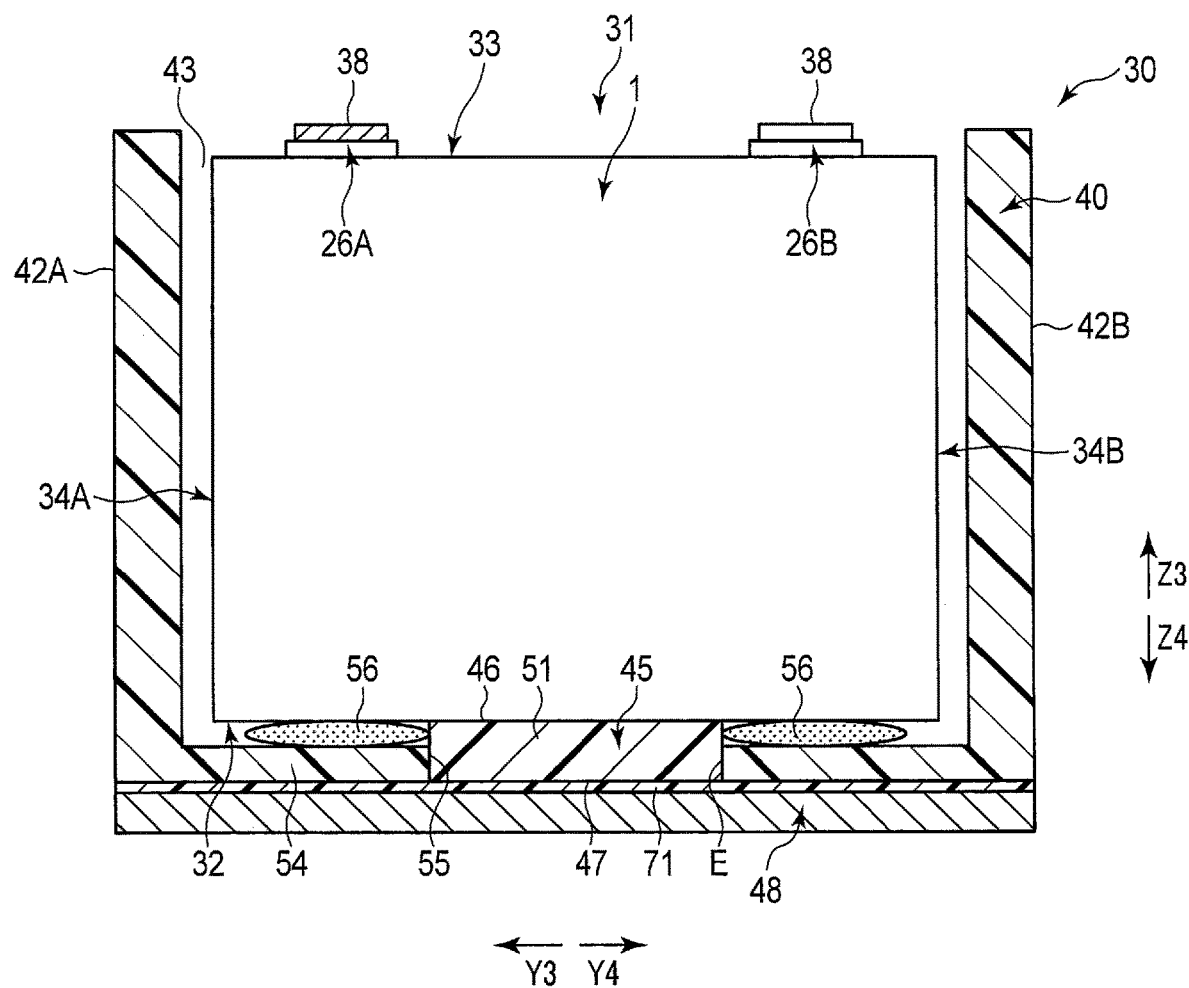
F I G. 13

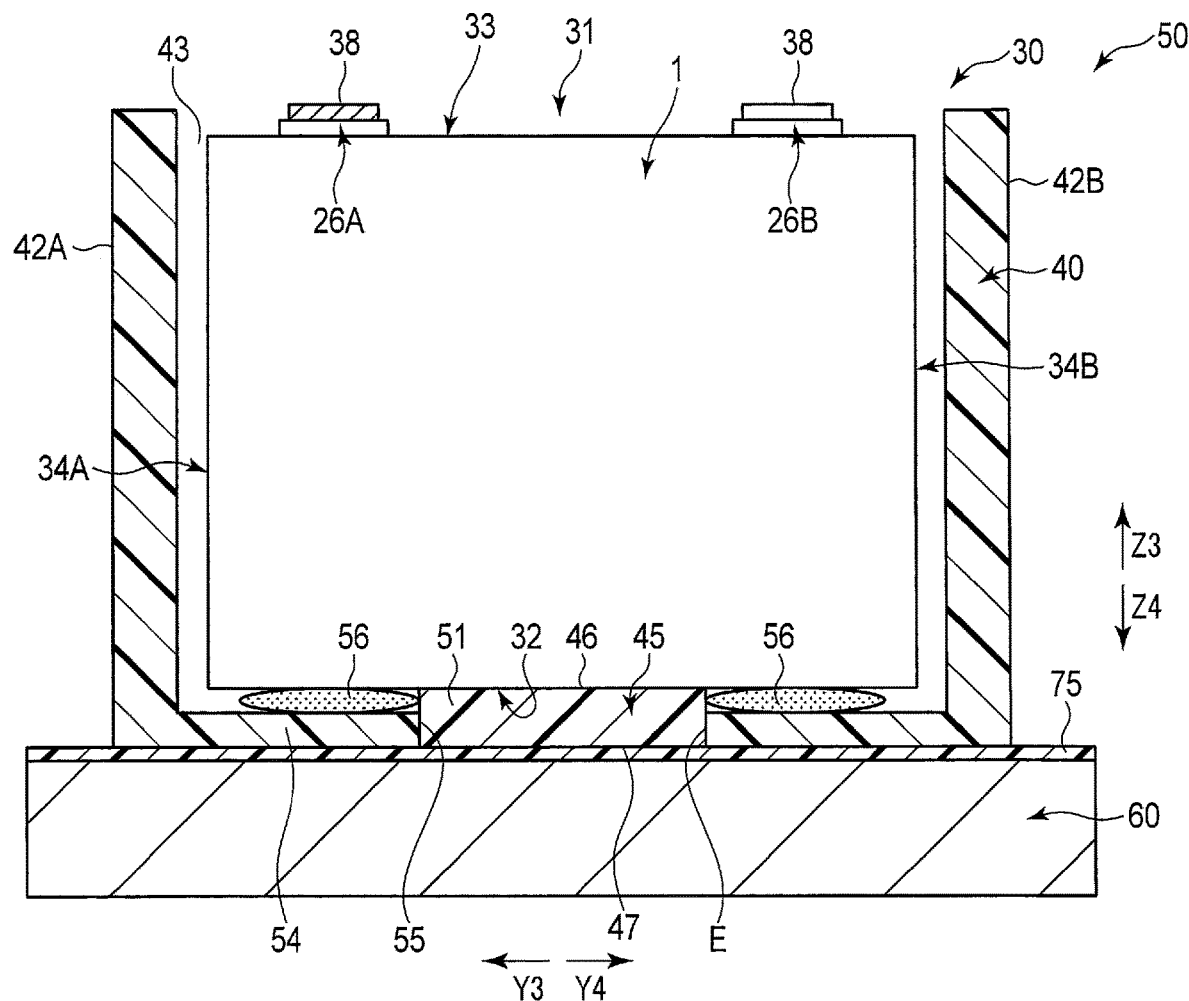
F I G. 16

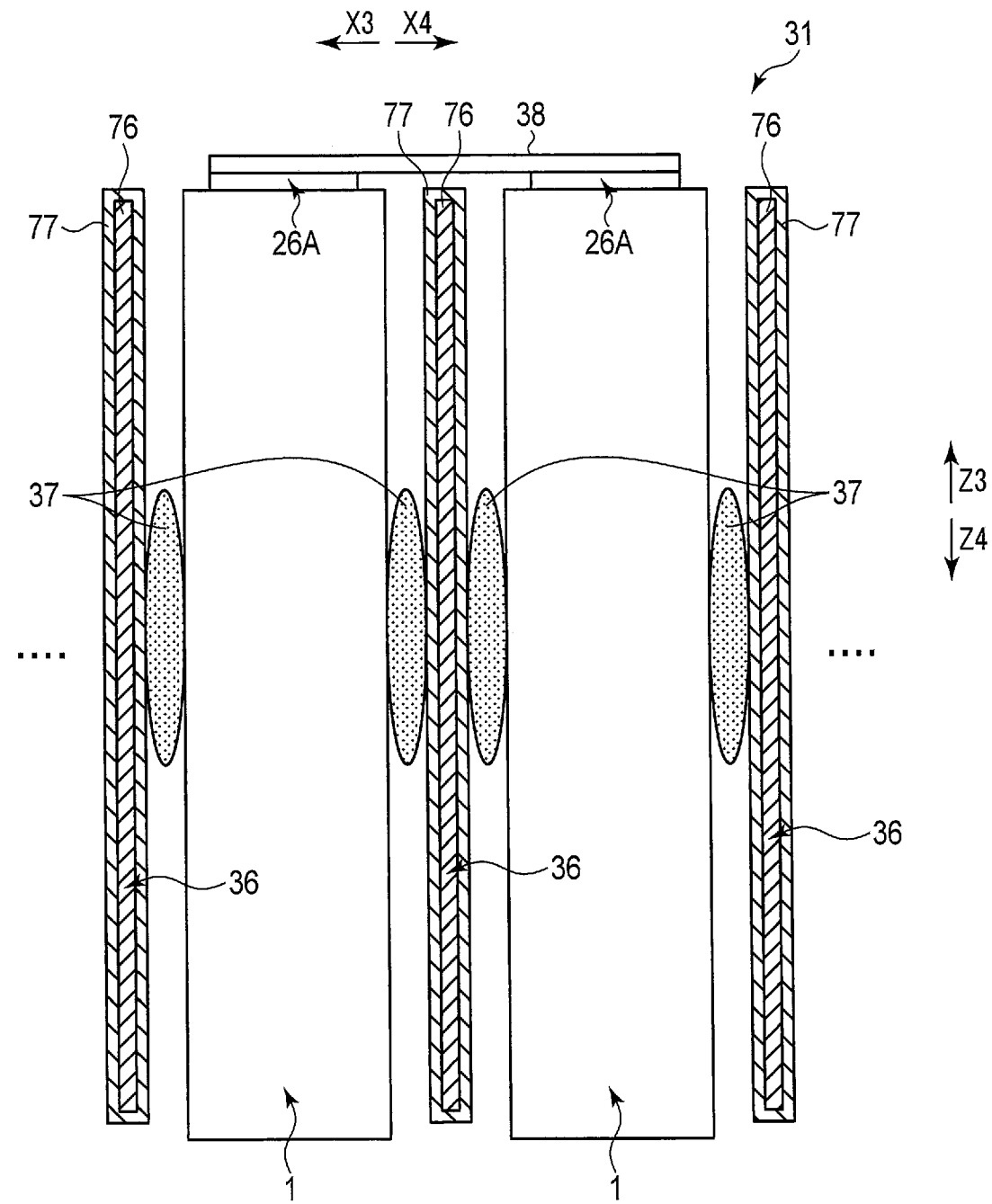
F I G. 20

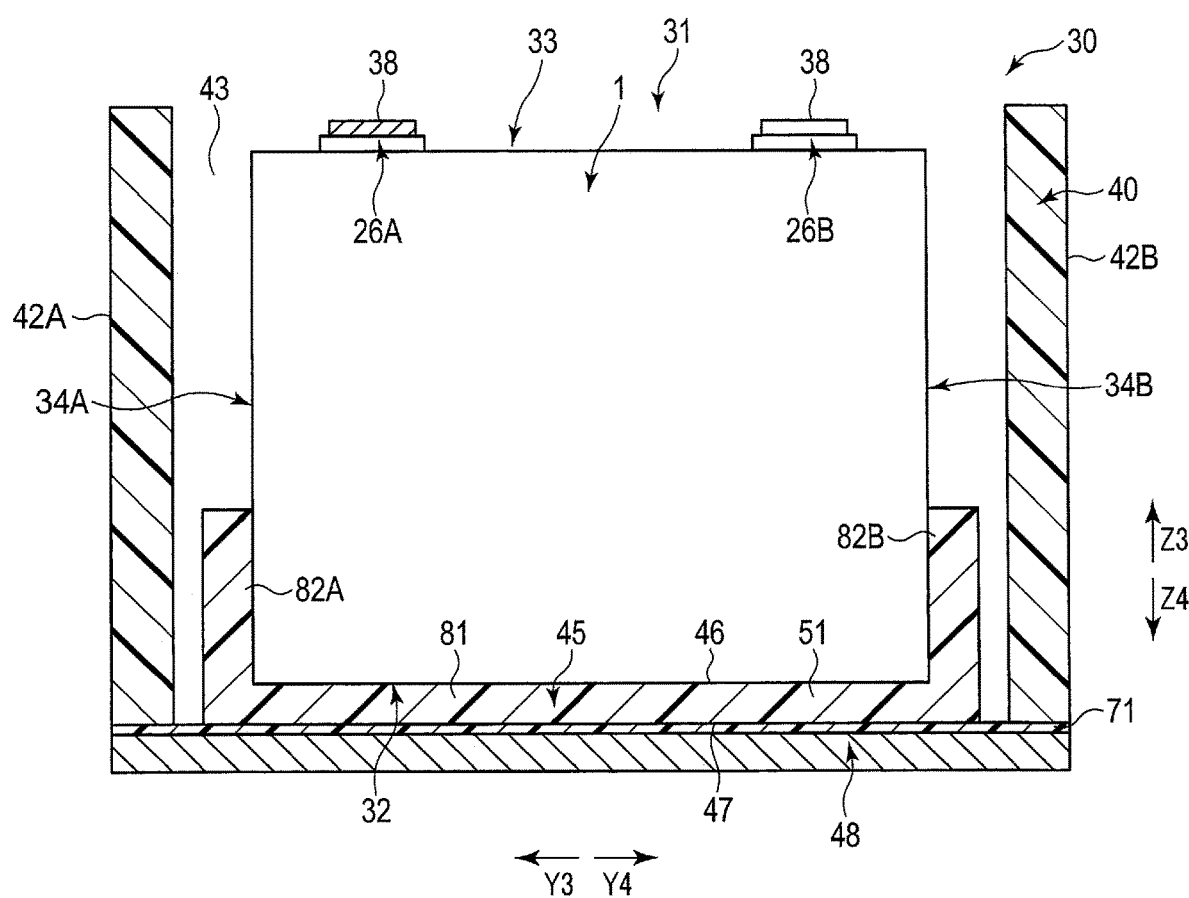
F I G. 24

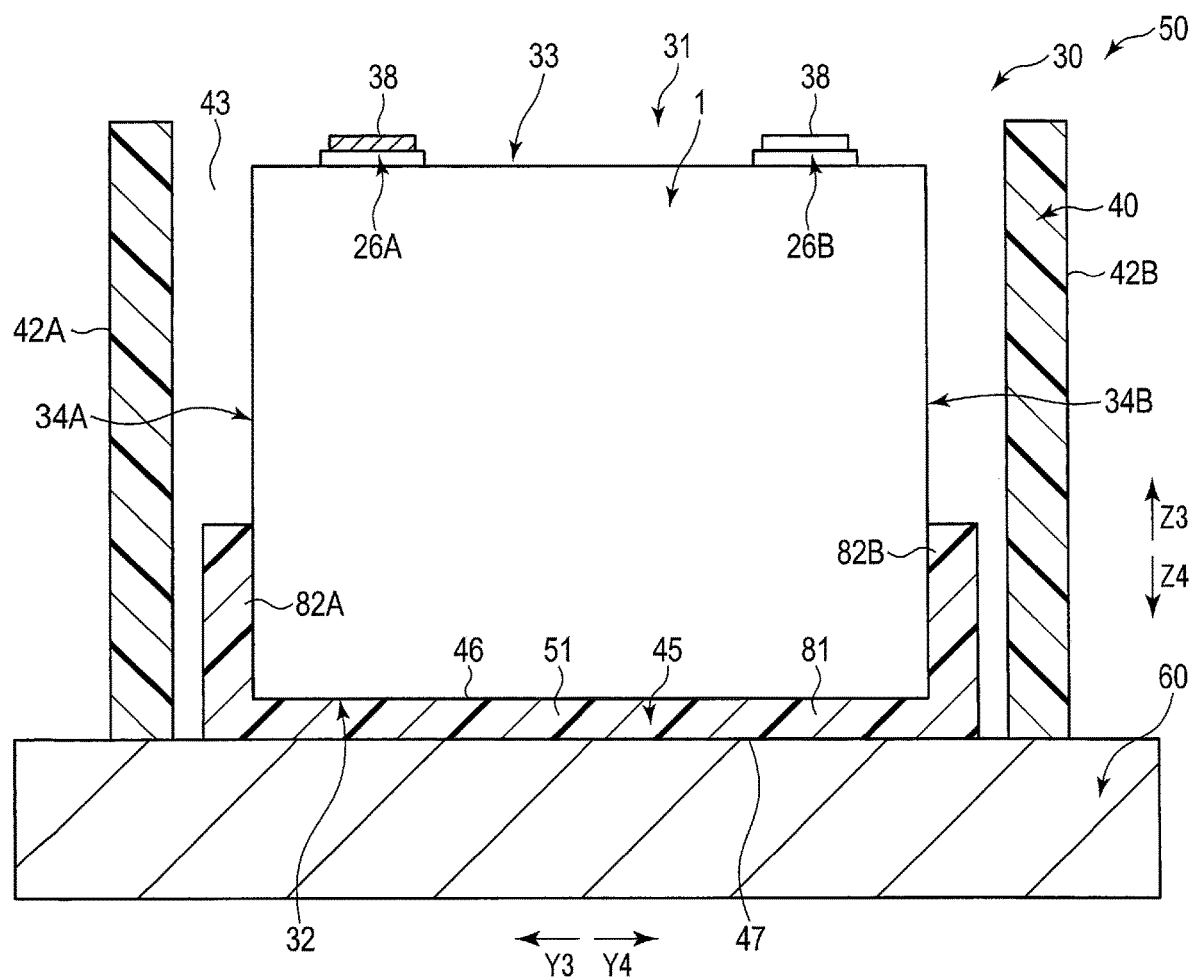
F I G. 25

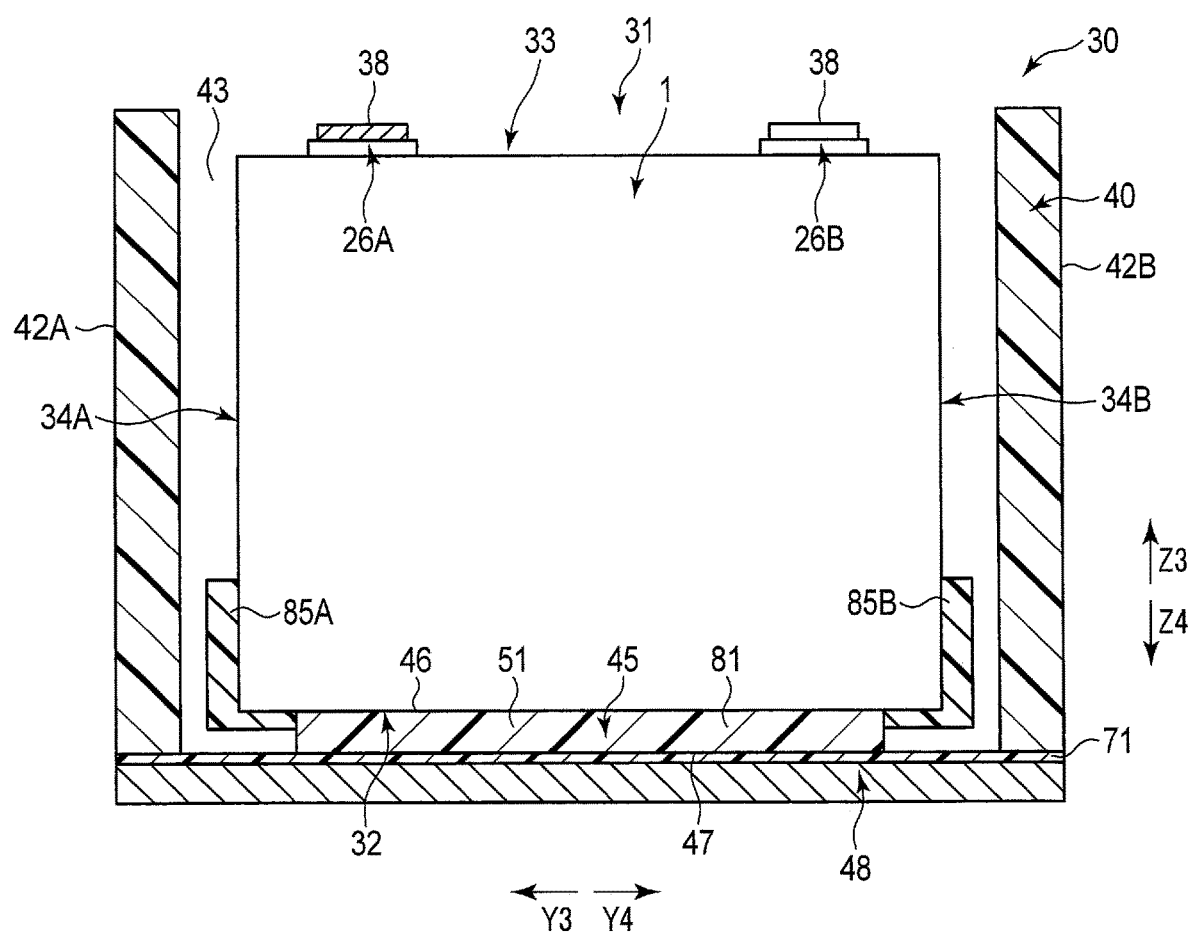
F I G. 27

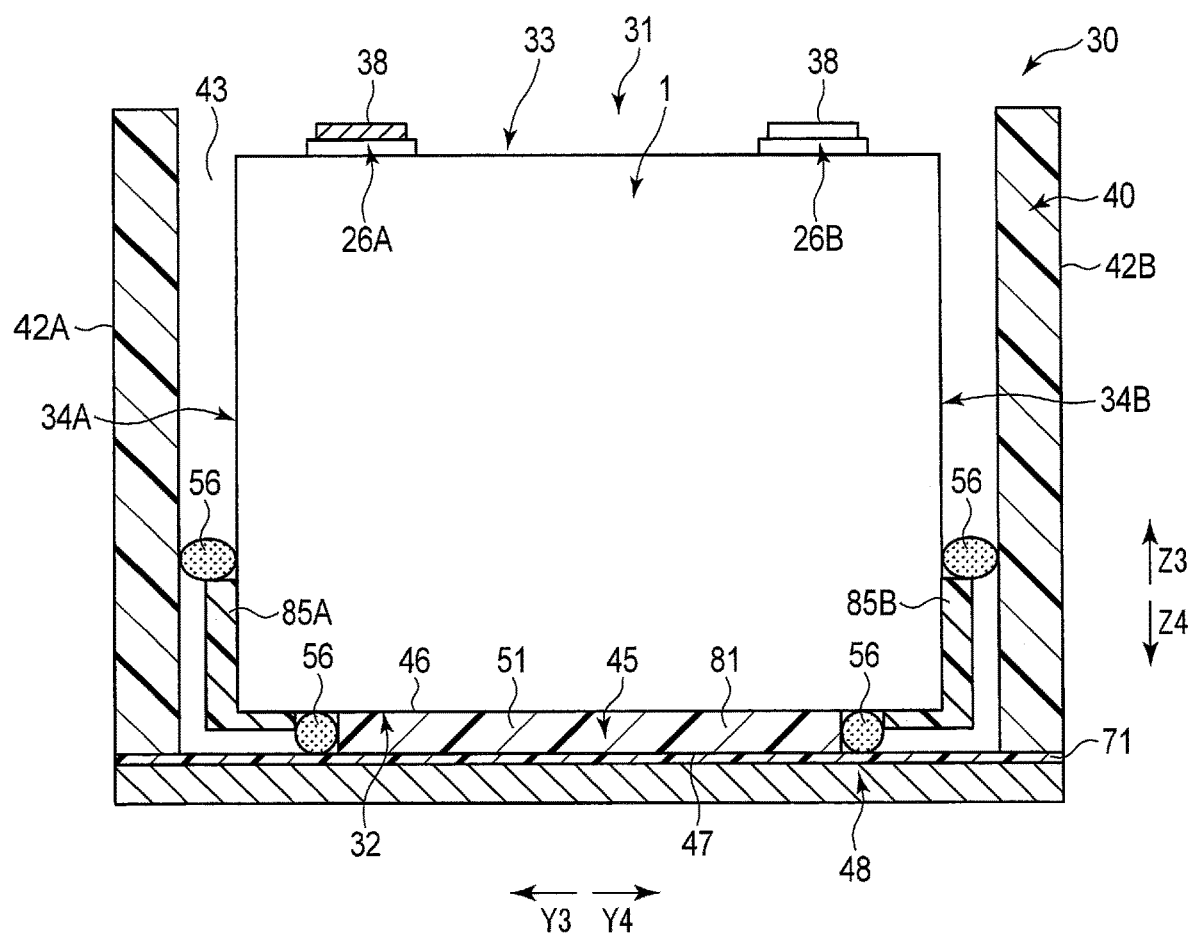
F I G. 28

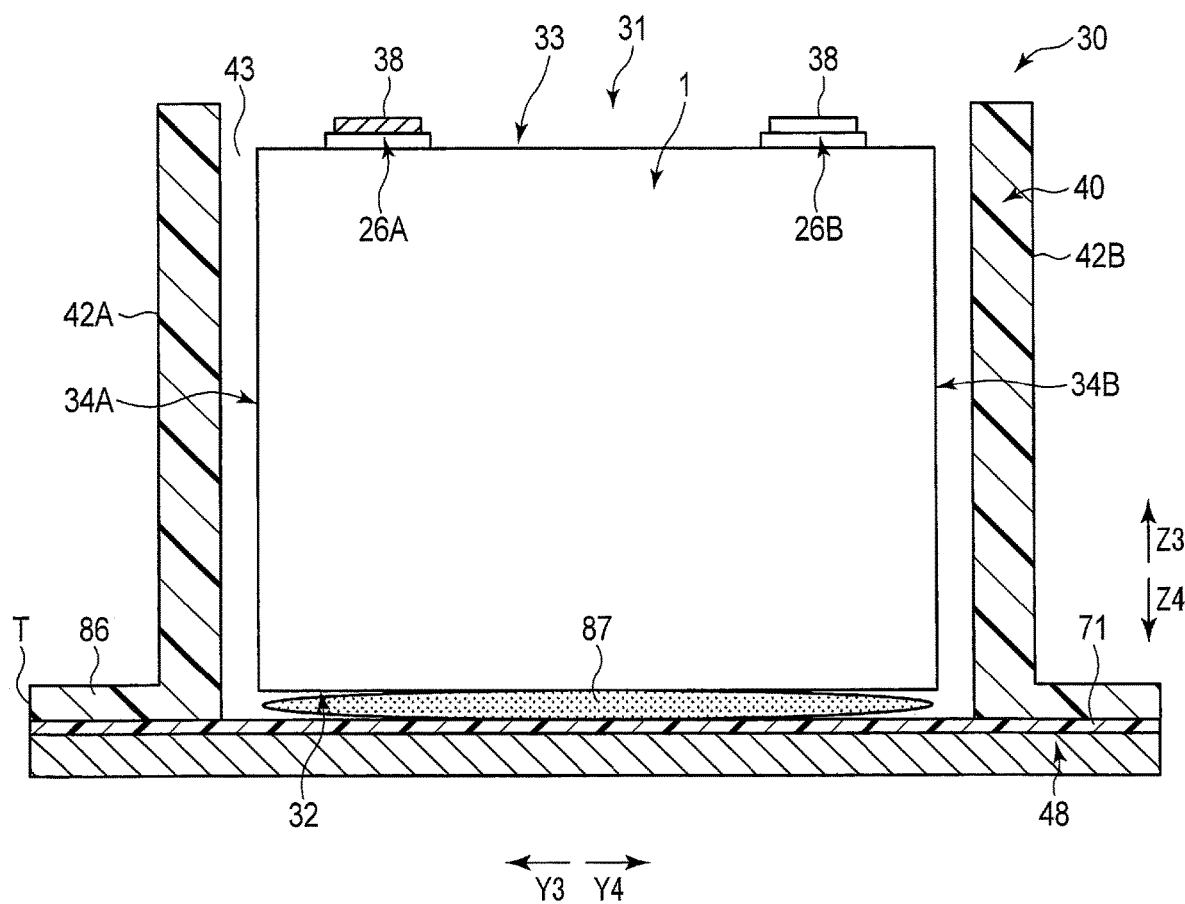
F I G. 29

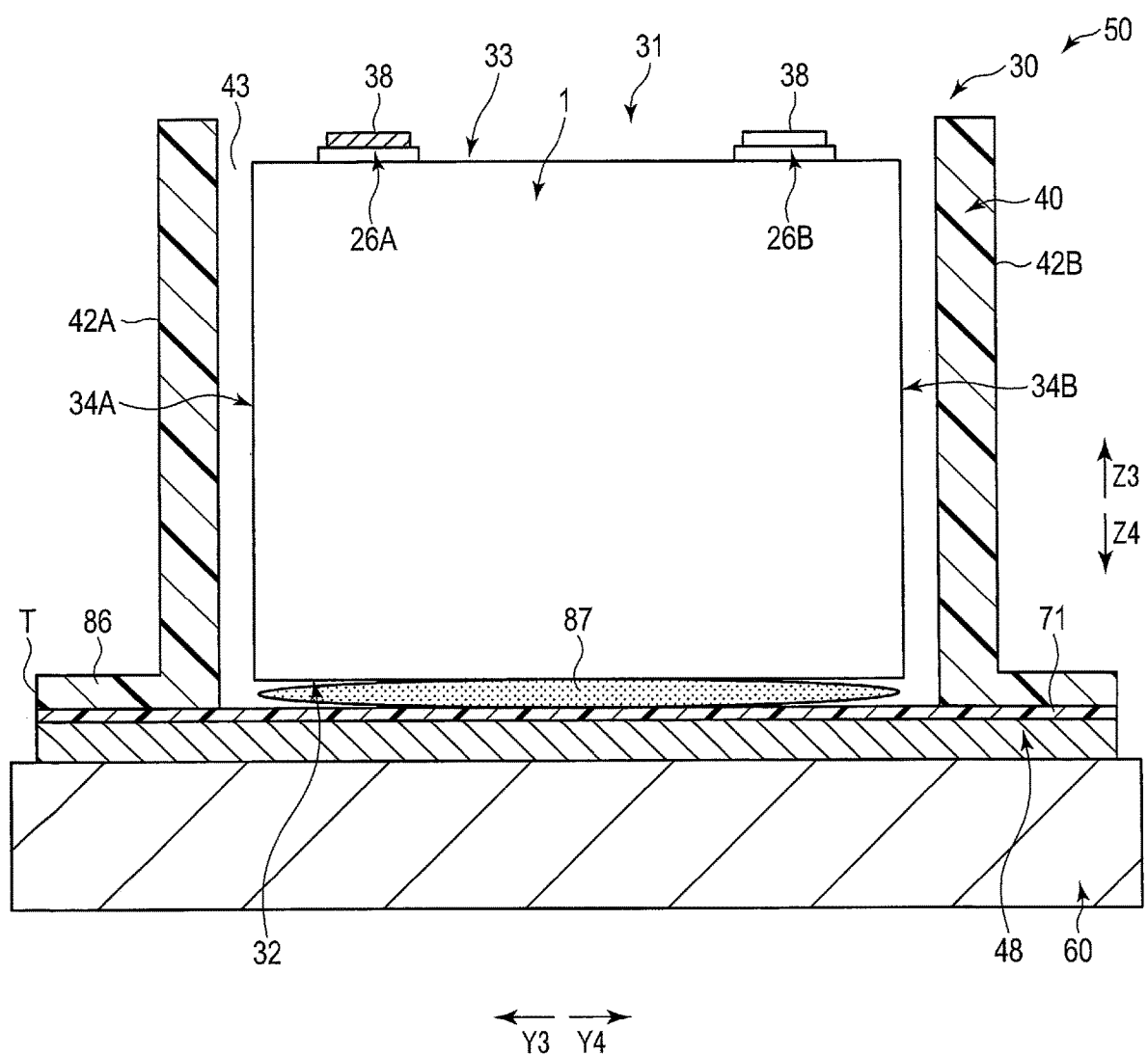
F I G. 30

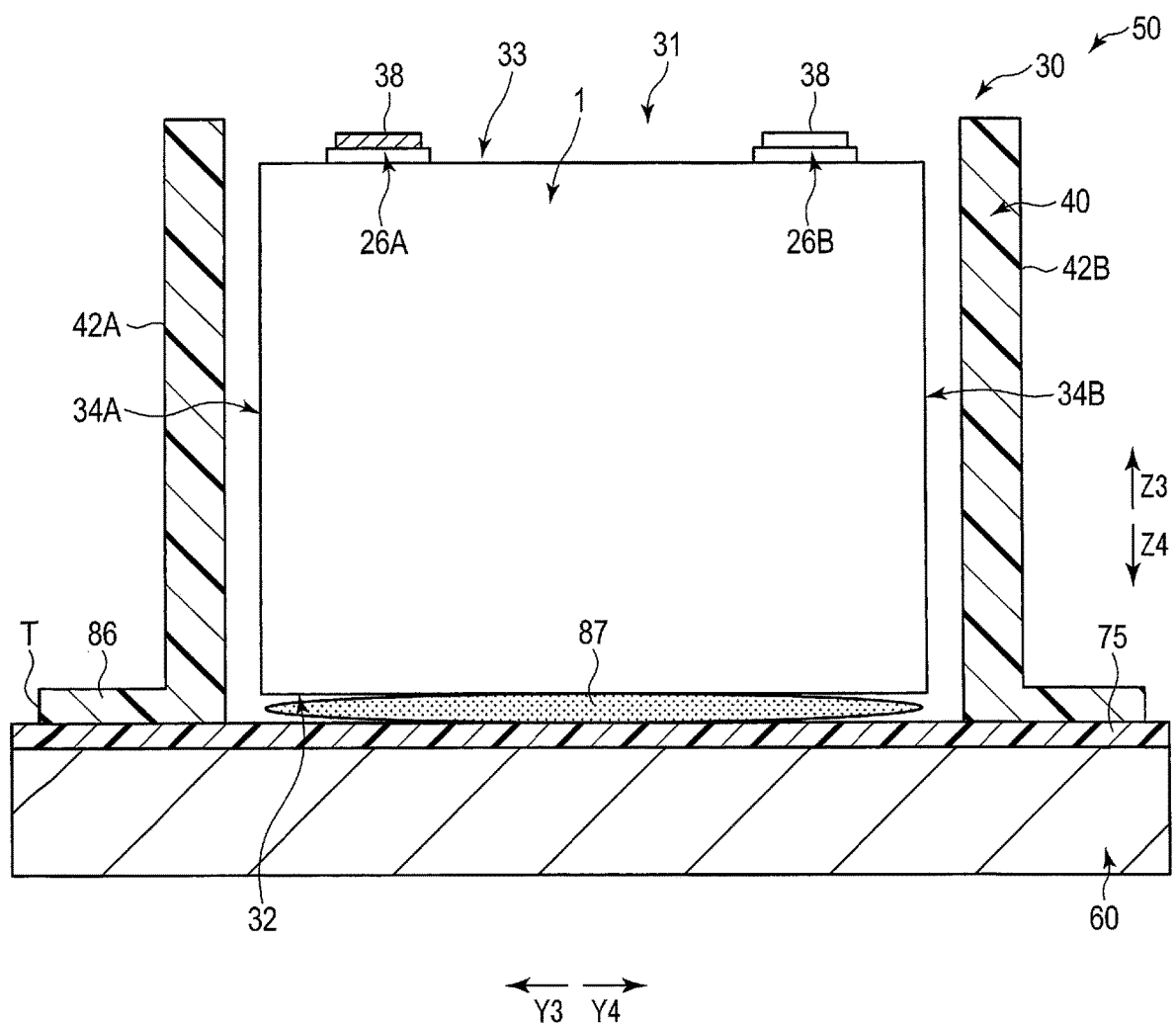
F I G. 31

BATTERY PACK AND BATTERY SYSTEM

CROSS-REFERENCE TO RELATED APPLICATIONS

This is a Continuation Application of PCT Application No. PCT/JP2019/002519, filed Jan. 25, 2019, the entire contents of which are incorporated herein by reference.

FIELD

Embodiments of the present invention relate to a battery pack and a battery system.

BACKGROUND

As a battery pack, there is a battery pack including a battery module in which a plurality of batteries (storage batteries) are arranged. In the battery pack, a frame is formed of a resin having an electrical insulating property, and the battery module is stored in a storage space surrounded by the frame. The battery pack described above is used, for example, as a stationary power supply and a power supply for a railway vehicle. In this case, a large number of battery modules (battery packs) are disposed in a limited space. Then, a battery system (storage battery system) is formed by electrically connecting a large number of battery modules, and in the battery system, at least one of a serial connection structure and a parallel connection structure of the battery modules is formed.

The battery system described above may be used at a high operating voltage. For this reason, in the battery system, it is required to form an insulating structure having high withstand voltage (dielectric strength) by the battery pack, and it is required to form an insulating structure in which dielectric breakdown hardly occurs.

BRIEF DESCRIPTION OF THE DRAWINGS

FIG. 1 is a perspective view schematically illustrating an example of a battery used in a battery pack according to a first embodiment.

FIG. 4 is a schematic view illustrating the battery pack of FIG. 3 as viewed from one side in a height direction.

FIG. 11A is a schematic view illustrating a battery pack according to a third modification of the first embodiment.

FIG. 13 is a schematic view illustrating a battery pack according to a ninth modification of the first embodiment.

FIG. 16 is a schematic view illustrating an example of a battery system to which a battery pack according to a twelfth modification of the first embodiment is applied.

FIG. 20 is a schematic view illustrating a configuration of a battery module of a battery pack according to a fourteenth modification of the first embodiment.

FIG. 24 is a schematic view illustrating a battery pack according to a first modification of the second embodiment.

FIG. 25 is a schematic view illustrating an example of a battery system to which a battery pack according to a second modification of the second embodiment is applied.

FIG. 27 is a schematic view illustrating a battery pack according to a fourth modification of the second embodiment.

FIG. 28 is a schematic view illustrating a battery pack according to a fifth modification of the second embodiment.

FIG. 29 is a schematic view illustrating a battery pack according to a third embodiment.

FIG. 30 is a schematic view illustrating an example of a battery system to which the battery pack according to the third embodiment is applied.

FIG. 31 is a schematic view illustrating an example of a battery system to which a battery pack according to a first modification of the third embodiment is applied.

DETAILED DESCRIPTION

Figure 2:
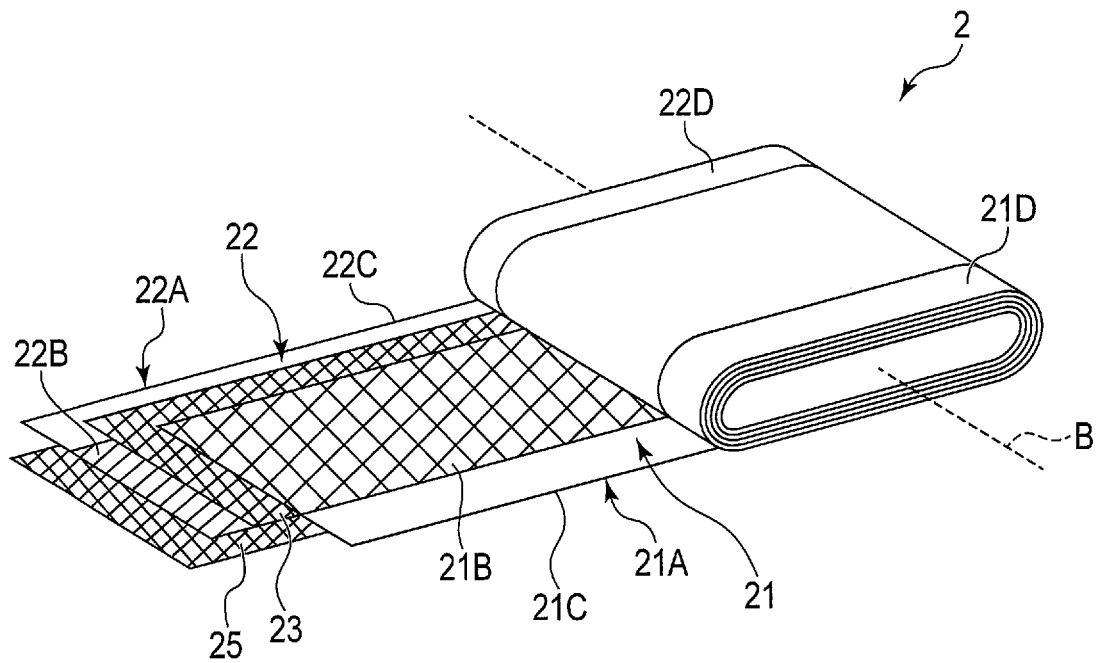
FIG. 2 is a schematic view illustrating an example of an electrode group used in the battery of FIG. 1.

According to one embodiment, a battery pack includes a battery module, a frame and a sheet member. The battery module includes a plurality of arrayed batteries, and includes a module bottom surface facing toward one side in a height direction intersecting an array direction of the plurality of batteries. Each of the plurality of batteries includes an electrode group and a metal exterior container in which the electrode group is stored. The frame has an electrical insulating property. The frame includes a frame sidewall extending along the height direction and forming a storage space of the battery module, and a frame protrusion portion protruding from the frame sidewall to the inner peripheral side of the storage space and supporting the battery module from the side toward which the module bottom surface faces in the height direction. The frame forms a through-hole having a protrusion end of the frame protrusion portion as at least a part of an edge. The sheet member includes a layer having higher thermal conductivity than the frame, and has an electrical insulating property. The layer of the sheet member is in close contact with the module bottom surface of the battery module, and forms at least a part of a transmission path of heat from the battery module to an outside. The transmission path of the heat passes through a solid portion disposed in the through-hole of the frame.

According to one embodiment, a battery system includes the above described battery pack and a cooling plate. The battery pack is installed on an outer surface of the cooling plate, and the cooling plate is provided on a side opposite to a side where the battery module is located with respect to the frame protrusion portion and the sheet member in the height direction. The heat is transmitted from the battery module to the cooling plate through the transmission path.

According to one embodiment, a battery pack includes a battery module, a frame, a sheet member and a close contact portion. The battery module includes a plurality of arrayed batteries. The battery module includes a module bottom surface facing toward one side in a height direction intersecting an array direction of the plurality of batteries, and a module side surface extending from the module bottom surface along the height direction and forming a corner portion with the module bottom surface. Each of the plurality of batteries includes an electrode group and a metal exterior container in which the electrode group is stored. The frame has an electrical insulating property. The frame includes a frame sidewall extending along the height direction, and the frame forms a storage space of the battery module by the frame sidewall. The sheet member includes a high conductive layer having higher thermal conductivity than the frame, and has an electrical insulating property. The high conductive layer is in close contact with the module bottom surface of the battery module. The close contact portion has an electrical insulating property and is formed a separated body from the frame. The close contact portion is in close contact with the corner portion between the module side surface and the module bottom surface and the module side surface in the battery module.

According to one embodiment, a battery system includes the above described battery pack and a cooling plate. The battery pack is installed on an outer surface of the cooling plate, and the cooling plate is provided on a side opposite to a side where the battery module is located with respect to the sheet member in the height direction. The heat is transmitted from the battery module to the cooling plate through the sheet member.

According to one embodiment, a battery pack includes a battery module and a frame. The battery module includes a plurality of arrayed batteries, and the battery module includes a module bottom surface facing toward one side in a height direction intersecting an array direction of the plurality of batteries. Each of the plurality of batteries includes an electrode group and a metal exterior container in which the electrode group is stored. The battery module is installed on a surface of an insulating layer having an electrical insulating property, and the module bottom surface faces toward the side on which the insulating layer is located in the height direction. The frame has an electrical insulating property. The frame includes a frame sidewall extending along the height direction and forming a storage space of the battery module, and a frame protrusion portion protruding from the frame sidewall to a side opposite to a side where the storage space is located. The frame protrusion portion is disposed on the surface of the insulating layer.

According to one embodiment, a battery system includes the above described battery pack and a cooling plate. The battery pack is installed on an outer surface of the cooling plate, and the cooling plate is provided on the side toward which the module bottom surface faces with respect to the battery module in the height direction. The heat is transmitted from the battery module to the cooling plate.

Hereinafter, embodiments will be described with reference to FIGS. 1 to 31.

A battery pack according to an embodiment includes a battery module. In addition, the battery module includes a plurality of batteries. The battery used in the battery module is, for example, a secondary battery such as a nonaqueous electrolyte secondary battery.

First Embodiment (Battery)

First, a battery used in a battery pack according to a first embodiment will be described. FIG. 1 illustrates an example of a battery 1 used in the battery pack. Here, the battery 1 is, for example, a sealed nonaqueous electrolyte secondary battery. The battery 1 includes an electrode group 2 and an exterior container 3 in which the electrode group 2 is stored. The exterior container 3 is formed of a metal such as aluminum, aluminum alloy, iron, or stainless steel. The exterior container 3 includes a container body 5 and a lid 6.

Here, in the battery 1 (exterior container 3), a depth direction (a direction indicated by an arrow X1 and an arrow X2), a lateral direction (a direction indicated by an arrow Y1 and an arrow Y2) intersecting (perpendicular or substantially perpendicular to) the depth direction, and a height direction (a direction indicated by an arrow Z1 and an arrow Z2) intersecting (perpendicular or substantially perpendicular to) both the depth direction and the lateral direction are defined. In the battery 1 (exterior container 3), a dimension in the depth direction is much smaller than each of a dimension in the lateral direction and a dimension in the height direction.

The container body 5 has a bottom wall (container bottom wall) 11 and sidewalls (container sidewalls) 12A, 12B, 13A, and 13B. In the container body 5, an internal cavity in which the electrode group 2 is stored is formed by the bottom wall 11 and the sidewalls 12A, 12B, 13A, and 13B. In addition, the container body 5 is provided with an opening 15 through which the internal cavity is opened. The internal cavity is opened to one side (the upper side) in the height direction of the exterior container 3 in the opening 15. In the exterior container 3, the opening 15 of the internal cavity is closed by the lid 6. Then, the lid 6 is welded to the container body 5 at the opening 15. Therefore, in the exterior container 3, the bottom wall 11 is disposed away from the lid 6 in the height direction with the internal cavity interposed therebetween. In addition, the lid 6 forms a top wall (container top wall) of the exterior container 3. In the exterior container 3, a dimension from an outer surface (bottom surface) of the bottom wall 11 to an outer surface (top surface) of the lid 6 is the same as or substantially the same as a dimension of the exterior container 3 in the height direction.

In the exterior container 3, each of the sidewalls 12A, 12B, 13A, and 13B extends along the height direction from the bottom wall 11 to the lid 6. The sidewalls 12A and 12B are disposed apart from each other in the lateral direction with the internal cavity interposed therebetween, and the sidewalls 13A and 13B are disposed apart from each other in the depth direction with the internal cavity interposed therebetween. In addition, each of the sidewalls 12A and 12B extends along the depth direction from the sidewall 13A to the sidewall 13B, and each of the sidewalls 13A and 13B extends along the lateral direction from the sidewall 12A to the sidewall 12B. In the exterior container 3, a dimension from the outer surface of the sidewall 12A to the outer surface of the sidewall 12B is the same as or substantially the same as a dimension of the exterior container 3 in the lateral direction. In addition, in the exterior container 3, a dimension from the outer surface of the sidewall 13A to the outer surface of the sidewall 13B is the same as or substantially the same as a dimension of the exterior container 3 in the depth direction.

FIG. 2 is a diagram illustrating an example of the electrode group 2. In the example of FIG. 2, the electrode group 2 includes a positive electrode 21, a negative electrode 22, and separators 23 and 25. The positive electrode 21 includes a positive electrode current collecting foil 21A that is a positive electrode current collector, and a positive electrode active material-containing layer 21B supported on a surface of the positive electrode current collecting foil 21A. The positive electrode current collecting foil 21A is an aluminum foil or an aluminum alloy foil and has a thickness of about 10 µm to 20 µm. A slurry including a positive electrode active material, a binder, and an electro-conductive agent is applied to the positive electrode current collecting foil 21A. Examples of the positive electrode active material include, but are not limited to, an oxide, a sulfide, and a polymer capable of occluding and releasing lithium ions. From the viewpoint of obtaining a high positive electrode electric potential, it is preferable to use, as the positive electrode active material, a lithium manganese composite oxide, a lithium nickel composite oxide, a lithium cobalt composite oxide, and lithium iron phosphate.

The negative electrode 22 includes a negative electrode current collecting foil 22A that is a negative electrode current collector and a negative electrode active material-containing layer 22B supported on a surface of the negative electrode current collecting foil 22A. The negative electrode current collecting foil 22A is an aluminum foil, an aluminum alloy foil, a copper foil or the like, and has a thickness of about 10 µm to 20 µm. A slurry including a negative electrode active material, a binder, and an electro-conductive agent is applied to the negative electrode current collecting foil 22A. The negative electrode active material is not particularly limited, and examples thereof include a metal oxide, a metal sulfide, a metal nitride, and a carbon material capable of occluding and releasing lithium ions. The negative electrode active material is preferably a substance having a lithium ion occlusion-and-release electric potential of 0.4 V or more with respect to a metal lithium electric potential, that is, a substance having a lithium ion occlusion-and-release electric potential of 0.4 V (vs. Li$^+$/Li) or more. The alloy reaction of aluminum or an aluminum alloy with lithium is suppressed by using the negative electrode active material having the lithium ion occlusion-and-release electric potential described above, so that aluminum and an aluminum alloy can be used for the negative electrode current collecting foil 22A and a structural member related to the negative electrode 22. Examples of the negative electrode active material having the lithium ion occlusion-and-release electric potential of 0.4 V (vs. Li$^+$/Li) or more include a titanium oxide, a lithium titanium composite oxide such as a lithium titanate, a tungsten oxide, an amorphous tin oxide, a niobium titanium composite oxide, a tin silicon oxide, and a silicon oxide, and it is particularly preferable to use a lithium titanium composite oxide as the negative electrode active material. When a carbon material that occludes and releases lithium ions is used as the negative electrode active material, a copper foil may be used as the negative electrode current collecting foil 22A. The carbon material used as the negative electrode active material has a lithium ion occlusion-and-release electric potential of about 0. V (vs. Li$^+$/Li).

The aluminum alloy used for the positive electrode current collecting foil 21A and the negative electrode current collecting foil 22A preferably includes one or more kinds of elements selected from Mg, Ti, Zn, Mn, Fe, Cu, and Si. The purity of the aluminum and the aluminum alloy can be 98% by weight or more, and is preferably 99.99% by weight or more. Further, pure aluminum having a purity of 100% can be used as a material for the positive electrode current collector and/or the negative electrode current collector. The content of transition metals such as nickel and chrome in the aluminum and the aluminum alloy is preferably 100 ppm by weight or less (including 0 ppm by weight).

In the positive electrode current collecting foil 21A, a positive electrode current collecting tab 21D is formed by one long side edge 21C and its nearby portion. In the present embodiment, the positive electrode current collecting tab 21D is formed over the entire length of the long side edge 21C. In the positive electrode current collecting tab 21D, the positive electrode active material containing layer 21B is not supported on the surface of the positive electrode current collecting foil 21A. Further, in the negative electrode current collecting foil 22A, a negative electrode current collecting tab 22D is formed by one long side edge 22C and its nearby portion. In the present embodiment, the negative electrode current collecting tab 22D is formed over the entire length of the long side edge 22C. In the negative electrode current collecting tab 22D, the negative electrode active material-containing layer 22B is not supported on the surface of the negative electrode current collecting foil 22A.

Each of the separators 23 and 25 is formed of material having an electrical insulating property, and electrically insulates the positive electrode 21 and the negative electrode 22 from each other. Each of the separators 23 and 25 may be a sheet or the like separated from the positive electrode 21 and the negative electrode 22, or may be formed integrally with one of the positive electrode 21 and the negative electrode 22. Further, the separators 23 and 25 may be formed of an organic material, an inorganic material, or a mixture of an organic material and an inorganic material. Examples of the organic material forming the separators 23 and 25 include engineering plastics and super engineering plastics. Further, examples of the engineering plastics include polyamide, polyacetal, polybutylene terephthalate, polyethylene terephthalate, syndiotactic polystyrene, polycarbonate, polyamideimide, polyvinyl alcohol, polyvinylidene fluoride, and modified polyphenylene ether. Further, examples of the super engineering plastics include polyphenylene sulfide, polyether ether ketone, liquid crystal polymer, polyvinylidene fluoride, polytetrafluoroethylene (PTFE), polyether nitrile, polysulfone, polyacrylate, polyether imide, and thermoplastic polyimide. Further, examples of the inorganic material forming the separators 23 and 25 include oxides (for example, aluminum oxide, silicon dioxide, magnesium oxide, phosphorus oxide, calcium oxide, iron oxide, and titanium oxide) nitrides (for example, boron nitride, aluminum nitride, silicon nitride, and barium nitride), and the like.

In the electrode group 2, in a state where each of the separators 23 and 25 is sandwiched between the positive electrode active material-containing layer 21B and the negative electrode active material-containing layer 22B, the positive electrode 21, the negative electrode 22, and the separators 23 and 25 are wound in a flat shape about a geometric (virtual) winding axis B. At this time, for example, the positive electrode 21, the separator 23, the negative electrode 22, and the separator 25 are wound in a state of being stacked in this order. Further, in the electrode group 2, the positive electrode current collecting tab 21D of the positive electrode current collecting foil 21A protrudes to one side in a direction along the winding axis B with respect to the negative electrode 22 and the separators 23 and 25. The negative electrode current collecting tab 22D of the negative electrode current collecting foil 22A protrudes to the side opposite to the side where the positive electrode current collecting tab 21D protrudes in the direction along the winding axis B with respect to the positive electrode 21 and the separators 23 and 25.

The electrode group 2 is disposed in the internal cavity of the exterior container 3 with the winding axis B extending along the lateral direction of the battery 1 (exterior container 3). Therefore, in the electrode group 2 disposed in the internal cavity of the exterior container 3, the positive electrode current collecting tab 21D protrudes to one side in the lateral direction of the battery 1 with respect to the negative electrode 22. In addition, in the electrode group 2, the negative electrode current collecting tab 22D protrudes with respect to the positive electrode 21 to the side opposite to the side where the positive electrode current collecting tab 21D protrudes in the lateral direction of the battery 1. Further, in the internal cavity of the exterior container 3, the positive electrode current collecting tab 21D is disposed at an end on one side in the lateral direction of the battery 1. In addition, in the internal cavity of the exterior container 3, the negative electrode current collecting tab 22D is disposed at an end on the side opposite to the side where the positive electrode current collecting tab 21D is located in the lateral direction of the battery 1.

The electrode group does not need to have a wound structure in which the positive electrode, the negative electrode, and the separator are wound. In an example, the electrode group has a stack structure in which a plurality of positive electrodes and a plurality of negative electrodes are alternately stacked, and a separator is provided between the positive electrode and the negative electrode. Even in this case, in the electrode group, the positive electrode current collecting tab protrudes to one side in the lateral direction of the battery 1 with respect to the negative electrode. In the electrode group, the negative electrode current collecting tab protrudes with respect to the positive electrode to the side opposite to the side where the positive electrode current collecting tab protrudes in the lateral direction of the battery 1.

Further, in an example, the electrode group 2 is impregnated with an electrolytic solution (not illustrated) in the internal cavity of the exterior container 3. As the electrolytic solution, a nonaqueous electrolytic solution is used, and for example, a nonaqueous electrolytic solution prepared by dissolving an electrolyte in an organic solvent is used. In this case, examples of the electrolyte to be dissolved in the organic solvent include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$), and lithium bistrifluoromethylsulfonylimide [$LiN(CF_3SO_2)_2$] and mixtures thereof. Further, examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoxyethane (DEE); γ-butyrolactone (GBL), acetonitryl (AN), and sulfolane (SL). These organic solvents are used alone or as a mixed solvent.

Further, in an example, as the nonaqueous electrolyte, a gel nonaqueous electrolyte to be a composite of a nonaqueous electrolytic solution and a polymer material is used instead of the electrolytic solution. In this case, the above-described electrolyte and organic solvent are used. Examples of the polymer material include polyvinylidene fluoride (PVdF), polyacrylonitrile (PAN), and polyethylene oxide (PEO).

Further, in an example, instead of the electrolytic solution, a solid electrolyte such as a polymer solid electrolyte and an inorganic solid electrolyte is provided as a nonaqueous electrolyte. In this case, the separator may not be provided in the electrode group 2. In the electrode group 2, instead of the separator, the solid electrolyte is sandwiched between the positive electrode and the negative electrode. Therefore, in the present example, the positive electrode and the negative electrode are electrically insulated from each other by the solid electrolyte.

In the battery 1, a pair of electrode terminals 26A and 26B are attached to the outer surface (top surface) of the lid 6 of the exterior container 3. The electrode terminals 26A and 26B are formed of a conductive material such as a metal. One of the electrode terminals 26A and 26B is a positive electrode terminal and the other of the electrode terminals 26A and 26B is a negative electrode terminal. Therefore, the electrode terminals 26A and 26B have opposite electrical polarities to each other. Each of the electrode terminals 26A and 26B is electrically insulated from the exterior container 3 including the lid 6 by an insulating member (not illustrated).

The positive electrode current collecting tab 21D of the electrode group 2 is electrically connected to the positive electrode terminal (corresponding one of the electrode terminals 26A and 26B) via a positive electrode backup lead 27A, a positive electrode lead 28A or the like. Further, the negative electrode current collecting tab 22D of the electrode group 2 is electrically connected to the negative electrode terminal (corresponding one of the electrode terminals 26A and 26B) via a negative electrode backup lead 27B, a negative electrode lead 28B or the like. Each of the backup leads 27A and 27B and the leads 28A and 28B is formed of a conductive material such as a metal. In the inner cavity of the exterior container 3, each of the current collecting tabs 21D and 22D, the backup leads 27A and 27B, and the leads 28A and 28B is electrically insulated from the exterior container 3 (the container body 5 and the lid 6) by an insulating member (not illustrated). Each of the electrode terminals 26A and 26B includes a contact surface 29. In the example of FIG. 1, the contact surface 29 of each of the electrode terminals 26A and 26B faces the side (upper side) toward which the outer surface of the lid 6 faces in the height direction.

Further, in an example, a gas release valve and a liquid injection port (both not illustrated) may be formed in the lid 6. When the liquid injection port is formed in the lid 6, a sealing plate (not illustrated) for closing the liquid injection port is welded to the outer surface of the lid 6.

(Battery Pack and Battery System)

FIGS. 3 to 6 illustrate a battery pack 30. As illustrated in FIGS. 3 to 6, the battery pack 30 includes a battery module 31. The battery module 31 includes the plurality of batteries 1 described above, and in an example of FIGS. 3 to 6, the battery module 31 includes six batteries 1. In the battery module 31, the plurality of batteries 1 are arrayed along an array direction (direction indicated by an arrow X3 and an arrow X4).

Figure 3:
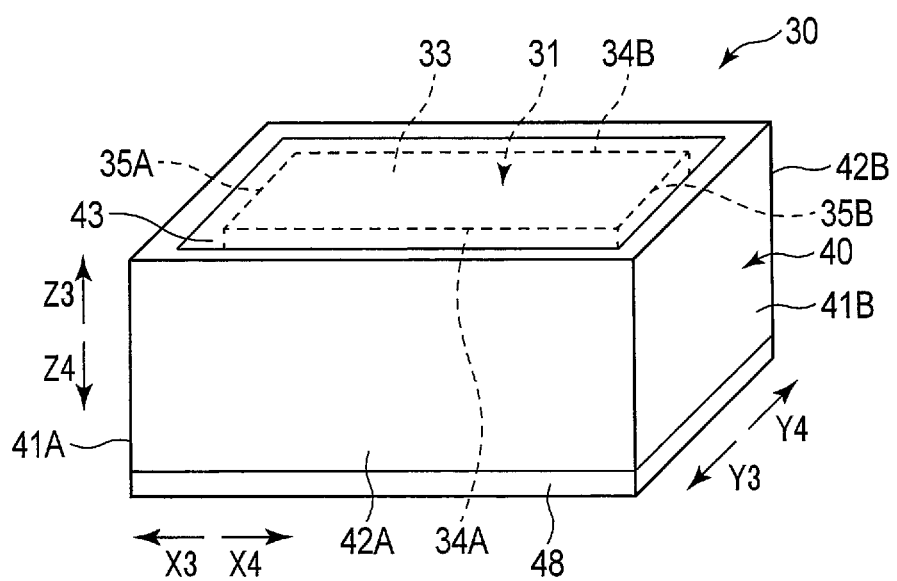
FIG. 3 is a schematic view illustrating the battery pack according to the first embodiment.
Figure 5:
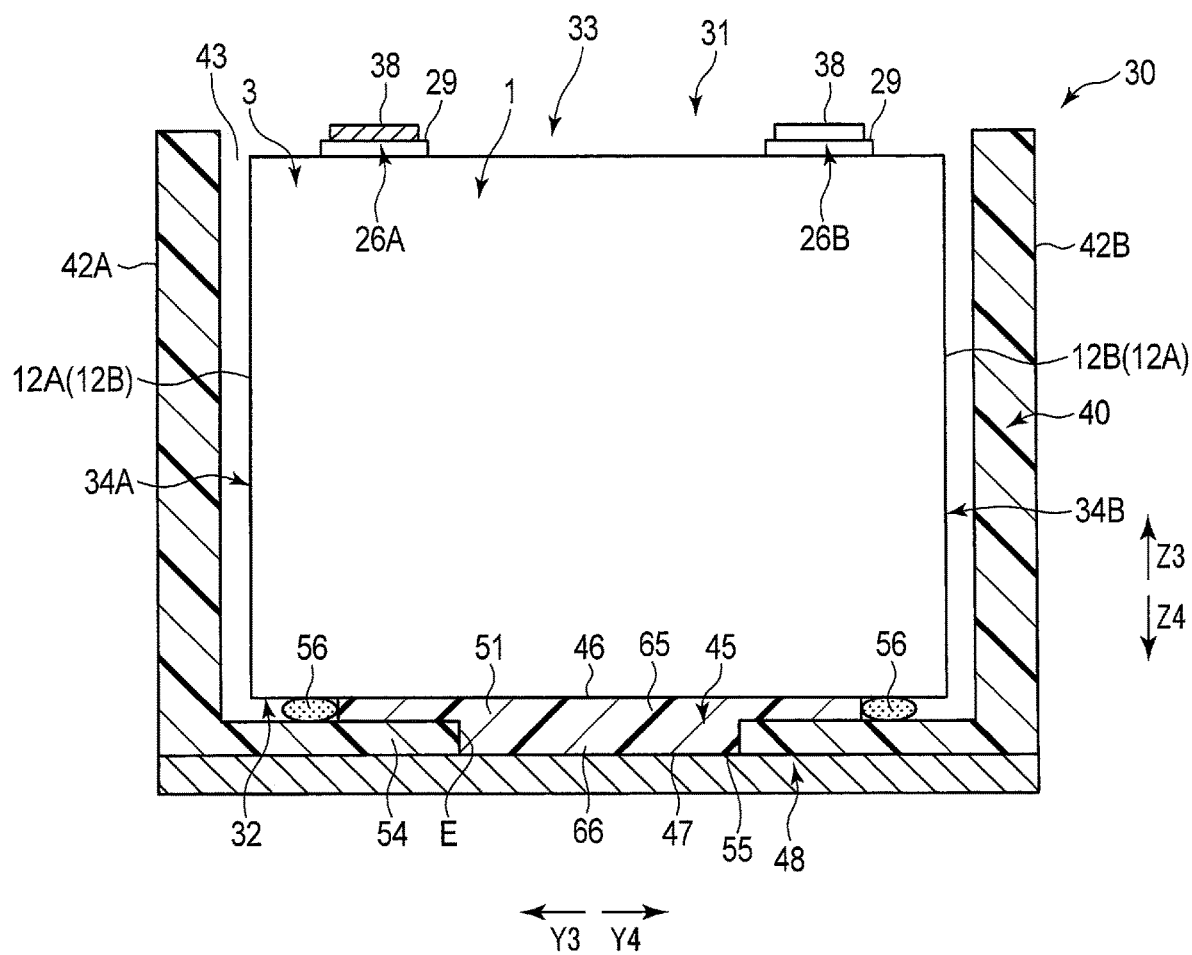
FIG. 5 is a cross-sectional view schematically illustrating the battery pack of FIG. 3 in a cross section perpendicular or substantially perpendicular to an array direction of batteries.
Figure 6:
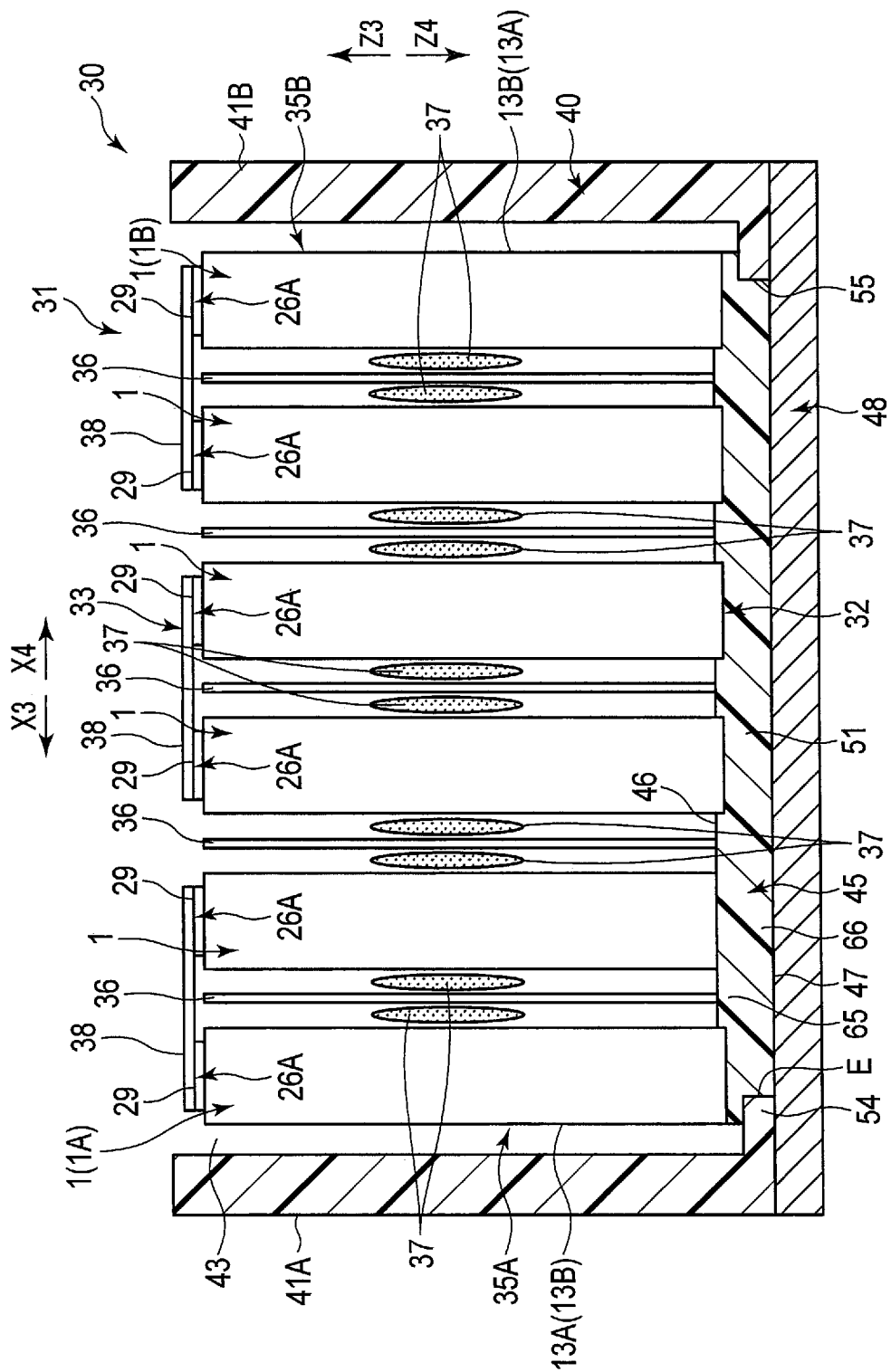
FIG. 6 is a cross-sectional view schematically illustrating the battery pack of FIG. 3 in a cross section perpendicular or substantially perpendicular to a width direction.

Here, in the battery pack 30 and the battery module 31, the array direction of the batteries is matched or substantially matched with the depth direction. Further, in the battery pack 30 and the battery module 31, a height direction (direction indicated by an arrow Z3 and an arrow Z4) that intersects (is perpendicular or substantially perpendicular to) the array direction of the batteries 1 in the battery module 31 is defined. In the battery module 31 (battery pack 30), a width direction (direction indicated by an arrow Y3 and an arrow Y4) that intersects (is perpendicular or substantially perpendicular to) both the height direction and the array direction of the batteries 1 is defined. FIG. 3 is a perspective view schematically illustrating the battery pack 30, and FIG. 4 schematically illustrates the battery pack 30 as viewed from one side (the side of the arrow Z3) in the height direction. FIG. 5 schematically illustrates the battery pack 30 in a cross section perpendicular or substantially perpendicular to the array direction of the batteries 1, and FIG. 6 schematically illustrates the battery pack 30 in a cross section perpendicular or substantially perpendicular to the width direction.

In the battery module 31 in an example of FIGS. 3 to 6, the depth direction of each of the batteries 1 is matched or substantially matched with the array direction of the batteries 1, and the lateral direction of each of the batteries 1 is matched or substantially matched with the width direction of the battery module 31 (battery pack 30). In the battery module 31, the height direction of each of the batteries 1 is matched or substantially matched with the height direction of the battery module 31 (battery pack 30). In the battery module 31, the plurality of batteries 1 are arrayed without being shifted from each other or with almost no shift from each other in the width direction of the battery module 31 (the lateral direction of each of the batteries 1).

The battery module 31 includes a module bottom surface facing toward one side (lower side) in the height direction, and a module top surface 33 facing the side (upper side) opposite to the side toward which the module bottom surface 32 faces in the height direction. In each of the plurality of batteries 1 (all the batteries 1), the bottom wall 11 of the exterior container 3 is located on the side where the module bottom surface 32 is located with respect to the electrode group 2 in the height direction. The outer surfaces (bottom surfaces) of the bottom walls 11 of the plurality of batteries 1 form a part of the module bottom surface 32. In each of the plurality of batteries 1 (all the batteries 1), the lid 6 of the exterior container 3 and the electrode terminals 26A and 26B are located on the side where the module top surface 33 is located with respect to the electrode group 2 in the height direction. The outer surfaces (top surfaces) of the lids 6 of the plurality of batteries 1 and the electrode terminals 26A and 26B form a part of the module top surface 33.

In the battery module 31, module side surfaces 34A, 34B, 35A, and 35B extend along the height direction from the module bottom surface 32 to the module top surface 33. Therefore, the module side surfaces 34A, 34B, 35A, and 35B extend from the module bottom surface 32 to the side opposite to the side toward which the module bottom surface 32 faces in the height direction of the battery pack 30_ Each of the module side surfaces 34A, 34B, 35A, and 35B forms a corner portion with the module bottom surface 32. Each of the module side surfaces 34A, 34B, 35A, and 35B forms a corner portion with the module top surface 33.

The module side surfaces 34A and 34B face outward in the width direction of the battery module 31 and are disposed apart from each other in the width direction of the battery module 31 (battery pack 30). Each of the module side surfaces 34A and 34B extends from the module side surface 35A to the module side surface 35B along the array direction of the batteries 1 (the depth direction of the battery module 31). The module side surfaces 35A and 35B face outward in the depth direction of the battery module and are disposed apart from each other in the depth direction of the battery module 31 (battery pack 30). Each of the module side surfaces 35A and 35B extends along the width direction of the battery module 31 from the module side surface 34A to the module side surface 34B.

In each of the plurality of batteries 1, an outer surface of one of the sidewalls 12A and 12B forms a part of the module side surface 34A. In each of the plurality of batteries 1, an outer surface of the other of the sidewalls 12A and 12B forms a part of the module side surface 34B. Among the plurality of batteries 1 forming the battery module 31, two batteries 1A and 1B arrayed on the outermost side in the array direction of the batteries 1 are defined. The battery 1A is disposed at one end of the battery module in the array direction of the batteries 1, and the battery 1B is disposed at the other end of the battery module 31 in the array direction of the batteries 1. In the battery module 31, an outer surface of one of the sidewalls 13A and 13B of the battery 1A forms the module side surface 35A, and an outer surface of one of the sidewalls 13A and 13B of the battery 1B forms the module side surface 35B.

In the battery module 31, a partition plate (separator) 36 is provided between the batteries 1 adjacent to each other in the array direction. One or more partition plates 36 are provided, and in an example of FIGS. 3 to 6, five partition plates 36 are provided. Each of the partition plates 36 forms a part of the module bottom surface 32 and forms a part of the module top surface 33. In addition, each of the partition plates 36 forms a part of the module side surface 34A and forms a part of the module side surface 34B.

The partition plate 36 is formed of a material having an electrical insulating property. The partition plate 36 is formed of, for example, a resin having an electrical insulating property, and includes at least one of polyphenylene ether (PPE), polycarbonate (PC), and polybutylene terephthalate (PBT). In addition, the thermal conductivity of the partition plate 36 is less than 1 W/(m·K), and for example, the thermal conductivity of the partition plate 36 is about 0.2 W/(m·K). In the battery module 31, contact between the batteries 1 adjacent to each other is prevented by the partition plate 36. For this reason, for example, the batteries 1 adjacent to each other are effectively prevented from being electrically connected to each other through the exterior container 3. That is, the batteries 1 adjacent to each other are effectively prevented from being electrically connected to each other without passing through the electrode terminals 26A and 26B.

Note that the entire partition plate 36 does not need to be formed of the material having the electrical insulating property described above, and at least the outer surface of the partition plate 36 may be formed of the material having the electrical insulating property described above. In an example, the partition plate 36 is formed by forming an insulating layer on an outer surface of a metal plate from the material having the electrical insulating property described above. Even in this case, at least the outer surface of the partition plate 36 is formed of the material having the electrical insulating property described above. By using the metal plate inside the partition plate 36, heat generated in each of the batteries 1 is easily transmitted to the module bottom surface 32 through the partition plate 36.

Further, the battery module 31 includes an adhesive 37 that adheres each of the batteries 1 to the partition plate 36. Each of the batteries 1 is fixed to the partition plate 36 by the adhesive 37. As the adhesive 37, a silicone-based or epoxy-based adhesive is preferably used. These adhesives maintain elasticity even in a temperature range in which the battery pack 30 is used. Therefore, by using the silicone-based or epoxy-based adhesive as the adhesive 37, impact from the outside is absorbed by the adhesive 37, and strain or the like caused by expansion of the battery 1 is absorbed by the adhesive 37. In addition, the silicone-based and epoxy-based adhesives have the thermal conductivity of 1 W/(m·K) or more. Therefore, these adhesives are used as the adhesive 37, so that the heat generated in each of the batteries 1 is easily transmitted to the partition plate 36 through the adhesive 37. As described above, the partition plate 36 forms a part of the module bottom surface 32. Therefore, the above-described adhesive having the high thermal conductivity is used as the adhesive 37, so that the heat generated in each of the batteries 1 can be released to the side where the module bottom surface 32 is located through the partition plate 36.

In an example, grease or the like having higher thermal conductivity than the adhesive described above may be used instead of the adhesive 37. As a result, the heat generated in each of batteries 1 can be more appropriately released to the side where the module bottom surface 32 is located through the partition plate 36. In another example, the adhesive 37 or the like may not be provided, and each of the batteries 1 may directly abut on the corresponding partition plate 36.

Further, the battery pack 30 includes a bus bar (connection member) 38, and in the present embodiment, a plurality of bus bars 38 are provided in the battery pack 30. The bus bar 38 is formed of a conductive material such as a metal. In the battery module 31, each of the plurality of batteries 1 is electrically connected to another battery 1 via the bus bar 38. The battery module 31 is electrically connected to an external terminal of the battery pack 30 via the bus bar. In the battery module 31, the plurality of batteries 1 are electrically connected by the bus bar 38, so that at least one of a serial connection structure and a parallel connection structure of the batteries 1 is formed. In each of the plurality of batteries 1, in each of the electrode terminals 26A and 26B, the bus bar 38 is in contact with the contact surface 29, and the bus bar 38 is connected to the contact surface 29. In each of the electrode terminals 26A and 26B, the bus bar 38 is connected (fixed) to the contact surface 29 by any one of welding, screwing with a screw, and fitting.

Here, in the serial connection structure of the two batteries 1, a positive electrode terminal of one battery 1 is connected to a negative electrode terminal of another battery 1 by the bus bar 38. In the parallel connection structure of the plurality of batteries 1, the positive electrode terminals of the batteries 1 are connected to each other by the bus bar 38, and the negative electrode terminals of the batteries 1 are connected to each other by another bus bar 38.

The battery pack 30 includes a frame 40. The frame 40 is formed of a resin having an electrical insulating property. The frame 40 can be formed of, for example, the same material as the partition plate 36 (the outer surface of the partition plate 36). The frame 40 includes at least one of polyphenylene ether, polycarbonate, and polybutylene terephthalate, for example. The thermal conductivity of the frame 40 is less than 1 W/(m·K), and for example, the thermal conductivity of the frame 40 is about 0.2 W/(m·K).

Figure 7:
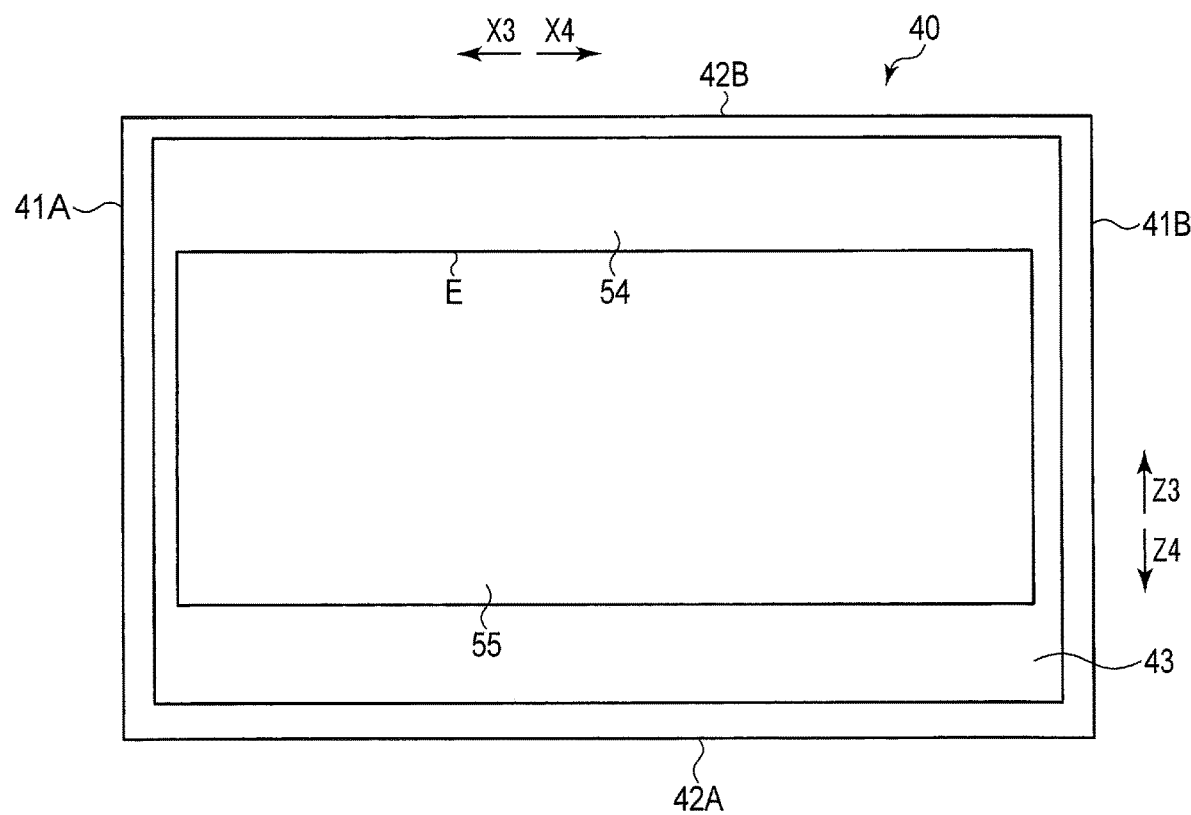
FIG. 7 is a schematic view illustrating a configuration of a frame of the battery pack according to the first embodiment.

FIG. 7 is a diagram illustrating a configuration of the frame 40. As illustrated in FIGS. 4 to 7, the frame 40 includes frame sidewalls 41A, 41B, 42A, and 42B extending along the height direction of the battery pack 30. The frame sidewall 41A faces the battery module 31 from one side (the side of an arrow X3) in the array direction of the batteries 1 (the depth direction of the battery pack 30). Therefore, the frame sidewall 41A faces the module side surface 35A from the outside in the depth direction of the battery module 31. Further, the frame sidewall 41B faces the battery module 31 from the side (the side of an arrow X4) opposite to the frame sidewall 41A in the array direction of the batteries 1. Therefore, the frame sidewall 41B faces the module side surface 35B from the outside in the depth direction of the battery module 31.

The frame sidewall 42A faces the battery module 31 from one side (the side of an arrow Y3) in the width direction of the battery module 31 (battery pack 30). Therefore, the frame sidewall 42A faces the module side surface 34A from the outside in the width direction of the battery module 31. Further, the frame sidewall 42B faces the battery module 31 from the side (the side of an arrow Y4) opposite to the frame sidewall 42A in the width direction of the battery module 31. Therefore, the frame sidewall 42B faces the module side surface 34B from the outside in the width direction of the battery module 31. The battery module 31 is disposed between the frame sidewalls 41A and 41B in the depth direction of the battery pack 30, and is disposed between the frame sidewalls 42A and 42B in the width direction of the battery pack 30.

With the above-described configuration, a surrounding frame surrounding the outer peripheral side of the battery module 31 over the entire circumference of the battery module 31 is formed by the frame sidewalls 41A, 41B, 42A, and 42B. In addition, the frame sidewalls 41A, 41B, 42A, and 42B form a storage space 43 in which the battery module is stored. That is, a range surrounded by the surrounding frame formed by the frame sidewalls 41A, 41B, 42A, and 42B is the storage space 43. The battery module 31 is fixed to an inner surface of the surrounding frame by an adhesive (not illustrated) or the like.

The frame 40 includes a frame protrusion portion 54. The frame protrusion portion 54 protrudes to the inner peripheral side of the storage space 43 from one end (lower end) of each of the frame sidewalls 41A, 41B, 42A, and 42B. On each of the frame sidewalls 41A, 41B, 42A, and 42B, the frame protrusion portion 54 protrudes from the end on the side toward which the module bottom surface 32 faces in the height direction of the battery pack 30. In the present embodiment, a bottom wall (frame bottom wall) of the frame 40 is formed by the frame protrusion portion 54. The frame protrusion portion 54 is disposed on the side toward which the module bottom surface 32 faces with respect to the battery module 31 in the height direction of the battery pack 30. In addition, the frame protrusion portion 54 supports the battery module 31 from the side to which the module bottom surface 32 is directed in the height direction of the battery pack 30.

In the battery pack 30, a through-hole 55 is formed in the frame 40. The through-hole 55 penetrates the bottom wall (frame protrusion portion 54) of the frame 40 in the height direction of the battery pack 30. Therefore, in the frame protrusion portion 54, the through-hole 55 continuously extends from a surface (inner surface) facing the side where the battery module 31 is located to a surface (outer surface) facing the side opposite to the side where the battery module 31 is located. Further, an edge of the through-hole 55 is formed by a protrusion end (inner end) E of the frame protrusion portion 54. In the example of FIGS. 3 to 7, the protrusion end E of the frame protrusion portion 54 forms the edge of the through-hole 55 over the entire circumference in the circumferential direction of the through-hole 55.

The frame protrusion portion 54 does not need to be provided over the entire circumference in the circumferential direction of the battery module 31 (storage space 43), and may be provided only in a partial range in the circumferential direction of the battery module 31. In an example, the frame protrusion portion 54 is provided only in a range in which the frame sidewalls 42A and 42B extend in the circumferential direction of the battery module 31, and is not provided in a range in which the frame sidewalls 41A and 41B extend. In this case, a part of the edge of the through-hole 55 is formed by the protrusion end (inner end) E of the frame protrusion portion 54.

In the battery pack 30, a sheet member 45 abuts on the module bottom surface 32 of the battery module 31. The sheet member 45 is formed of a resin having an electrical insulating property. The sheet member 45 abuts on the module bottom surface 32 from the side toward which the module bottom surface 32 faces in the height direction of the battery pack 30. The outer surface of the sheet member 45 includes a sheet top surface 46 that abuts on the module bottom surface 32. Further, the outer surface of the sheet member 45 includes a sheet bottom surface 47 facing the side opposite to the side where the battery module 31 is located in the height direction of the battery pack 30. The sheet bottom surface 47 faces toward the side opposite to the side toward which the sheet top surface 46 faces.

In the battery pack 30 of the present embodiment, a bottom plate (support member) 48 is attached to the frame 40 from the side toward which the module bottom surface 32 faces in the height direction of the battery pack 30. The bottom plate 48 is formed of a metal, and is formed of any one of aluminum, an aluminum alloy, stainless steel, and copper, for example. Therefore, the bottom plate 48 has higher thermal conductivity than the partition plate 36, the frame 40, and the sheet member 45, and the thermal conductivity of the bottom plate 48 is, for example, about 10 W/(m·K) to 400 W/(m·K). In the present embodiment, each of the frame sidewalls 41A, 41B, 42A, and 42B extends from the bottom plate 48 to the side to which the module top surface 33 is directed (the side of an arrow Z3) along the height direction of the battery pack 30. The frame protrusion portion 54 is installed on the outer surface of the bottom plate 48. In the present embodiment, the bottom plate 48 is formed in a flat plate shape or a substantially flat plate shape having a thickness of about 0.5 mm to 5 mm. Note that the bottom plate 48 is formed to have an appropriate size, shape, and the like as necessary.

In the present embodiment, the sheet member 45 includes a sheet body 65 and a sheet projection 66 protruding from the sheet body 65 to the side opposite to the side where the battery module 31 is located in the height direction of the battery pack 30. The sheet projection 66 protrudes with respect to the other portion of the sheet member 45 to the side opposite to the side where the battery module 31 is located in the height direction of the battery pack 30. In the present embodiment, the sheet projection 66 of the sheet member 45 is disposed on the inner peripheral side of the storage space 43 with respect to the protrusion end E of the frame protrusion portion 54. In addition, the sheet projection 66 is disposed in the through-hole 55 of the frame 40 and forms a solid portion disposed in the through-hole 55. That is, the solid portion disposed in the through-hole 55 is formed by a part of the sheet member 45. The solid portion disposed in the through-hole 55 may be referred to as any one of grease, spacer, sheet, gel, and putty. In the present embodiment, in the through-hole 55, the protrusion end E of the frame protrusion portion 54 abuts on the sheet projection 66 from the outer peripheral side of the storage space 43.

Further, in the present embodiment, the bottom plate abuts on a protrusion end of the sheet projection 66 from the side opposite to the side where the battery module 31 is located in the height direction of the battery pack 30. In the sheet projection 66, the bottom plate 48 abuts on the sheet bottom surface 47 of the sheet member 45. Therefore, the sheet bottom surface 47 of the sheet member 45 is in close contact with (adheres to) the bottom plate 48, and the sheet projection 66 of the sheet member 45 is in close contact with the bottom plate 48 at the protrusion end. In the present embodiment, the frame protrusion portion 54 abuts on the sheet body 65 from the side opposite to the side where the battery module 31 is located in the height direction of the battery pack 30. In the sheet body 65, the frame protrusion portion 54 abuts on the sheet bottom surface 47 of the sheet member 45. Therefore, the sheet bottom surface 47 of the sheet member 45 is in close contact with (adheres to) the frame protrusion portion 54, and the sheet body 65 of the sheet member 45 is in close contact with the frame protrusion portion 54. With the above-described configuration, the sheet member 45 is sandwiched between the module bottom surface 32 of the battery module 31 and the bottom plate 48, and the sheet body 65 is sandwiched between the frame protrusion portion 54 and the module bottom surface 32.

In the present embodiment, the sheet member 45 is not provided between each of the frame sidewalls 41A, 41B, 42A, and 42B and the bottom plate 48, and one end (end on the side where the bottom plate 48 is located) of each of the frame sidewalls 41A, 41B, 42A, and 42B abuts on the bottom plate 48. The sheet member 45 is not provided between the frame protrusion portion 54 and the bottom plate 48, and the bottom plate 48 abuts on the frame protrusion portion from the side opposite to the side where the battery module 31 is located in the height direction of the battery pack 30. Therefore, the frame protrusion portion 54 is disposed between the module bottom surface 32 of the battery module 31 and the bottom plate 48.

In the battery pack 30 of the present embodiment, an adhesive layer 56 is formed between the module bottom surface 32 and the frame protrusion portion 54 in the height direction. In the present embodiment, the adhesive layer 56 is disposed an outer side with respect to the sheet member 45 in the width direction of the battery module 31. The module bottom surface 32 is adhered to the frame protrusion portion 54 by the adhesive layer 56. The adhesive layer 56 may be any layer as long as the battery module 31 can be adhered to the frame protrusion portion 54. Therefore, unlike the adhesive 37, the adhesive layer does not need to use an adhesive having high thermal conductivity. In addition, the adhesive layer 56 preferably has an electrical insulating property.

By providing the sheet member 45, the bottom plate (support member) 48, and the like as described above, the bottom plate 48 supports the battery module 31, the frame 40, and the sheet member 45 from the side toward which the module bottom surface 32 faces in the height direction of the battery pack 30. In addition, the heat generated in the battery module 31 is transmitted to the outside of the battery pack 30 through the sheet member 45 and the bottom plate 48. In the present embodiment, a transmission path of the heat from the battery module 31 passing through the sheet member 45 and the bottom plate 48 passes through the solid portion disposed in the through-hole 55 of the frame 40. The solid portion disposed in the through-hole 55 of the frame 40 in the transmission path of the heat is formed by the sheet member 45.

In the present embodiment, the sheet member 45 has a one-layer structure formed of only a layer (first layer) 51. Therefore, the sheet top surface 46 and the sheet bottom surface 47 are formed by the layer 51. The layer 51 preferably has adhesiveness. The layer 51 includes, for example, silicone. When the layer 51 includes silicone, the adhesiveness of the layer 51 has magnitude based on a polymer combination of polymers, a crosslinking density, and a purity of silicone. The layer 51 has the adhesiveness, so that adhesion of the sheet member 45 to the module bottom surface 32 and the bottom plate 48 is secured even when a position of the sheet member 45 is shifted due to the vibration and the heat.

The layer 51 has higher thermal conductivity than the partition plate 36 and the frame 40. However, the layer 51 has lower thermal conductivity than the exterior container 3 of the battery 1 and the bottom plate 48. The thermal conductivity of the layer (high conductive layer) 51 is 1 W/(m·K) or more, and for example, the thermal conductivity of the layer 51 is about 1 W/(m·K) to 10 W/(m·K). In addition, the layer 51 has a high electrical insulating property. For example, the layer 51 has a comparative tracking index of 175 or more in comparative tracking index measurement by an IEC standard.

In addition, the layer 51 has higher compressibility than the frame 40, and is more easily compressed by the action of an external force than the frame 40. For this reason, the layer 51 has higher elasticity than the frame 40. In the sheet member 45, the layer (first layer) 51 is in close contact with (adheres to) the module bottom surface 32 of the battery module 31. In the sheet member 45, the layer (first layer) 51 is compressed at a portion on which the module bottom surface 32 of the battery module 31 abuts. In the sheet member 45 of the present embodiment, the layer (first layer) 51 is in close contact with (adheres to) the bottom plate 48.

Next, an application of the battery pack 30 will be described. The battery pack 30 is used as, for example, a stationary power supply and a power supply for a railway vehicle. In this case, a large number of battery packs 30 each of which includes the battery module 31 are provided, and a battery system is formed by the battery packs 30. In the battery system, a large number of battery modules are electrically connected to form at least one of a serial connection structure and a parallel connection structure of the battery modules.

Figure 8:
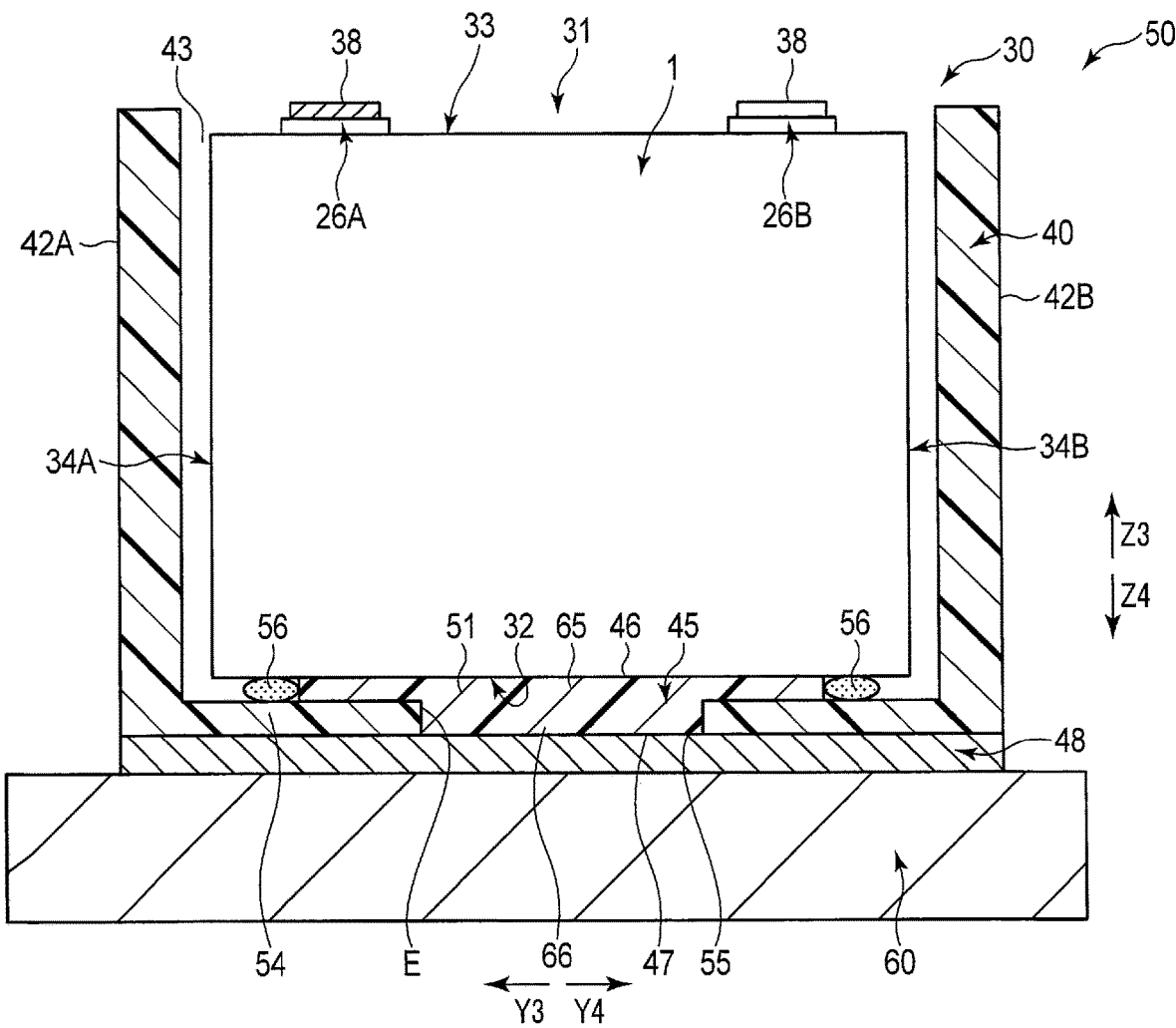
FIG. 8 is a schematic view illustrating an example of a battery system to which the battery pack according to the first embodiment is applied.

FIG. 8 illustrates an application of the battery pack 30. As illustrated in FIG. 8, in the above-described battery system 50 and the like, the battery pack 30 is installed on an outer surface of a cooling plate (cooling fin) 60. A large number of battery packs 30 are installed on the outer surface of the cooling plate 60. The cooling plate 60 is formed of a metal or the like, and has higher thermal conductivity than the frame 40, the partition plate 36, and the sheet member 45. The thermal conductivity of the cooling plate 60 is, for example, about 10 W/(m·K) to 400 w/(m·K). The battery pack 30 is installed on the cooling plate 60 by attaching the frame 40 or the bottom plate 48 to the cooling plate 60 with a bolt or the like.

In the example of FIG. 8, the bottom plate 48 abuts on the cooling plate 60. Therefore, the battery module 31 is located on the side opposite to the side where the cooling plate 60 is located with respect to the sheet member 45 and the frame protrusion portion 54. That is, the cooling plate is provided on the side opposite to the side on which the battery module 31 is located with respect to the sheet member 45 and the frame protrusion portion 54 in the height direction of the battery pack 30. A flow path is formed inside the cooling plate 60. A cooling fluid including a cooling liquid, a cooling gas or the like flows through the flow path of the cooling plate 60.

In the battery system 50 in which a large number of battery modules 31 are electrically connected as described above, charging and discharging in a large current may be performed. In this case, the battery module 31 of the battery pack 30 may have a high temperature due to the charging and discharging in the large current. In the present embodiment, the sheet top surface 46 (layer 51) of the sheet member 45 adheres to and is in close contact with the module bottom surface 32 of the battery module 31. Then, the sheet bottom surface 47 (layer 51) of the sheet member 45 is in close contact with (adheres to) and abuts on the bottom plate 48. Therefore, the heat generated in the battery module 31 is transmitted to the cooling plate through a transmission path passing through the sheet member 45 and the bottom plate 48. That is, the heat is transmitted from the battery module 31 to the cooling plate 60 through the layer 51 and the solid portion disposed in the through-hole 55 of the frame 40.

Here, the layer 51 of the sheet member 45 has higher thermal conductivity than the frame 40 and the partition plate 36. Actually, the thermal conductivity of the layer 51 is about 10 times that of the frame 40 and the partition plate 36. The sheet member 45 of the present embodiment is formed of only the layer 51. Therefore, the heat from the battery module 31 is appropriately transmitted to the cooling plate 60 through the sheet member 45 and the bottom plate 48. Therefore, in the battery pack 30, the heat is appropriately released from the battery module 31 to the cooling plate 60.

In addition, the battery system 50 described above may be used at a high operating voltage. For example, depending on the battery system 50, a short circuit voltage of 1000 V or more may be generated when a short circuit occurs. In the battery pack 30 of the present embodiment, the frame sidewalls 41A, 41B, 42A, and 42B surrounding the battery module 31 are formed of a material having a high electrical insulating property. The sheet member 45 in close contact with the module bottom surface 32 is also formed of a material having a high electrical insulating property. The frame protrusion portion 54 disposed between the battery module 31 and the bottom plate 48 is also formed of a material having a high electrical insulating property. Therefore, in the battery system 50, an insulating structure having high withstand voltage (dielectric strength) is appropriately formed by the battery pack 30.

In the present embodiment, an insulation distance between the plurality of batteries 1 of the battery module 31 and the bottom plate 48 can be increased by the frame protrusion portion 54 and the sheet member 45. By increasing the insulation distance between the plurality of batteries 1 of the battery module 31 and the bottom plate 48, an insulating structure having higher withstand voltage (dielectric strength) is formed.

Modification of First Embodiment

Figure 9:
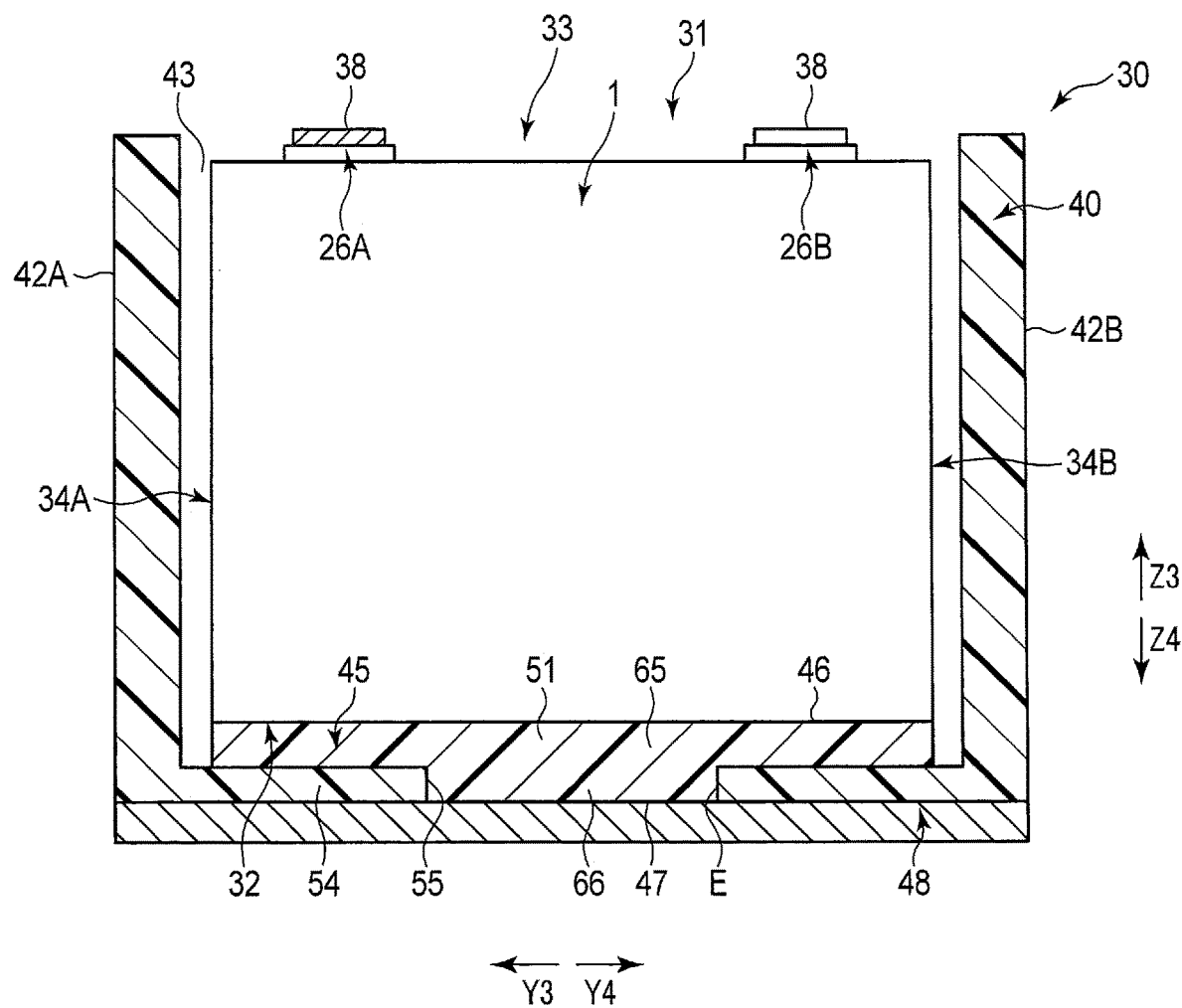
FIG. 9 is a schematic view illustrating a battery pack according to a first modification of the first embodiment.

In a first modification of the first embodiment illustrated in FIG. 9, the adhesive layer 56 is not provided. Even in the present modification, the frame 40 includes the frame protrusion portion 54, and the sheet member 45 includes the sheet body 65 and the sheet projection 66. The bottom plate 48 supports the battery module 31, the frame 40, and the sheet member 45 from the side toward which the module bottom surface 32 faces in the height direction of the battery pack 30. In addition, the heat generated in the battery module 31 is transmitted to the outside of the battery pack 30 through the sheet member and the bottom plate 48. Even in the present modification, in the transmission path of the heat from the battery module 31, the solid portion disposed in the through-hole 55 of the frame 40 is formed by the sheet projection 66 of the sheet member 45. Even in the present modification, functions and effects similar to those of the above-described embodiment and the like are obtained.

In the above-described embodiment and the like, a part of the sheet member 45 is disposed in the through-hole 55 of the frame 40, and the solid portion disposed in the through-hole 55 in the transmission path of the heat from the battery module 31 is formed by the sheet member 45, but it is not limited thereto. In a second modification of the first embodiment illustrated in FIG. 10, the bottom plate includes a bottom plate body 61 and a bottom plate projection 62 protruding from the bottom plate body 61 to a side where the battery module 31 is located in the height direction of the battery pack 30. The bottom plate projection 62 protrudes with respect to the other portion of the bottom plate 48 to the side where the battery module 31 is located in the height direction of the battery pack 30. In the present modification, the bottom plate body 61 abuts on the frame protrusion portion 54 from the side opposite to the side where the battery module 31 is located in the height direction of the battery pack 30. The frame protrusion portion 54 is disposed between the module bottom surface 32 of the battery module 31 and the bottom plate body 61.

In the present modification, the bottom plate projection 62 is disposed on the inner peripheral side of the storage space 43 with respect to the protrusion end E of the frame protrusion portion 54. The bottom plate projection 62 is disposed in the through-hole 55 of the frame 40 and forms a solid portion disposed in the through-hole 55. Therefore, in the present modification, the solid portion disposed in the through-hole 55 is formed by a part of the bottom plate 48. In the through-hole 55, the protrusion end E of the frame protrusion portion 54 abuts on the bottom plate projection 62 from the outer peripheral side of the storage space 43.

In the present modification, the frame protrusion portion 54 and the bottom plate projection 62 abut on the sheet member 45 from the side opposite to the side where the battery module 31 is located in the height direction of the battery pack 30. Therefore, the sheet bottom surface 47 (layer 51) of the sheet member 45 is in close contact with (adheres to) the frame protrusion portion 54, and the sheet member 45 is sandwiched between the module bottom surface of the battery module 31 and the frame protrusion portion 54. The sheet bottom surface 47 (layer 51) of the sheet member 45 is in close contact with (adheres to) the protrusion end of the bottom plate projection 62, and the sheet member 45 is sandwiched between the module bottom surface 32 of the battery module 31 and the bottom plate projection 62.

Even in the present modification, the bottom plate 48 supports the battery module 31, the frame 40, and the sheet member 45 from the side to which the module bottom surface 32 is directed in the height direction of the battery pack 30. In addition, the heat generated in the battery module is transmitted to the outside of the battery pack 30 through the sheet member 45 and the bottom plate 48. However, in the present modification, in the transmission path of the heat from the battery module 31, the solid portion disposed in the through-hole 55 of the frame 40 is formed by the bottom plate 48. Even in the present modification, functions and effects similar to those of the above-described embodiment and the like are obtained.

Figure 10:
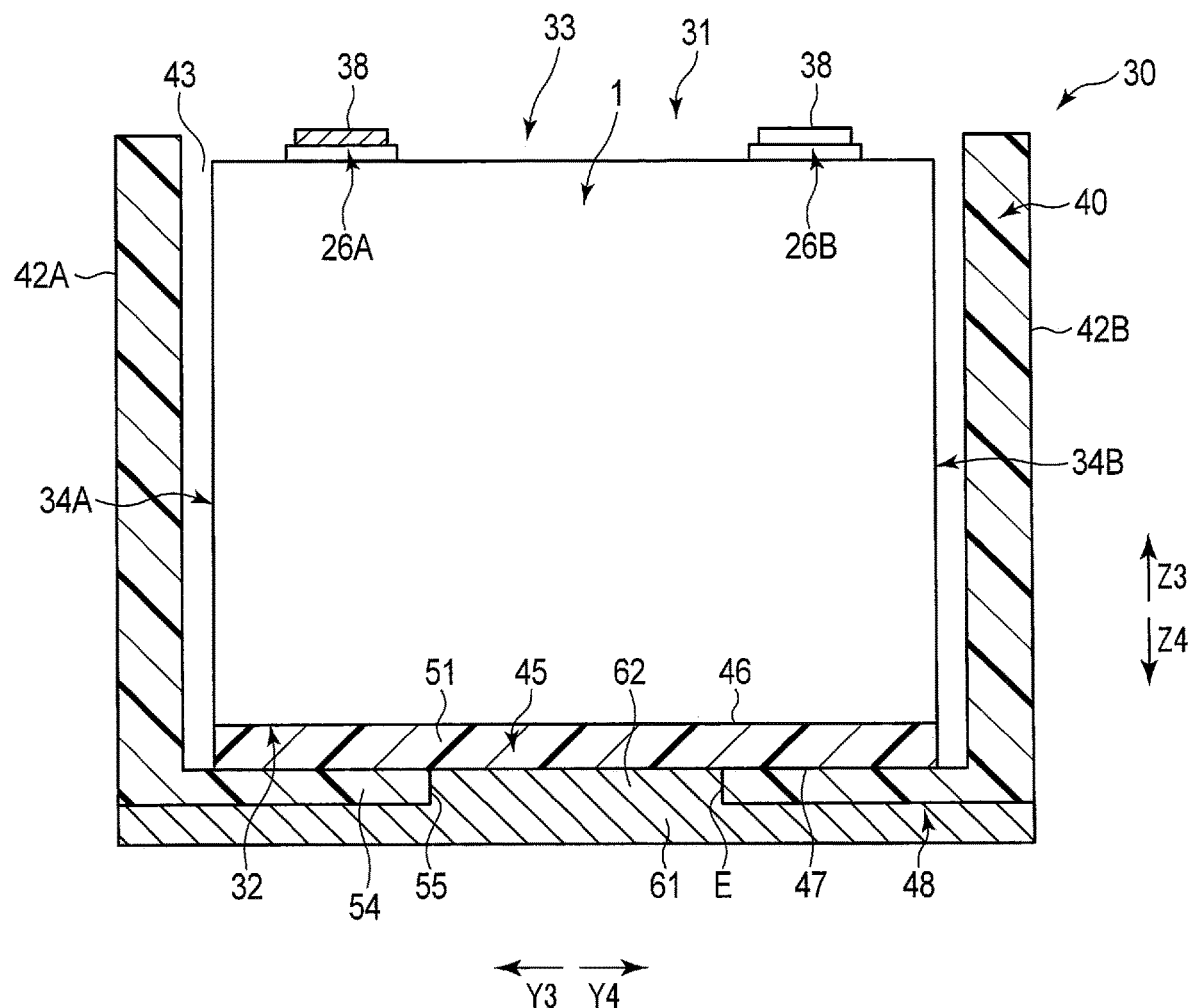
FIG. 10 is a schematic view illustrating a battery pack according to a second modification of the first embodiment.

Although the adhesive layer 56 is not provided in the modification of FIG. 10, the adhesive layer 56 may be provided, similarly to the first embodiment. In this case, the adhesive layer 56 adheres the module bottom surface 32 of the battery module 31 to the frame protrusion portion 54. The adhesive layer 56 is disposed on the outer side with respect to the sheet member 45 in the width direction of the battery module 31.

Even in a third modification of the first embodiment illustrated in FIG. 11A, similarly to the second modification of the first embodiment, the bottom plate 48 includes a bottom plate body 61 and a bottom plate projection 62. However, in the present modification, the sheet member 45 is formed in a three-layer structure including layers 51 to 53. The layer (first layer) 51 adheres to the module bottom surface 32 of the battery module 31, similarly to the above-described embodiment and the like. The layer (second layer) 52 is stacked on the layer 51 on the side opposite to the side where the battery module 31 is located in the height direction of the battery pack 30. The layer (third layer) 53 is stacked on the layer 52 on the side opposite to the side on which the layer 51 is stacked in the height direction of the battery pack 30 (stack direction in the sheet member 45). In addition, the layer 53 adheres to the bottom plate 48. In the present modification, the sheet top surface 46 is formed by the layer 51, and the sheet bottom surface 47 is formed by the layer 53.

The layer 51 is formed of a material similar to that of the above-described embodiment and the like. In the present modification, each of the layers 51 and 53 has adhesiveness. Each of the layers 51 and 53 includes, for example, silicone. The layer 52 includes at least one of polyethylene terephthalate (PET), polyimide (PI), polypropylene (PP), and polybutylene terephthalate (PBT). When the layers 51 and 53 include silicone, the adhesiveness of each of the layers 51 and 53 has magnitude based on a polymer combination of polymers, a crosslinking density, and a purity of silicone as described above. Each of the layers 51 and 53 has the adhesiveness, so that adhesion of the sheet member 45 to the module bottom surface 32 and the bottom plate 48 is secured even when a position of the sheet member 45 is shifted due to the vibration, the heat or the like.

Each of the layers 51 and 53 has higher thermal conductivity than the partition plate 36, the frame 40, and the layer 52. However, each of the layers 51 and 53 has lower thermal conductivity than the exterior container 3 and the bottom plate 48 of the battery 1. The thermal conductivity of each of the layers 51 and 53 is 1 W/(m·K) or more, and for example, the thermal conductivity of each of the layers 51 and 53 is about 1 W/(m·K) to 10 W/(m·K). The layer 52 has substantially the same thermal conductivity as the partition plate 36 and the frame 40. Therefore, the thermal conductivity of the layer 52 is less than 1 W/(m·K), for example, about 0.2 W/(m·K). Further, the layer 52 is thinner than each of the layers 51 and 53. In one example, the layer thickness of the layer (second layer) 52 is 200 μm or less, for example, about 100 μm.

In addition, the layer 52 has higher mechanical strength than the layers 51 and 53, and is less likely to be broken by the action of an external force than the layers 51 and 53. For this reason, the layer 52 has higher pressure resistance than the layers 51 and 53. Each of the layers 51 and 53 has higher compressibility than the layer 52, and is more easily compressed by the action of an external force than the layer 52. Therefore, each of the layers 51 and 53 has higher elasticity than the layer 52. The layer 53 has substantially the same compressibility as the layer 51, or has lower compressibility than the layer 51.

Here, the layers 51 and 53 of the sheet member 45 have higher thermal conductivity than the frame 40 and the partition plate 36. Actually, the thermal conductivity of the layers 51 and 53 is about 10 times that of the frame 40 and the partition plate 36. In the sheet member 45, each of the layers 51 and 53 is thicker than the layer 52. For this reason, even in the present modification, the heat from the battery module 31 is appropriately transmitted to the cooling plate 60 through the sheet member 45 and the bottom plate 48. Therefore, even in the battery pack 30 of the present modification, the heat is appropriately released from the battery module 31 to the cooling plate 60.

Further, in the sheet member 45 of the present modification, the layer 52 is formed of a material having a high electrical insulating property, and has a high mechanical strength. Therefore, even when the layers 51 and 53 are damaged by an external force, the battery module (battery set) 31 is appropriately electrically insulated from the bottom plate 48 and the cooling plate 60 by the layer 52. Therefore, even when the layers 51 and 53 are damaged by the external force, an insulating structure having high withstand voltage (dielectric strength) is appropriately formed by the layer 52 of the battery pack 30.

In a modification, in the configuration in which the sheet member 45 includes the sheet body 65 and the sheet projection 66 as in the first embodiment, the sheet member is formed in a three-layer structure including the layers 51 to 53 as in the third modification of the first embodiment. The sheet member 45 may have a two-layer structure or a multi-layer structure including four or more layers. In addition, when the sheet member 45 includes a plurality of layers (for example, 51 to 53) as in the third modification of the first embodiment, at least one layer may have an electrical insulating property, and the other layers may not have an electrical insulating property.

Figure 11B:
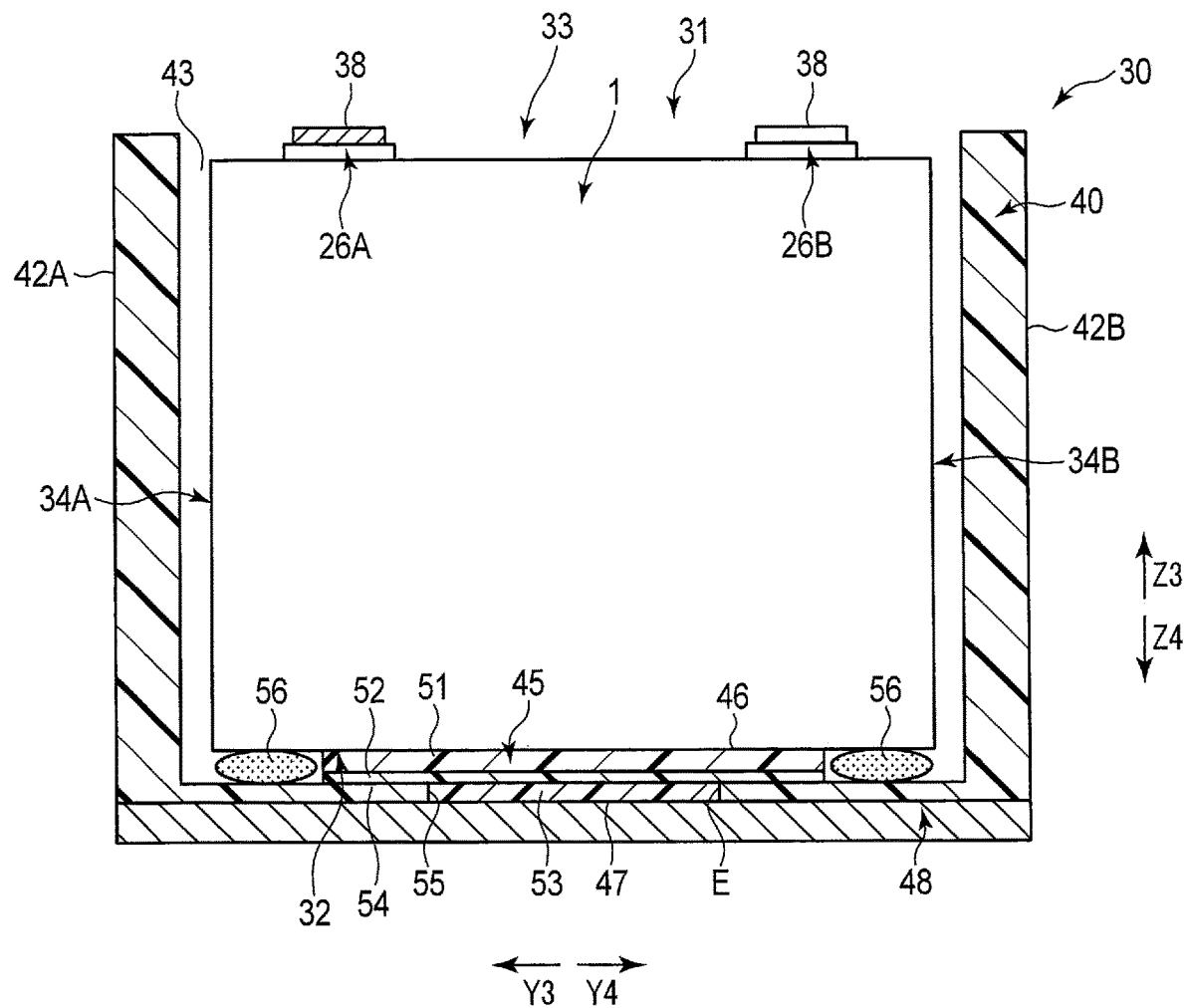
FIG. 11B is a schematic view illustrating a battery pack according to a fourth modification of the first embodiment.

For example, in a fourth modification of the first embodiment illustrated in FIG. 11B, a part of the sheet member 45 is disposed in the through-hole 55 of the frame 40, and the sheet member 45 is formed in a three-layer structure including the layers 51 to 53. In the present modification, the layer (third layer) 53 is disposed in the through-hole 55, and the solid portion disposed in the through-hole 55 in the transmission path of the heat from the battery module 31 is formed by the layer 53 of the sheet member 45. In the present embodiment, in the through-hole 55, the protrusion end E of the frame protrusion portion 54 abuts on the layer 53 from the outer peripheral side of the storage space 43. In the present modification, the bottom plate 48 abuts on the layer 53 from the side opposite to the side where the battery module 31 is located in the height direction of the battery pack 30. Therefore, the layer 53 of the sheet member 45 is in close contact with (adheres to) the bottom plate 48.

In the present modification, the layers 51 and 52 are sandwiched between the frame protrusion portion 54 and the module bottom surface 32 of the battery module 31 in the height direction of the battery pack 30. The layer (first layer) 51 is in close contact with (adheres to) the module bottom surface 32 of the battery module 31, and the layer (second layer) 52 abuts on the frame protrusion portion 54. Further, the layer 53 is sandwiched between the layer 52 and the bottom plate 48. In the present modification, each of the layers 51 and 52 protrudes outward with respect to the layer 53 in the width direction of the battery pack 30. Each of the layers 51 and 52 extends to a portion located on the outer side with respect to the protrusion end E of the frame protrusion portion 54 in the width direction of the battery pack 30.

In the present modification, similarly to the first embodiment and the like, in the battery pack 30, the adhesive layer 56 is formed between the module bottom surface 32 and the frame protrusion portion 54 in the height direction. In the present modification, the adhesive layer 56 is disposed the outer side with respect to the layers 51 and 52 of the sheet member 45 in the width direction of the battery module 31. The module bottom surface 32 is adhered to the frame protrusion portion 54 by the adhesive layer 56. Even in the present modification, since the sheet member 45 includes the layers 51 to 53, functions and effects similar to those of the third modification are obtained.

Figure 11C:
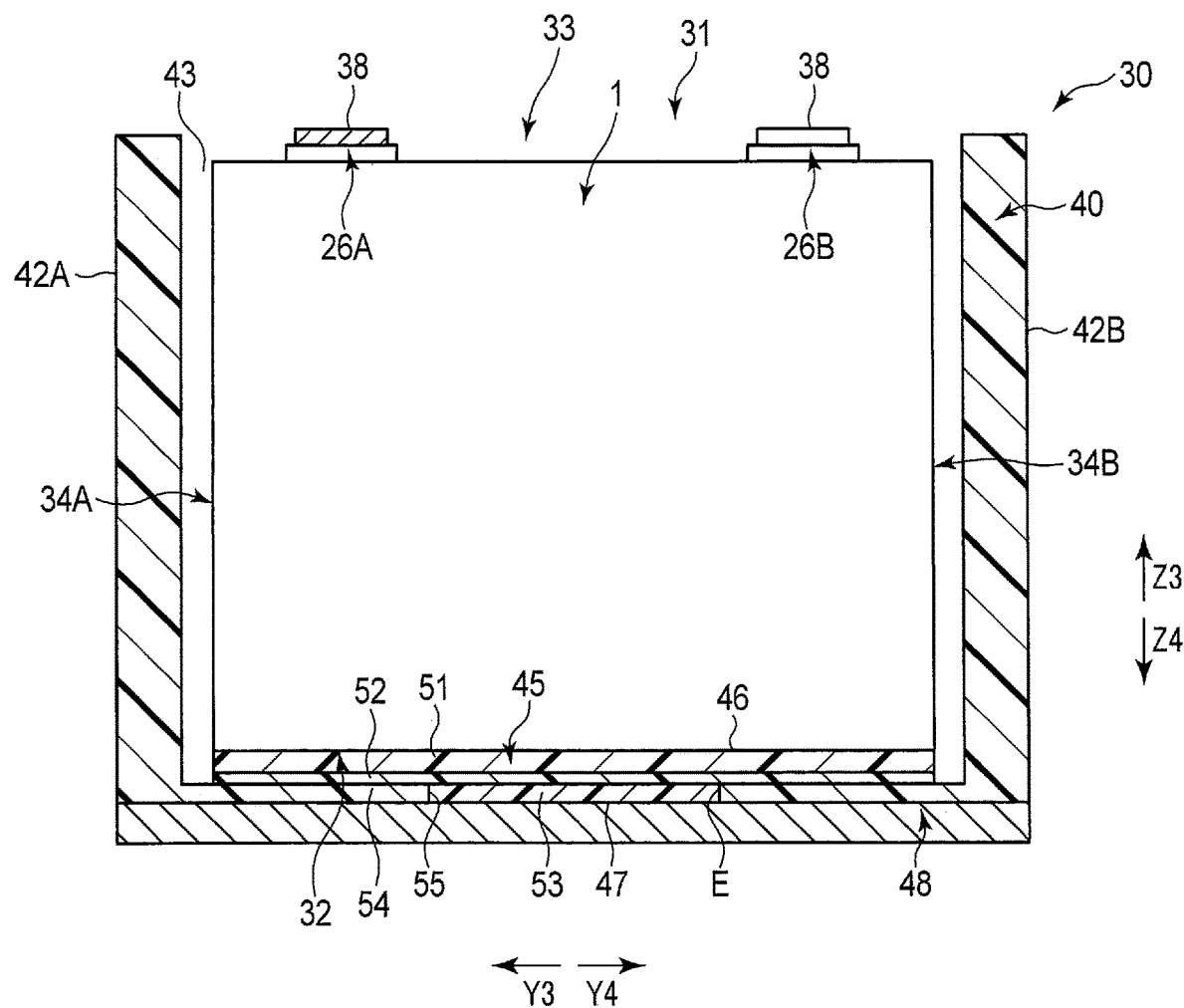
FIG. 11C is a schematic view illustrating a battery pack according to a fifth modification of the first embodiment.

Even in the fifth modification of the first embodiment illustrated in FIG. 11C, similarly to the fourth modification, the sheet member 45 includes the layers 51 to 53, and the layer (third layer) 53 is disposed in the through-hole 55. The layers 51 and 52 are sandwiched between the frame protrusion portion 54 and the module bottom surface 32 of the battery module 31 in the height direction of the battery pack 30. However, in the present modification, the adhesive layer 56 is not provided. Even in the present modification, functions and effects similar to those of the fourth modification and the like are obtained.

Figure 11D:
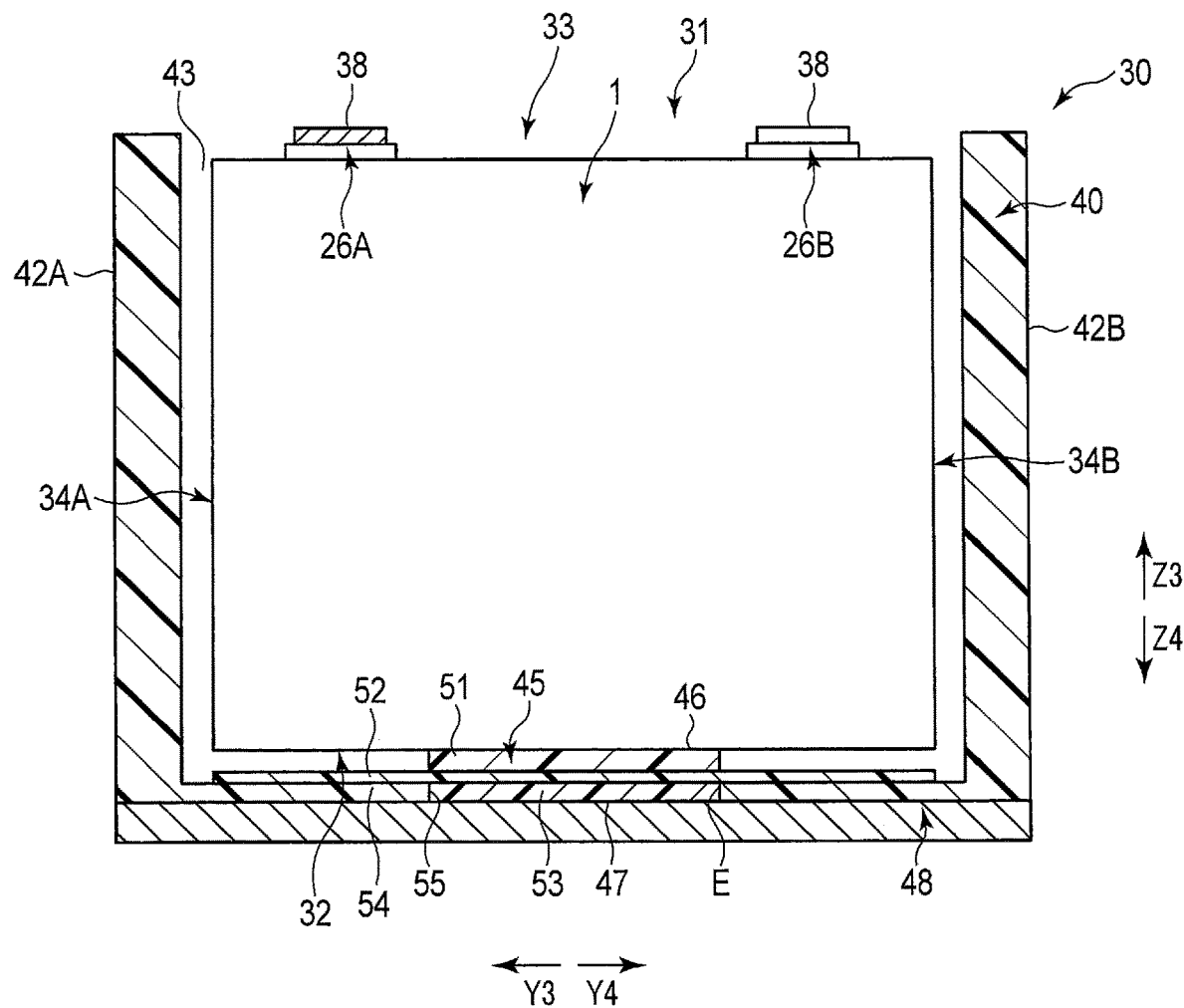
FIG. 11D is a schematic view illustrating a battery pack according to a sixth modification of the first embodiment.

Even in a sixth modification of the first embodiment illustrated in FIG. 11D, similarly to the fifth modification and the like, the sheet member 45 includes the layers 51 to 53, and the layer (third layer) 53 is disposed in the through-hole 55. In addition, similarly to the fifth modification and the like, the adhesive layer 56 is not provided. However, in the present modification, only the layer 52 protrudes outward with respect to the layer 53 in the width direction of the battery pack 30, and the layer 51 does not protrude outward with respect to the layer 53 in the width direction of the battery pack 30. That is, among the layers 51 to 53, only the layer 52 extends to a portion located on the outer side with respect to the protrusion end E of the frame protrusion portion 54 in the width direction of the battery pack 30.

In the present modification, the layer 52 abuts on the frame protrusion portion 54 and is disposed between the frame protrusion portion 54 and the module bottom surface 32. Even in the present modification, similarly to the fifth modification and the like, the layer 51 is in close contact with (adheres to) the module bottom surface 32. With the configuration described above, even in the present modification, functions and effects similar to those of the fifth modification and the like are obtained.

Figure 11E:
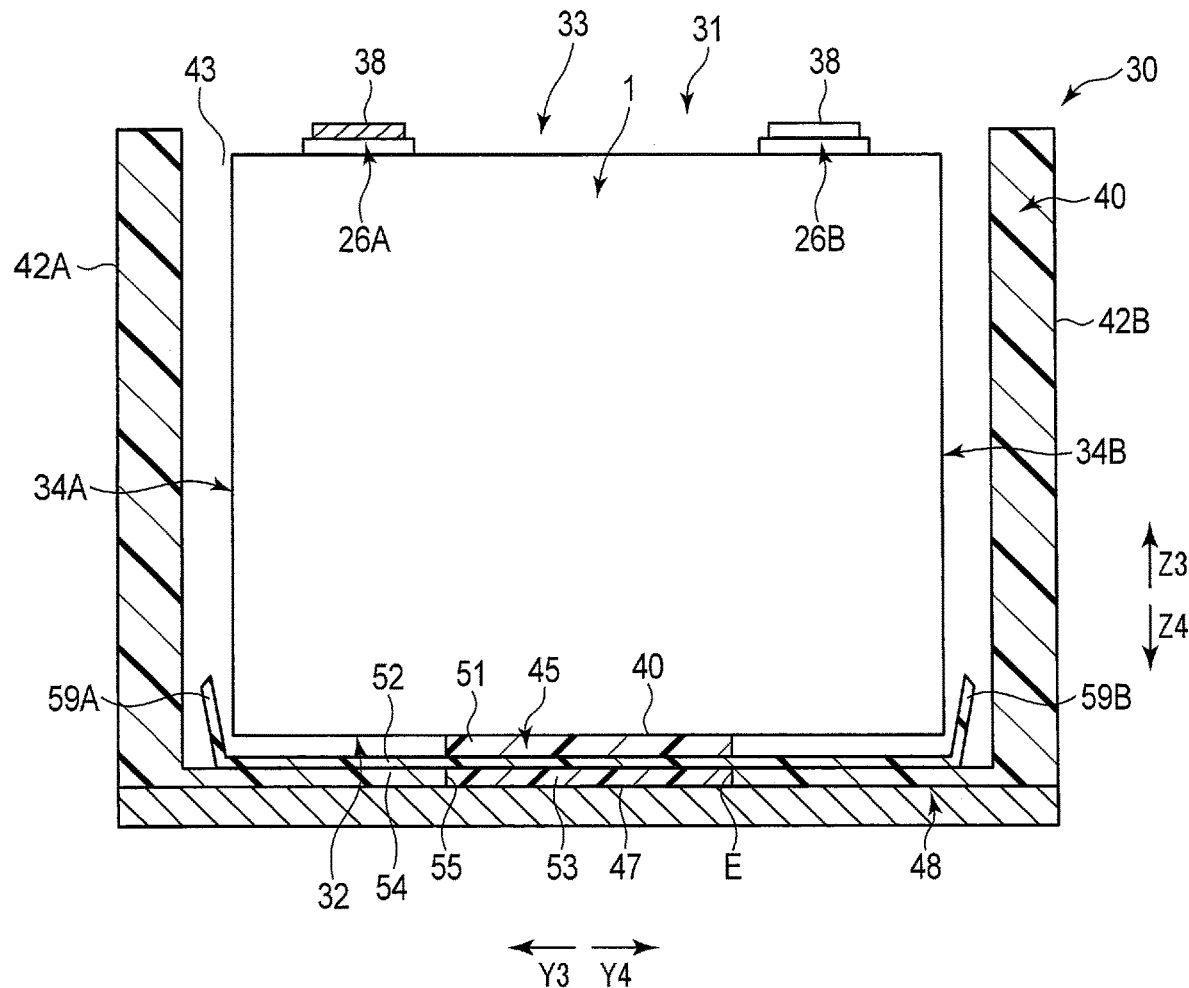
FIG. 11E is a schematic view illustrating a battery pack according to a seventh modification of the first embodiment.

Even in a seventh modification of the first embodiment illustrated in FIG. 11E, similarly to the sixth modification and the like, the sheet member 45 includes the layers 51 to 53, and the layer (third layer) 53 is disposed in the through-hole 55. Among the layers 51 to 53, only the layer 52 extends to a portion located on the outer side with respect to the protrusion end E of the frame protrusion portion 54 in the width direction of the battery pack 30. The layer 52 abuts on the frame protrusion portion 54, and the layer 51 is in close contact with (adheres to) the module bottom surface 32.

In the present modification, the layer 52 includes layer protrusion portions 59A and 59B. Each of the layer protrusion portions 59A and 59B protrudes to the side where the battery module 31 is located in the height direction of the battery pack 30. The layer protrusion portions 59A and 59B protrude at an outer end (outer peripheral end) of the layer 52 in the width direction of the battery pack 30. The layer protrusion portion 59A is disposed between the frame sidewall 42A and the module side surface 34A in the storage space 43, and faces the module side surface 34A from the outer peripheral side. Further, the layer protrusion portion 59B is disposed between the frame sidewall 42B and the module side surface 34B in the storage space 43, and faces the module side surface 34B from the outer peripheral side. The layer protrusion portion 59A covers the module side surface 34A and a corner portion between the module bottom surface 32 and the module side surface 34A. The layer protrusion portion 59B covers the module side surface 34B and a corner portion between the module bottom surface and the module side surface 343. Even in the present modification, functions and effects similar to those of the sixth modification and the like are obtained.

Figure 12:
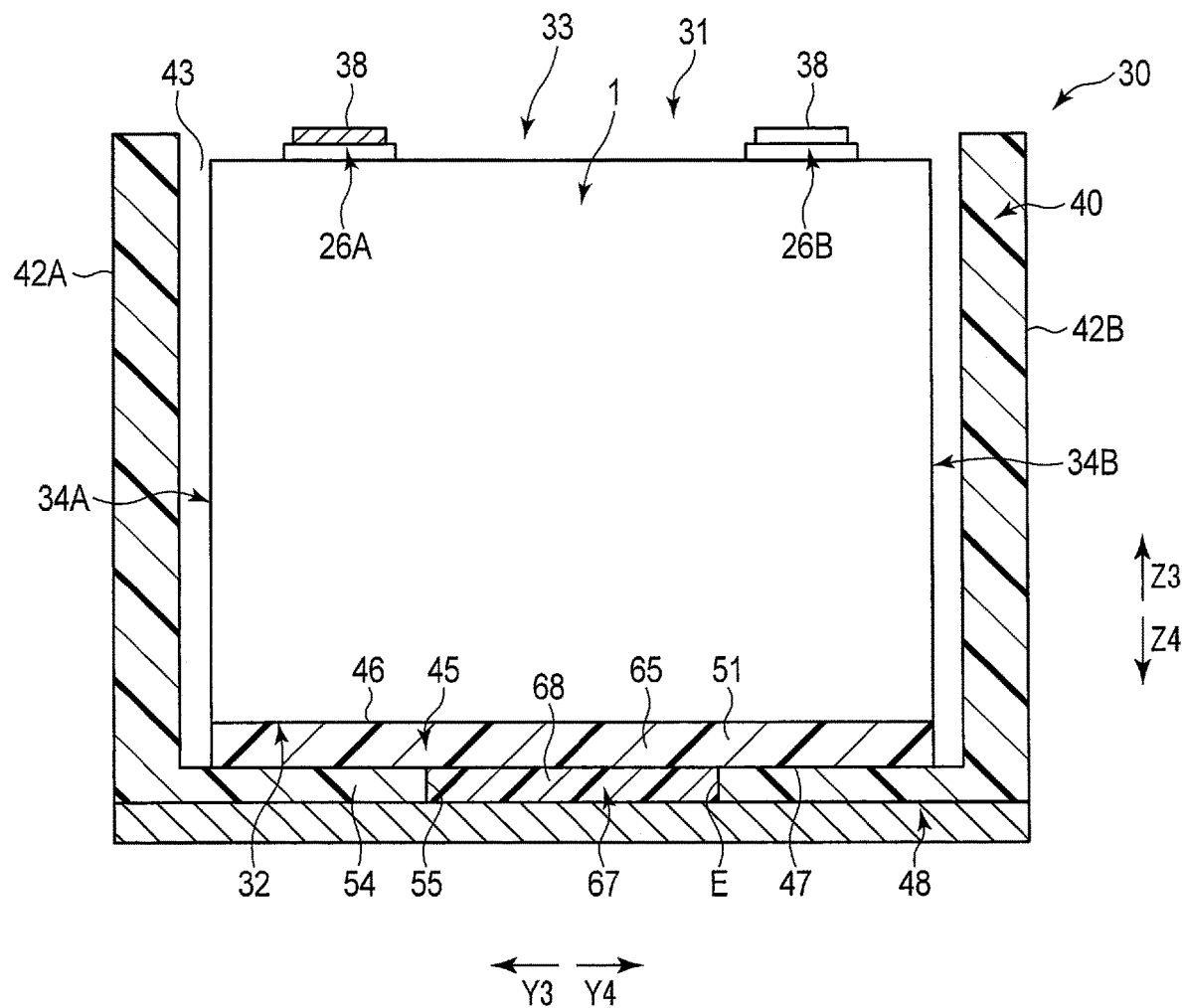
FIG. 12 is a schematic view illustrating a battery pack according to an eighth modification of the first embodiment.

In an eighth modification of the first embodiment illustrated in FIG. 12, the battery pack 30 includes a relay sheet 67 in addition to the sheet member 45. The relay sheet 67 is formed of a resin having an electrical insulating property. In the present modification, the relay sheet 67 has a one-layer structure formed of only the layer 68. The layer 68 includes the same material as the layer 51 of the sheet member 45, and includes, for example, silicone. Therefore, the layer 68 of the relay sheet 67 has adhesiveness. The layer 68 has higher thermal conductivity than the frame 40 and the partition plate 36. However, the layer 68 has lower thermal conductivity than the exterior container 3 of the battery 1 and the bottom plate 48. The thermal conductivity of the layer (high conductive layer) is 1 W/(m·K) or more, and for example, the thermal conductivity of the layer 68 is about 1 W/(m·K) to 10 W/(m·K). The layer 68 has the adhesiveness, so that adhesion of the relay sheet 67 to the sheet member 45 and the bottom plate 48 is secured even when a position of the relay sheet 67 is shifted due to the vibration, the heat or the like.

Even in the present modification, the bottom plate 48 abuts on the frame protrusion portion 54 from the side opposite to the side where the battery module 31 is located in the height direction of the battery pack 30. The frame protrusion portion 54 is disposed between the module bottom surface 32 of the battery module 31 and the bottom plate 48. In the present modification, the relay sheet 67 is disposed on the inner peripheral side of the storage space with respect to the protrusion end E of the frame protrusion portion 54. The relay sheet 67 is disposed in the through-hole 55 of the frame 40 and forms a solid portion disposed in the through-hole 55. Therefore, in the present modification, the solid portion disposed in the through-hole 55 is formed by the relay sheet 67 including the layer (high conductive layer) 68. In the through-hole 55, the protrusion end E of the frame protrusion portion 54 abuts on the relay sheet 67 from the outer peripheral side of the storage space 43.

In the present modification, the bottom plate 48 abuts on the relay sheet 67 from the side opposite to the side where the battery module 31 is located in the height direction of the battery pack 30. Therefore, the relay sheet 67 is in close contact with (adheres to) the bottom plate 48. The frame protrusion portion 54 abuts on the sheet member 45 from the side opposite to the side where the battery module 31 is located in the height direction of the battery pack 30. Therefore, the sheet bottom surface 47 (layer 51) of the sheet member 45 is in close contact with (adheres to) the frame protrusion portion 54. With the above-described configuration, the sheet member 45 is sandwiched between the module bottom surface 32 of the battery module 31 and the frame protrusion portion 54, and is sandwiched between the relay sheet 67 and the module bottom surface 32.

In the present modification, the bottom plate 48 supports the battery module 31, the frame 40, the sheet member 45, and the relay sheet 67 from the side toward which the module bottom surface 32 faces in the height direction of the battery pack 30. In addition, the heat generated in the battery module 31 is transmitted to the outside of the battery pack 30 through the sheet member 45, the relay sheet 67, and the bottom plate 48. However, in the present modification, in the transmission path of the heat from the battery module 31, the solid portion disposed in the through-hole 55 of the frame 40 is formed by the relay sheet 67 including the layer (high conductive layer) 68. Even in the present modification, functions and effects similar to those of the above-described embodiment and the like are obtained.

Although the adhesive layer 56 is not provided in the modification of FIG. 12, the adhesive layer 56 may be provided, similarly to the first embodiment. In this case, the adhesive layer 56 adheres the module bottom surface 32 of the battery module 31 to the frame protrusion portion 54. The adhesive layer 56 is disposed on the outer side with respect to the sheet member 45 in the width direction of the battery module 31.

In a modification, at least two of the sheet projection 66 of the first embodiment, the bottom plate projection 62 of the second modification of the first embodiment, and the relay sheet 67 of the eighth modification of the first embodiment are provided in the battery pack 30. In the transmission path of the heat from the battery module 31, the solid portion disposed in the through-hole 55 of the frame 40 is formed by at least two of the bottom plate projection 62, the sheet projection 66, and the relay sheet 67. Even in the present modification, functions and effects similar to those of the above-described embodiment and the like are obtained.

Further, in a modification, in the configuration in which at least one of the bottom plate projection 62, the sheet projection 66, and the relay sheet 67 is provided in the battery pack 30, the sheet member 45 is formed in a multi-layer structure such as a three-layer structure including the layers 51 to 53 as in the third modification and the like of the first embodiment. Furthermore, in another modification, in the configuration in which the relay sheet 67 is provided, the relay sheet 67 is formed in a multi-layer structure such as a three-layer structure including three layers similar to the layers 51 to 53.

In a ninth modification of the first embodiment illustrated in FIG. 13, the battery pack 30 includes an insulating layer 71 as a stacked portion stacked on the outer surface of the bottom plate 48. The insulating layer 71 is stacked with respect to the bottom plate 48 on the side where the battery module 31 is located in the height direction of the battery pack 30. The insulating layer 71 is formed of a material having an electrical insulating property. The insulating layer 71 includes at least one of polyimide (PI), polypropylene (PP), an epoxy-based resin, polybutylene terephthalate (PET), and polyethylene terephthalate (PET). The insulating layer 71 has lower thermal conductivity and compressibility than the layer 51 formed of silicone or the like. However, the insulating layer 71 is thinner than the layer 51, and in an example, the insulating layer 71 has a layer thickness of 500 μm or less. In addition, the insulating layer 71 has higher mechanical strength and compression resistance than the layer 51.

In the present modification, the insulating layer 71 abuts on the frame protrusion portion 54 and the sheet bottom surface 47 of the sheet member 45 from the side opposite to the side where the battery module 31 is located in the height direction of the battery pack 30. Therefore, the insulating layer 71 is sandwiched between the bottom plate 48 and the frame protrusion portion 54 and is sandwiched between the bottom plate 48 and the sheet member 45. The frame protrusion portion 54 and the sheet member 45 are disposed on the surface of the insulating layer 71 (stacked portion).

In the present modification, the insulating layer 71 is provided, but the layer thickness of the insulating layer 71 is small. Therefore, even in the present modification, the heat from the battery module 31 is appropriately transmitted to the cooling plate 60 through the sheet member 45, the insulating layer 71, and the bottom plate 48. Therefore, even in the battery pack 30 of the present modification, the heat is appropriately dissipated from the battery module 31 to the cooling plate 60.

In addition, the insulating layer 71 is formed of a material having a high electrical insulating property and has high mechanical strength. Therefore, even when the sheet member 45 is damaged by an external force, the battery module (battery set) 31 is appropriately electrically insulated from the bottom plate 48 and the cooling plate 60 by the insulating layer 71. Therefore, even when the sheet member 45 is damaged by the external force, an insulating structure having high withstand voltage (dielectric strength) is appropriately formed by the insulating layer 71 of the battery pack 30.

The battery module 31 of the present modification and the like is used at a high voltage. In addition, the battery module 31 of the present modification and the like may be used together with an inverter in, for example, a railway or the like, and may be affected by an impulse voltage repeatedly generated from the inverter. For this reason, there is a possibility that the insulating layer 71 and the like are deteriorated and corona discharge occurs. Therefore, in the battery pack 30 of the present modification and the like, a configuration for preventing the corona discharge is required. On the other hand, the insulating layer 71 is desirably thin from the viewpoint of heat dissipation. However, when the thickness of the insulating layer 71 is small, the corona discharge (partial discharge) may occur. In the present modification, by using the sheet member 45 having a certain thickness, a corona discharge starting voltage can be increased corresponding to an increase in the thickness of the sheet member 45. The corona discharge starting voltage can also be adjusted by the dielectric constant of the sheet member 45. As a result, a configuration suitable for a battery module used for high voltage applications is obtained.

When the insulating layer 71 is provided as in the modification of FIG. 13, the sheet member 45 does not need to be disposed between the frame protrusion portion 54 and the module bottom surface 32 of the battery module 31. However, the sheet member 45 is disposed between the module bottom surface 32 and the insulating layer 71. In a modification, in the configuration in which the insulating layer 71 is provided, similarly to the first embodiment, the sheet member 45 may be disposed between the frame protrusion portion 54 and the module bottom surface 32 of the battery module 31.

Figure 14:
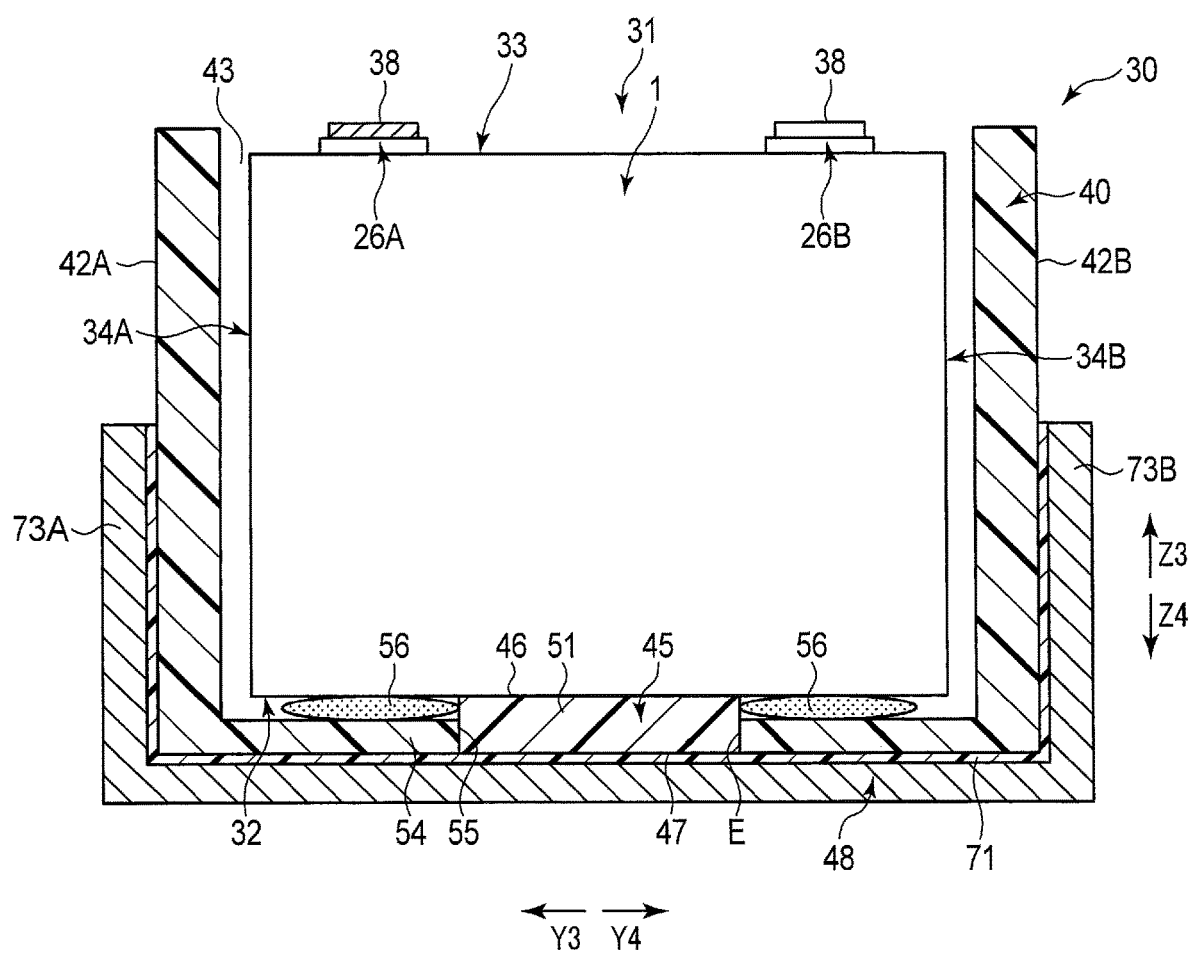
FIG. 14 is a schematic view illustrating a battery pack according to a tenth modification of the first embodiment.

In a tenth modification of the first embodiment illustrated in FIG. 14, the battery pack 30 includes protrusion pieces 73A and 73B formed integrally with the bottom plate 48. The protrusion pieces 73A and 73B are formed of, for example, the same metal as the bottom plate 48. Each of the protrusion pieces 73A and 73B protrudes from the bottom plate 48 to the side where the battery module 31 is located in the height direction of the battery pack 30. The protrusion piece 73A protrudes from one end of the bottom plate 48 in the width direction of the battery pack 30, and the protrusion piece 73B protrudes from the other end of the bottom plate 48 in the width direction of the battery pack 30.

The protrusion piece 73A faces the frame sidewall 42A from the side opposite to the side where the storage space is located, that is, the outer peripheral side (outer side). The protrusion piece 73B faces the frame sidewall 42B from the side opposite to the side where the storage space 43 is located, that is, the outer peripheral side (outer side). In the present modification, the insulating layer 71 (stacked portion) is stacked on the outer surface of the bottom plate 48, and is also stacked on the outer surface of each of the protrusion pieces 73A and 73B. In addition, the insulating layer 71 is formed over an entire range in which the bottom plate 48 and the protrusion pieces 73A and 73B are extended.

Since the insulating layer 71 is formed as described above, in the present modification, the insulating layer 71 is sandwiched between the frame sidewall 42A and the protrusion piece 73A and is sandwiched between the frame sidewall 42B and the protrusion piece 73B. Even in the present modification, an insulating structure having high withstand voltage (dielectric strength) is appropriately formed by the insulating layer 71 of the battery pack 30.

In a modification, a protrusion piece facing the frame sidewall 41A from the outer peripheral side (outer side) and a protrusion piece facing the frame sidewall 41B from the outer peripheral side (outer side) are formed integrally with the bottom plate 48. In addition, the insulating layer 71 is stacked on the outer surface of the bottom plate 48, and is also stacked on the outer surface of each of these protrusion pieces. The insulating layer 71 is sandwiched between the frame sidewall 41A and one of the protrusion pieces and is sandwiched between the frame sidewall 41B and the other of the protrusion pieces. Even in the present modification, similarly to the tenth modification, an insulating structure having high withstand voltage (dielectric strength) is appropriately formed by the insulating layer 71 of the battery pack 30.

Further, in the above-described modification and the like, the stacked portion formed on the outer surface of the bottom plate 48 and the like is formed of only the insulating layer 71. However, in a modification, the stacked portion may include a metal layer formed of copper or the like in addition to the insulating layer 71. In this case, the insulating layer 71 is disposed between the metal layer of the stacked portion and the bottom plate 48. In the configuration in which the protrusion pieces 73A and 73B and the like are provided, the insulating layer 71 is disposed between the metal layer of the stacked portion and each of the protrusion pieces 73A and 73B. However, when the metal layer is provided in the stacked portion, similarly to the first embodiment, the sheet member 45 is preferably disposed between the frame protrusion portion 54 and the module bottom surface 32 of the battery module 31. This effectively prevents the batteries 1 from being electrically connected to each other via the metal layer in the battery module 31.

Further, even in the configuration in which the insulating layer 71 (stacked portion) is provided as in the ninth modification, the tenth modification, and the like, the configuration of the battery pack 30 can be modified as described above in the first to eighth modifications and the like, and the configurations described above in the first to eighth modifications and the like can be appropriately combined. That is, even in the configuration in which the insulating layer 71 (stacked portion) is provided, as described above, the shapes, configurations, and the like of the bottom plate 48 and the sheet member 45 can be appropriately changed, and the presence or absence of the relay sheet 67, the adhesive layer 56, and the like can also be appropriately changed.

Figure 15:
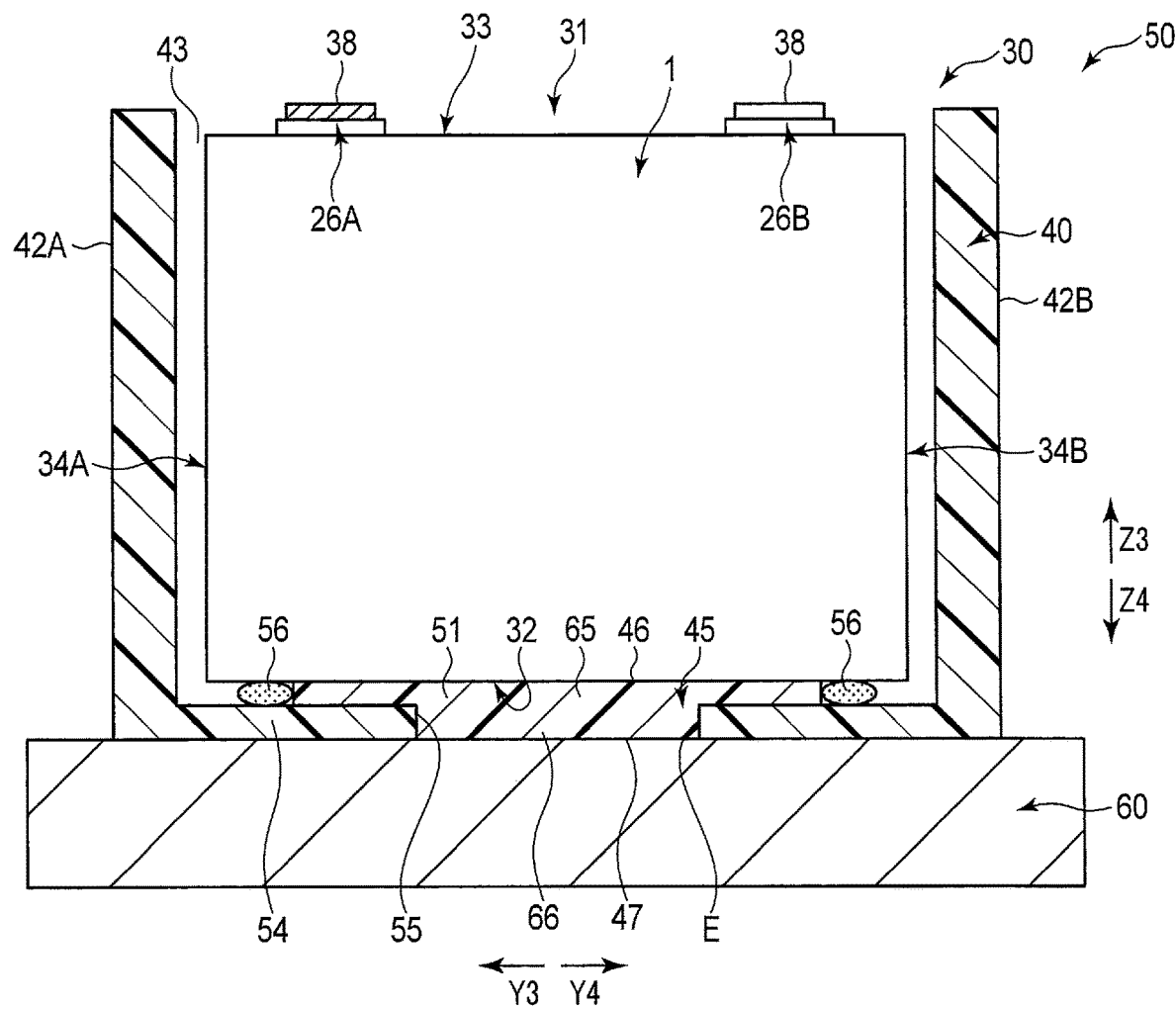
FIG. 15 is a schematic view illustrating an example of a battery system to which a battery pack according to an eleventh modification of the first embodiment is applied.

In an eleventh modification of the first embodiment illustrated in FIG. 15, the bottom plate 48 is not provided in the battery pack 30. The battery pack 30 of the present modification can also be used for the battery system 50 including the cooling plate 60 described above. In the battery system 50 using the battery pack 30 of the present modification, the lower ends (one end) of the frame sidewalls 41A, 41B, 42A, and 42B of the frame 40 abut on the cooling plate 60. The frame 40 is attached to the cooling plate 60 by bolts or the like, so that the battery pack 30 is installed on the outer surface of the cooling plate 60.

In the battery system 50 using the battery pack 30 of the present modification, the sheet bottom surface 47 of the sheet member 45 is in close contact with (adheres to) the cooling plate 60. In the example of FIG. 15, the layer (first layer) 51 of the sheet member 45 is in close contact with the cooling plate 60. In the present modification, the cooling plate 60 abuts on the frame protrusion portion 54 from the side opposite to the side where the battery module 31 is located in the height direction of the battery pack 30. The frame protrusion portion 54 is disposed between the module bottom surface 32 of the battery module 31 and the cooling plate 60.

Even in the present modification, the heat from the battery module 31 is appropriately transmitted to the cooling plate 60 through the sheet member 45. Even in the battery pack 30 of the present modification, the sheet member 45 and the frame protrusion portion 54 are provided, so that an insulating structure having high withstand voltage (dielectric strength) is appropriately formed by the battery pack 30.

Even in a twelfth modification of the first embodiment illustrated in FIG. 16, similarly to the eleventh modification, the bottom plate 48 is not provided in the battery pack 30. However, in the battery system 50 of the present modification, an insulating layer 75 is formed as a stacked portion stacked on the outer surface of the cooling plate 60. The insulating layer 75 is stacked with respect to the cooling plate 60 on the side where the battery module 31 is located in the height direction of the battery pack 30. The insulating layer 75 is formed of a material having an electrical insulating property, and is formed of, for example, the same material as the insulating layer 71 described above. Therefore, the insulating layer 75 has lower thermal conductivity and compressibility than the layer 51. In addition, the insulating layer 75 has higher mechanical strength and compression resistance than the layer 51. Note that the insulating layer 75 is thinner than the layer 51, and in an example, the insulating layer 75 has a layer thickness of 500 μm or less.

In the present modification, the insulating layer 75 abuts on the frame protrusion portion 54 and the sheet bottom surface 47 of the sheet member 45 from the side opposite to the side where the battery module 31 is located in the height direction of the battery pack 30. Therefore, the insulating layer 75 is sandwiched between the cooling plate 60 and the frame protrusion portion 54, and is sandwiched between the cooling plate 60 and the sheet member 45. The frame protrusion portion 54 and the sheet member 45 are disposed on the surface of the insulating layer 75 (stacked portion).

In the present modification, the insulating layer 75 is provided, but the layer thickness of the insulating layer 75 is small. Therefore, even in the present modification, the heat from the battery module 31 is appropriately transmitted to the cooling plate 60 through the sheet member 45 and the insulating layer 75. Therefore, even in the battery pack 30 of the present modification, the heat is appropriately released from the battery module 31 to the cooling plate 60.

In addition, the insulating layer 75 is formed of a material having a high electrical insulating property and has high mechanical strength. Therefore, even when the sheet member 45 is damaged by an external force, the battery module (battery set) 31 is appropriately electrically insulated from the cooling plate 60 by the insulating layer 75. Therefore, even when the sheet member is damaged by the external force, an insulating structure having high withstand voltage (dielectric strength) is appropriately formed by the insulating layer 75.

Here, similarly to the insulating layer 71, the insulating layer 75 is desirably thin from the viewpoint of heat dissipation. However, when the thickness of the insulating layer 75 is small, corona discharge (partial discharge) may occur. In the present modification, by using the sheet member 45 having a certain thickness, a corona discharge starting voltage can be increased corresponding to an increase in the thickness of the sheet member 45. The corona discharge starting voltage can also be adjusted by the dielectric constant of the sheet member 45.

When the insulating layer 75 is provided as in the modification of FIG. 16, the sheet member 45 does not need to be disposed between the frame protrusion portion 54 and the module bottom surface 32 of the battery module 31. However, the sheet member 45 is disposed between the module bottom surface 32 and the insulating layer 75. In a modification, in a configuration in which insulating layer is provided, similarly to the first embodiment, the sheet member 45 may be disposed between the frame protrusion portion 54 and the module bottom surface 32 of the battery module 31.

Further, even in the configuration in which the bottom plate 48 is not provided as in the eleventh modification, the twelfth modification, and the like, the configuration of the battery pack 30 can be modified as described above in the first modification, the third to eighth modifications, and the like, and the configurations described above in the first modification, the third to eighth modifications, and the like can be appropriately combined. That is, even in the configuration in which the bottom plate 48 is not provided, as described above, the shape, configuration, and the like of the sheet member 45 can be appropriately changed, and the presence or absence of the relay sheet 67, the adhesive layer 56, and the like can also be appropriately changed.

Further, in a modification, in a configuration in which the bottom plate 48 is not provided as in the eleventh modification, the twelfth modification, and the like, a projection may be formed on the cooling plate 60. In this case, the projection protrudes with respect to the other portion of the cooling plate 60 to the side where the battery module 31 is located in the height direction of the battery pack 30. In addition, a protrusion end of the projection of the cooling plate 60 abuts on the sheet member 45 and the like from the side opposite to the side where the battery module 31 is located. The projection of the cooling plate 60 is disposed on the inner peripheral side of the storage space 43 with respect to the protrusion end E of the frame protrusion portion 54. In addition, the projection of the cooling plate 60 is disposed in the through-hole 55 of the frame 40 and forms a solid portion disposed in the through-hole 55. Therefore, the solid portion disposed in the through-hole 55 is formed by a part of the cooling plate 60. Even in the present modification, the heat generated in the battery module 31 is appropriately transmitted to the cooling plate 60 through the sheet member 45 and the like. Therefore, even in the present modification, functions and effects similar to those of the above-described embodiment and the like are obtained.

The number of batteries 1 forming the battery module 31 is not limited to 6, and may be plural. The battery pack 30 may be provided with a plurality of battery modules. For example, in a thirteenth modification of the first embodiment illustrated in FIGS. 17 to 19, three battery modules 31A to 31C are provided in the battery pack 30. In the present modification, each of the battery modules 31A to 31C includes eight batteries 1. In each of the battery modules 31A to 31C, similarly to the battery module 31 described above, the plurality of batteries 1 are arrayed, and the partition plate 36 and the adhesive 37 are provided.

Figure 17:
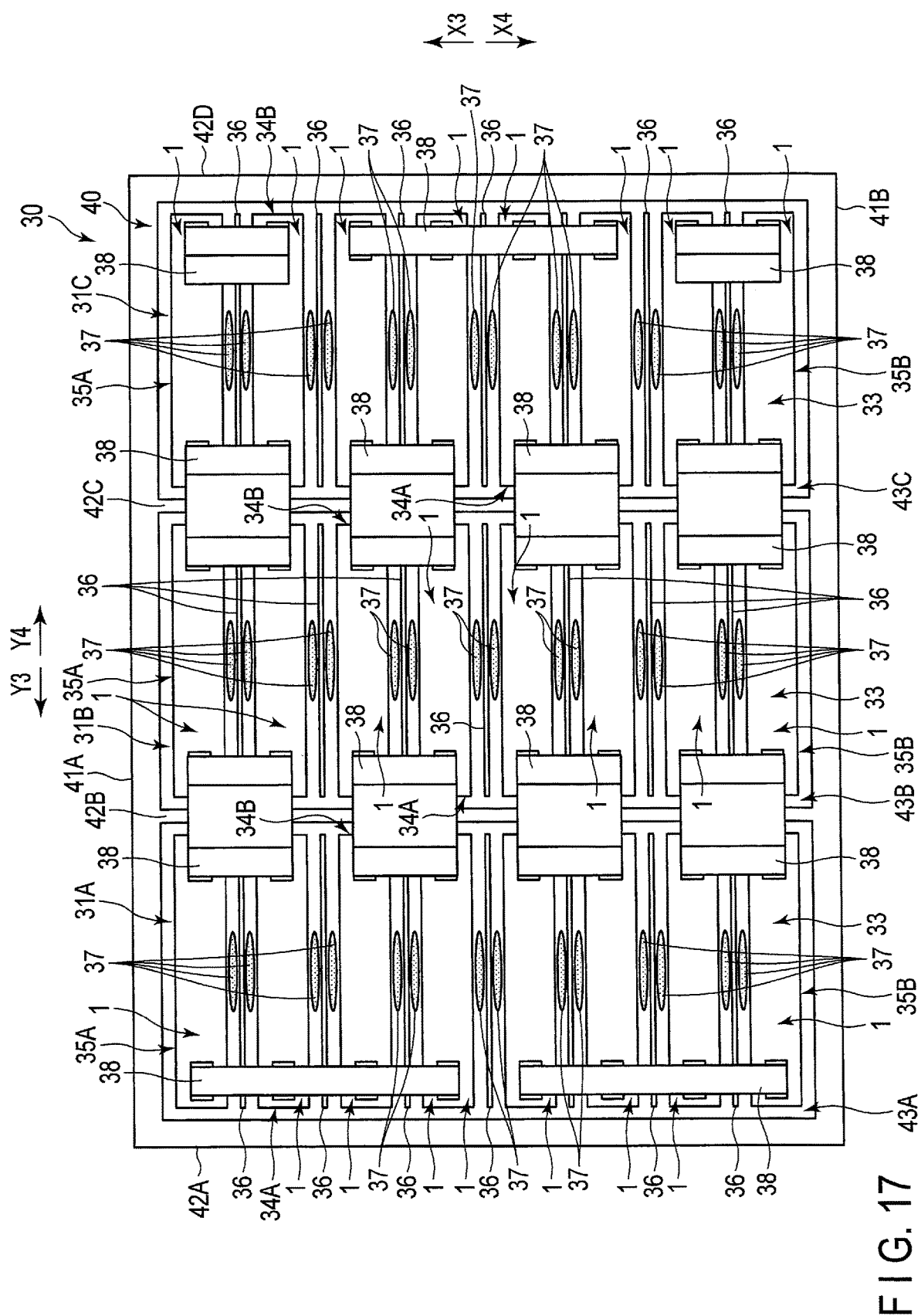
FIG. 17 is a schematic view illustrating a battery pack according to a thirteenth modification of the first embodiment as viewed from one side in a height direction.
Figure 18:
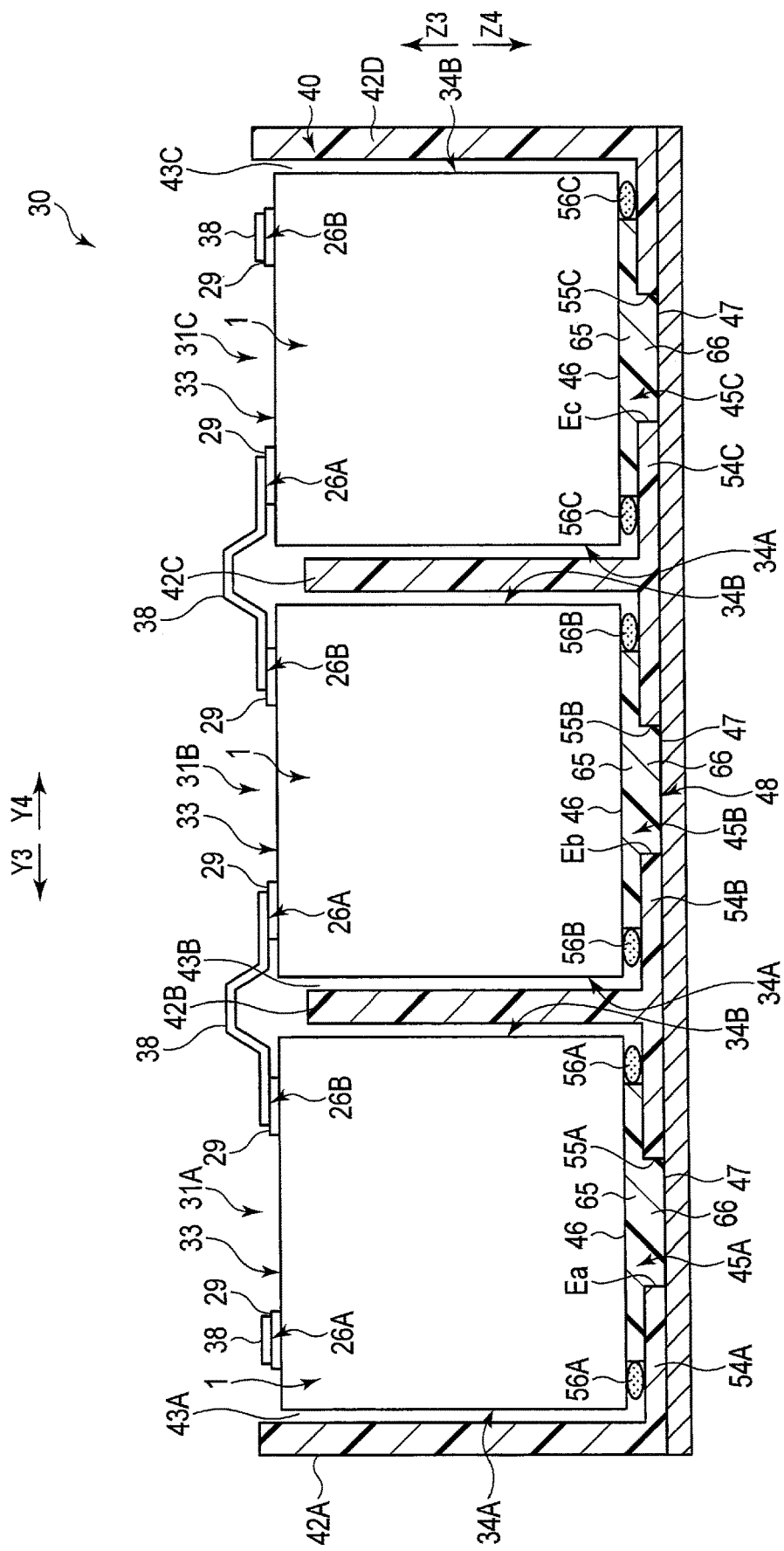
FIG. 18 is a cross-sectional view schematically illustrating the battery pack of FIG. 17 in a cross section perpendicular or substantially perpendicular to a depth direction.
Figure 19:
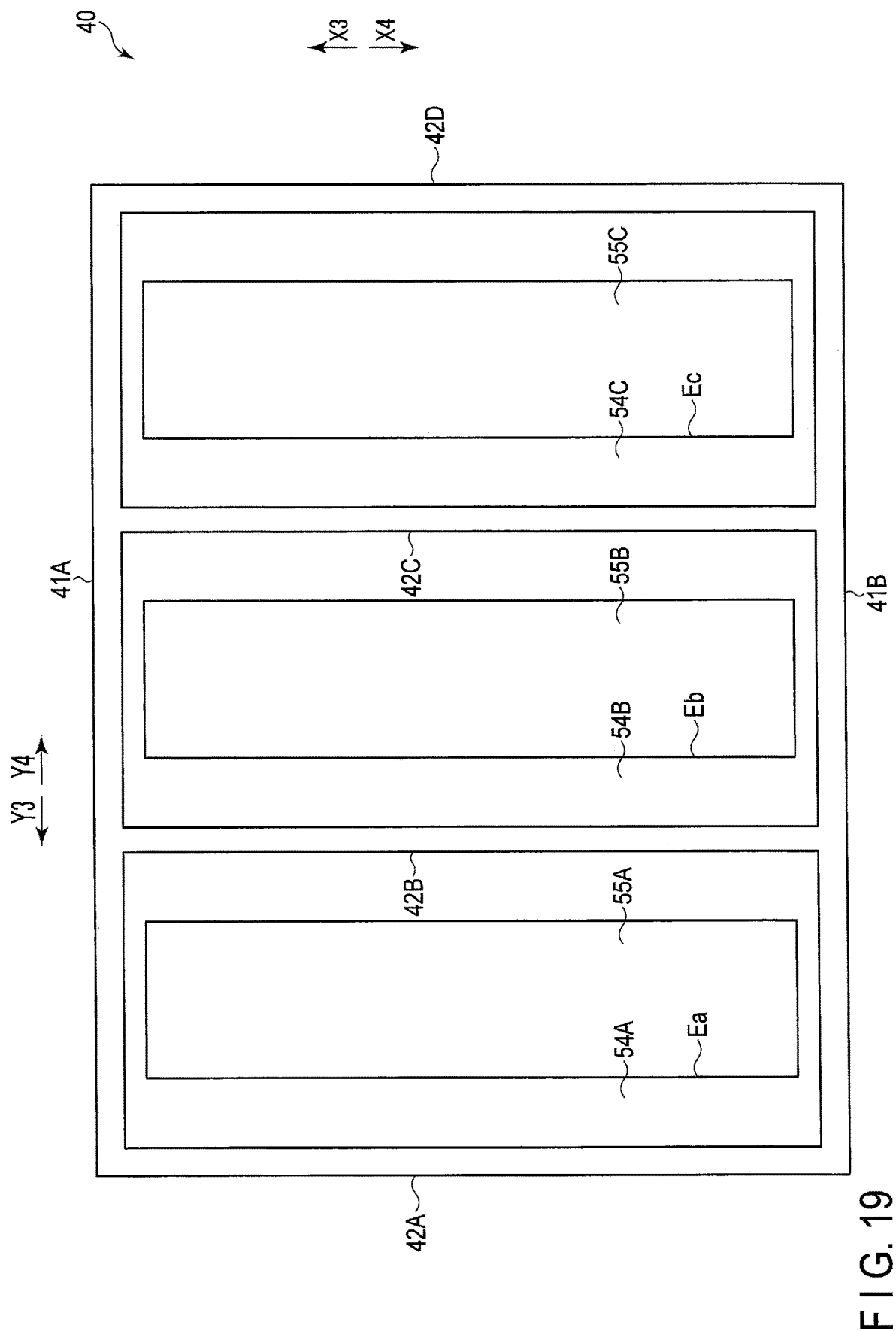
FIG. 19 is a schematic view illustrating a configuration of a frame of the battery pack according to the thirteenth modification of the first embodiment.

Even in the battery pack 30 of the present modification, similarly to the above-described embodiment and the like, a depth direction (a direction indicated by an arrow X3 and an arrow X4), a height direction (a direction indicated by an arrow Z3 and an arrow Z4) intersecting (perpendicular or substantially perpendicular to) the depth direction, and a width direction intersecting (perpendicular or substantially perpendicular to) both the depth direction and the height direction are defined. In each of the battery modules 31A to 31C, the array direction of the batteries 1 is matched or substantially matched with the depth direction of the battery pack 30. Here, FIG. 17 schematically illustrates the battery pack 30 as viewed from one side in the height direction (the side of an arrow Z3). FIG. 18 schematically illustrates the battery pack 30 in a cross section perpendicular or substantially perpendicular to the depth direction (the array direction of the batteries 1 in each of the battery modules 31A to 31C). FIG. 19 schematically illustrates a configuration of the frame 40.

Even in the present modification, the battery pack 30 includes the frame 40. The frame 40 includes the frame sidewalls 41A, 41B, and 42A to 42D. The frame sidewall 41A faces the module side surface 35A of each of the battery modules 31A to 31C from one side (the side of an arrow X3) in the depth direction of the battery pack 30. The frame sidewall 41B faces the module side surface 35B of each of the battery modules 31A to 31C from the side (the side of an arrow X4) opposite to the frame sidewall 41A in the depth direction of the battery pack 30. The battery module 31A is disposed between the frame sidewalls 42A and 42B in the width direction of the battery pack 30. The battery module 31B is disposed between the frame sidewalls 42B and 42C in the width direction of the battery pack 30, and the battery module 31C is disposed between the frame sidewalls 42C and 42D in the width direction of the battery pack 30.

With the above-described configuration, a surrounding frame surrounding the outer peripheral side of the battery module 31A is formed by the frame sidewalls 41A, 41B, 42A, and 42B. The frame sidewalls 41A, 41B, 42A, and 42B form a storage space 43A in which the battery module 31A is stored. Similarly, the frame sidewalls 41A, 41B, 42B, and 42C form a surrounding frame surrounding the outer peripheral side of the battery module 31B, and form a storage space 43B in which the battery module 31B is stored. The frame sidewalls 41A, 41B, 42C, and 42D form a surrounding frame surrounding the outer peripheral side of the battery module 31C, and form a storage space 43C in which the battery module 31C is stored. In the battery pack 30, the storage spaces 43A to 43C are partitioned from each other by the frame 40 (frame sidewalls 42B and 42C).

Even in the present modification, a plurality of bus bars 38 are provided in the battery pack 30. In each of the battery modules 31A to 31C, each of the plurality of batteries 1 is electrically connected to other batteries via the bus bar 38. Each of the battery modules 31A to 31C is electrically connected to other battery modules (corresponding two of 31A to 31C) and an external terminal of the battery pack 30 via the bus bar 38.

The battery pack 30 includes frame protrusion portions 54A to 54C. The frame protrusion portion 54A protrudes from one end (lower end) of each of the frame sidewalls 41A, 41B, 42A, and 42B to the inner peripheral side of the storage space 43A. The frame protrusion portion 54A supports the battery module 31A from the side toward which the module bottom surface 32 of the battery module 31A faces in the height direction of the battery pack 30.

Similarly, the frame protrusion portion 54B protrudes from one end (lower end) of each of the frame sidewalls 41A, 41B, 42B, and 42C to the inner peripheral side of the storage space 43B. The frame protrusion portion 54B supports the battery module 31B from the side where the module bottom surface 32 of the battery module 31B faces in the height direction of the battery pack 30. The frame protrusion portion 54C protrudes to the inner peripheral side of the storage space 43C from one end (lower end) of each of the frame sidewalls 41A, 41B, 42C, and 42D. The frame protrusion portion 54C supports the battery module 31C from the side where the module bottom surface 32 of the battery module 31C faces in the height direction of the battery pack 30. In the present modification, the bottom wall (frame bottom wall) of the frame 40 is formed by the frame protrusion portions 54A to 54C.

In the battery pack 30 of the present modification, the through-holes 55A to 55C are formed in the frame 40. At least a part of the edge of the through-hole 55A is formed by a protrusion end (inner end) Ea of the frame protrusion portion 54A. At least a part of the edge of the through-hole 55B is formed by a protrusion end (inner end) Eb of the frame protrusion portion 54B. At least a part of the edge of the through-hole 55C is formed by a protrusion end (inner end) Ec of the frame protrusion portion 54C.

The battery pack 30 of the present modification is provided with adhesive layers 56A to 56C. Each of the adhesive layers 56A to 56C is formed of a material similar to that of the adhesive layer 56 described above. The module bottom surface 32 of the battery module 31A is adhered to the frame protrusion portion 54A by the adhesive layer 56A. Similarly, the module bottom surface 32 of the battery module 31B is adhered to the frame protrusion portion 54B by the adhesive layer 56B. In addition, the module bottom surface 32 of the battery module 31C is adhered to the frame protrusion portion 54C by the adhesive layer 56C.

The battery pack 30 of the present modification includes sheet members 45A to 45C. Each of the sheet members 45A to 45C has a configuration similar to that of any one of the sheet members 45 of the above-described embodiment and the like. In an example of FIGS. 17 to 19, each of the sheet members 45A to 45C has a one-layer structure including only the layer 51, and includes the sheet body 65 and the sheet projection 66. In the present modification, the sheet top surface 46 of the sheet member 45A is in close contact with (adheres to) the module bottom surface 32 of the battery module 31A. Similarly, the sheet top surface 46 of the sheet member 45B is in close contact with the module bottom surface 32 of the battery module 31B. In addition, the sheet top surface 46 of the sheet member 45C is in close contact with the module bottom surface 32 of the battery module 31C. Further, in the present modification, the sheet member 45A is disposed in the through-hole 55A and forms a solid portion disposed in the through-hole 55A. Similarly, the sheet member 45B is disposed in the through-hole 55B and forms a solid portion disposed in the through-hole 55B. The sheet member 45C is disposed in the through-hole 55C and forms a solid portion disposed in the through-hole 55C.

In the battery pack 30 of the present modification, the bottom plate (support member) 48 is attached to the frame 40 from the side toward which the module bottom surface 32 of each of the battery modules 31A to 31C faces in the height direction of the battery pack 30. In each of the sheet members 45A to 45C, the sheet bottom surface 47 is in close contact with the bottom plate 48. Further, the bottom plate 48 abuts on each of the frame protrusion portions 54A to 54C from the side opposite to the side where the battery modules 31A to 31C are located in the height direction of the battery pack 30. Therefore, the frame protrusion portion 54A is disposed between the bottom plate 48 and the module bottom surface 32 of the battery module 31A. Similarly, the frame protrusion portion 54B is disposed between the bottom plate 48 and the module bottom surface 32 of the battery module 31B, and the frame protrusion portion 54C is disposed between the bottom plate 48 and the module bottom surface 32 of the battery module 31C.

The battery pack 30 of the present modification can also be used for the battery system 50 including the cooling plate 60 described above. In the battery system 50 using the battery pack 30 of the present modification, the bottom plate 48 abuts on the cooling plate 60.

In the present modification, the heat generated in the battery module 31A is appropriately transmitted to the bottom plate 48 and the cooling plate 60 through the sheet member 45A. A transmission path of the heat from the battery module 31A passing through the sheet member 45A and the bottom plate 48 passes through the solid portion disposed in the through-hole 55A of the frame 40. Similarly, the heat generated in the battery module 31B is appropriately transmitted to the bottom plate 48 and the cooling plate 60 through the sheet member 45B. A transmission path of the heat from the battery module 31B passing through the sheet member 45B and the bottom plate 48 passes through the solid portion disposed in the through-hole 55B of the frame 40. The heat generated in the battery module 31C is appropriately transmitted to the bottom plate 48 and the cooling plate 60 through the sheet member 45C. A transmission path of the heat from the battery module 31C passing through the sheet member 45C and the bottom plate 48 passes through the solid portion disposed in the through-hole 55C of the frame 40. Therefore, in the battery pack 30 of the present modification, the heat is appropriately released from each of the battery modules 31A to 31C to the cooling plate 60.

In the present modification, the battery module 31A is appropriately electrically insulated from the bottom plate 48 and the cooling plate 60 by the sheet member 45A and the frame protrusion portion 54A. Similarly, the battery module 31B is appropriately electrically insulated from the bottom plate 48 and the cooling plate 60 by the sheet member 45B and the frame protrusion portion 54B. The battery module 31C is appropriately electrically insulated from the bottom plate 48 and the cooling plate 60 by the sheet member 45C and the frame protrusion portion 54C. Therefore, even in the present modification, an insulating structure having high withstand voltage (dielectric strength) is appropriately formed by the battery pack 30.

In a modification, in the configuration in which the plurality of battery modules (for example, 31A to 31C) are provided in the battery pack 30 as in the thirteenth modification, each of the sheet members (for example, 45A to 45C) may be modified as in the sheet member 45 of any one of the first to seventh modifications. In the configuration in which the plurality of battery modules (for example, 31A to 31C) are provided in the battery pack 30, the bottom plate 48 may be modified as in the second modification, or the insulating sheet may be provided corresponding to each of the battery modules as in the eighth modification.

In a modification, in the configuration in which the plurality of battery modules (for example, 31A to 31C) are provided in the battery pack 30 as in the thirteenth modification, the insulating layer 71 (stacked portion) may be stacked with respect to the bottom plate 48 as in the ninth modification and the tenth modification. In the configuration in which the plurality of battery modules (for example, 31A to 31C) are provided in the battery pack 30, the bottom plate 48 may not be provided as in the eleventh modification and the twelfth modification. In this case, the insulating layer 75 (stacked portion) may be stacked with respect to the cooling plate 60 as in the twelfth modification.

Further, in a fourteenth modification of the first embodiment illustrated in FIG. 20, a configuration of the partition plate 36 provided in the battery module 31 (31A to 31C) is different from those of the above-described embodiment and the like. In the present modification, each partition plate 36 includes a partition plate body 76 and a surface insulating layer 77 formed on an outer surface of the partition plate body 76. The partition plate body 76 is formed of a metal. Therefore, the partition plate body 76 has higher thermal conductivity than the frame 40. Further, the surface insulating layer 77 is formed by surface-modifying the metal forming the partition plate body 76 in a state of having an electrical insulating property. For example, the surface insulating layer 77 is an oxide film obtained by oxidizing the metal forming the partition plate body 76. In an example, the partition plate body 76 includes aluminum, and the surface insulating layer 77 is an alumite layer formed by alumite treatment. In the configuration in which the partition plate 36 is formed as in the present modification, a corresponding one of the partition plates 36 may abut on the outer surface of the lid 6 and the outer surface of the bottom wall (container bottom wall) 11 in each of the batteries 1, in the battery module 31.

In the present modification, the partition plate body 76 is formed of a metal having high thermal conductivity. Therefore, in the battery module 31 (31A to 31C), the heat is also transmitted from each of the batteries 1 to the sheet member 45 through the partition plate 36. Therefore, the heat dissipation from the battery module 31 (31A to 31C) is further improved. In addition, in the present modification, since the surface insulating layer 77 is formed by surface modification of the metal, the thickness of the partition plate 36 can be reduced as compared with a case where the insulating layer is formed of a resin or the like on the outer surface of the metal plate. Each of the partition plates 36 is thinned, so that miniaturization of the battery module 31 (31A to 31C) can be realized.

Second Embodiment

Figure 21:
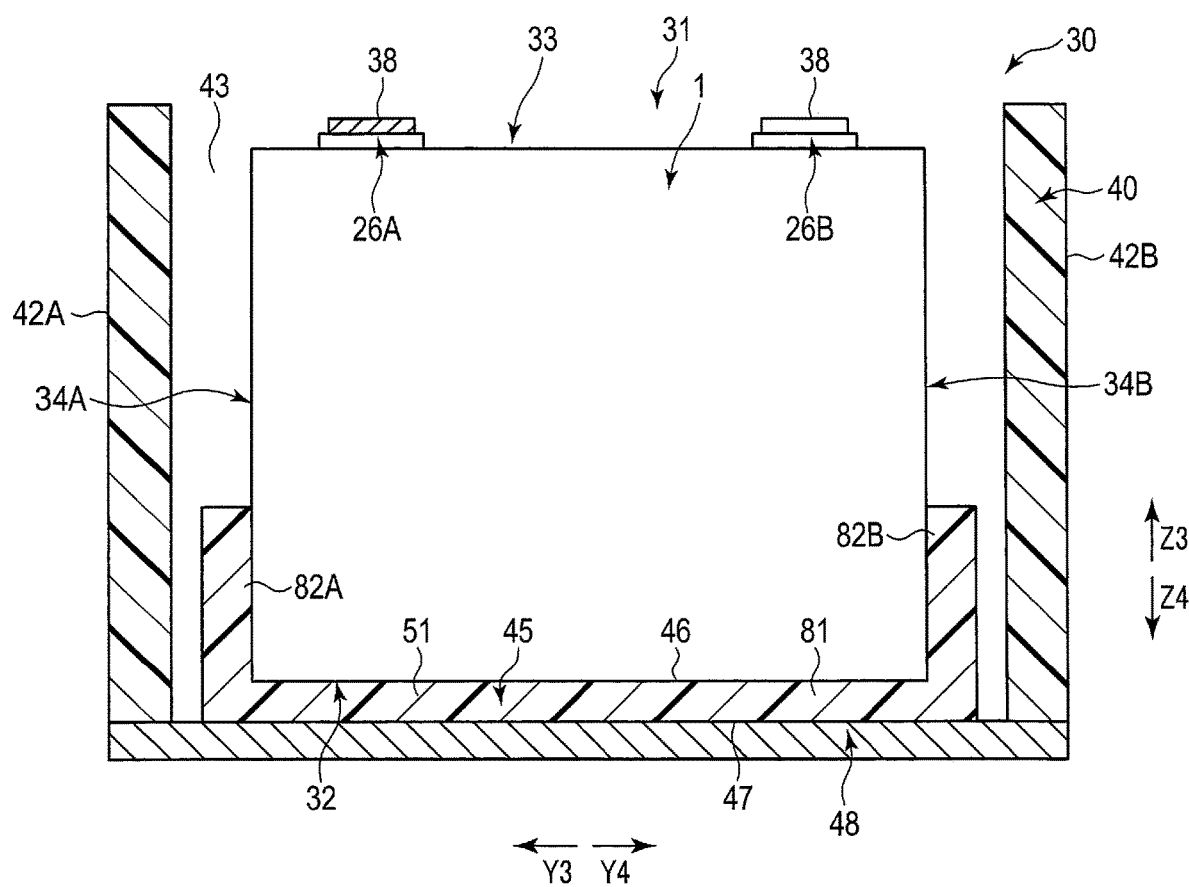
FIG. 21 is a cross-sectional view schematically illustrating a battery pack according to a second embodiment in a cross section perpendicular or substantially perpendicular to an array direction of batteries.
Figure 22:
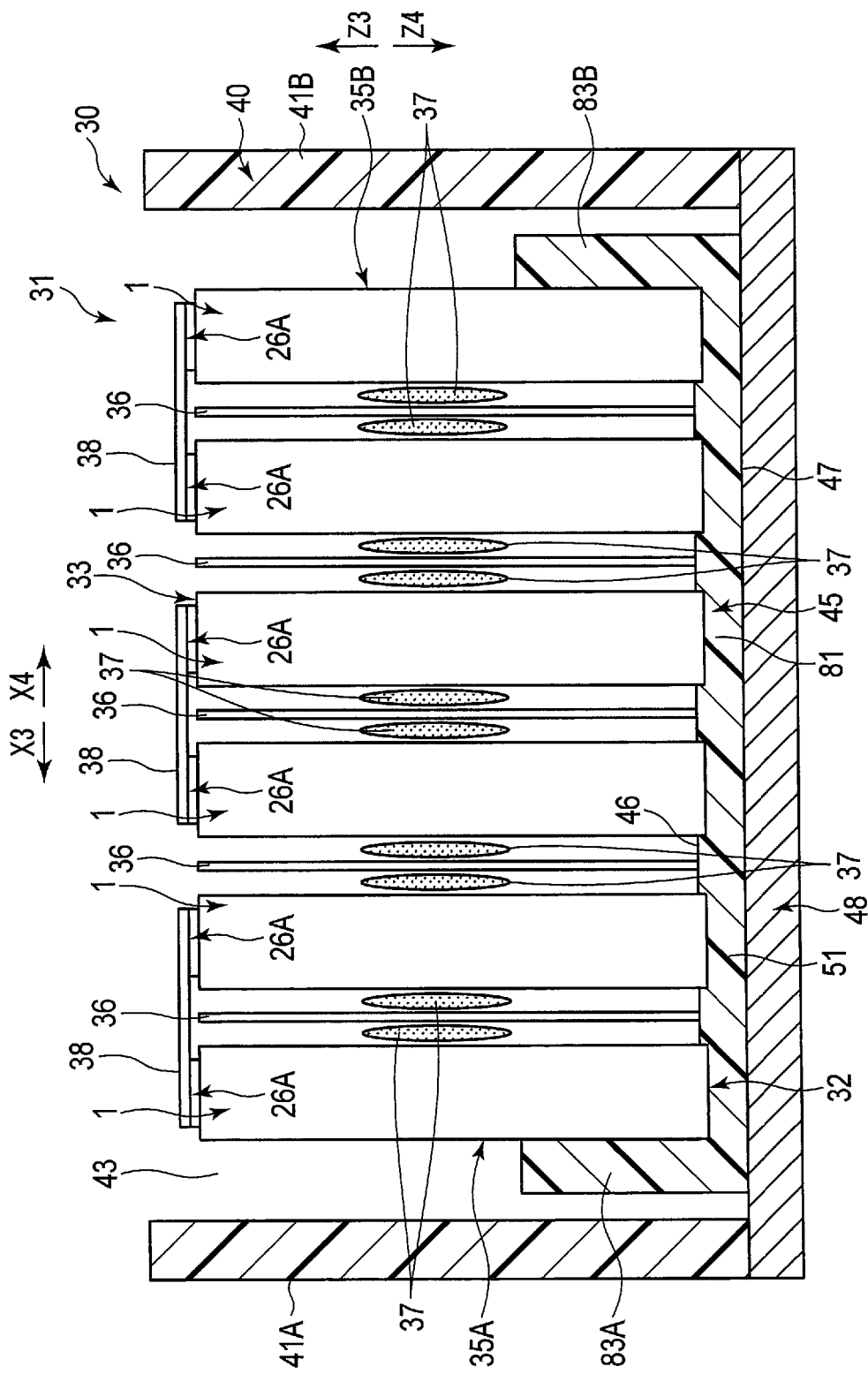
FIG. 22 is a cross-sectional view schematically illustrating the battery pack of FIG. 21 in a cross section perpendicular or substantially perpendicular to a width direction.

Next, a battery pack 30 according to a second embodiment will be described with reference to FIGS. 21 to 23. As illustrated in FIGS. 21 and 22, even in the present embodiment, a battery module 31 is formed, similarly to the above-described embodiment and the like. In addition, a storage space 43 of a battery module 31 is formed by frame sidewalls 41A, 41B, 42A, and 42B of a frame 40. The battery module 31 has a module bottom surface 32, a module top surface 33, and module side surfaces 34A, 34B, 35A, and 35B as in the above-described embodiment and the like, and is disposed in the storage space 43 as in the above-described embodiment and the like. FIG. 21 schematically illustrates the battery pack 30 in a cross section perpendicular or substantially perpendicular to an array direction of batteries 1 (a direction indicated by an arrow X3 and an arrow X4), and FIG. 22 schematically illustrates the battery pack 30 in a cross section perpendicular or substantially perpendicular to a width direction (a direction indicated by an arrow Y3 and an arrow Y4).

Even in the present embodiment, a sheet member 45 is provided, similarly to the above-described embodiment and the like. In addition, similarly to the first embodiment and the like, the sheet member 45 is formed in a one-layer structure of only a layer (high conductive layer) 51. However, in the present embodiment, unlike the above-described embodiment and the like, a frame protrusion portion 54 (54A to 54C) is not formed in the frame 40. In the present embodiment, the sheet member 45 includes a sheet body 81 and sheet protrusion portions 82A, 82B, 83A, and 83B. The sheet protrusion portions 82A, 82B, 83A, and 83B are formed integrally with the sheet body 81.

In the present embodiment, the layer (high conductive layer) 51 is formed over the sheet body 81 and the sheet protrusion portions 82A, 82B, 83A, and 83B. Therefore, the layer 51 is formed over an entire range in which the sheet body 81 and the sheet protrusion portions 82A, 82B, 83A, and 83B extend in the sheet member 45. In addition, the sheet body 81 is in close contact with the module bottom surface 32 of the battery module 31. In the sheet body 81, the layer 51 adheres to the module bottom surface 32. Further, the sheet body 81 is in close contact with the module bottom surface 32 at the sheet top surface 46.

Each of the sheet protrusion portions 82A, 82B, 83A, and 83B protrudes from the sheet body 81 to the side where the battery module 31 is located in the height direction of the battery pack 30. The sheet protrusion portion 82A protrudes from one end of the sheet body 81 in the width direction of the battery pack 30, and the sheet protrusion portion 82B protrudes from the other end of the sheet body 81 in the width direction of the battery pack 30. The sheet protrusion portion 82A is disposed between the frame sidewall 42A and the module side surface 34A in the storage space 43, and faces the module side surface 34A from the outer peripheral side. The sheet protrusion portion 82B is disposed between the frame sidewall 42B and the module side surface 34B in the storage space 43, and faces the module side surface 34B from the outer peripheral side.

The sheet protrusion portion 83A protrudes from one end of the sheet body 81 in the depth direction of the battery pack 30 (an array direction of the batteries 1), and the sheet protrusion portion 83B protrudes from the other end of the sheet body 81 in the depth direction of the battery pack 30. The sheet protrusion portion 83A is disposed between the frame sidewall 41A and the module side surface 35A in the storage space 43, and faces the module side surface 35A from the outer peripheral side. The sheet protrusion portion 83B is disposed between the frame sidewall 41B and the module side surface 35B in the storage space 43, and faces the module side surface 35B from the outer peripheral side.

The sheet protrusion portion 82A forms a close contact portion that is in close contact with the module side surface 34A and a corner portion between the module bottom surface 32 and the module side surface 34A. In the close contact portion formed by the sheet protrusion portion 82A, the layer 51 is in close contact with (adheres to) the module side surface 34A and the corner portion. Further, the sheet protrusion portion 82A is in close contact with the module side surface 34A and the corner portion at the sheet top surface 46. Further, the sheet protrusion portion 82B forms a close contact portion that is in close contact with the module side surface 34B and a corner portion between the module bottom surface 32 and the module side surface 34B. In the close contact portion formed by the sheet protrusion portion 82B, the layer 51 is in close contact with (adheres to) the module side surface 34B and the corner portion. Further, the sheet protrusion portion 82B is in close contact with the module side surface 34B and the corner portion at the sheet top surface 46.

The sheet protrusion portion 83A forms a close contact portion that is in close contact with the module side surface 35A and a corner portion between the module bottom surface 32 and the module side surface 35A. In the close contact portion formed by the sheet protrusion portion 83A, the layer 51 is in close contact with (adheres to) the module side surface 35A and the corner portion. Further, the sheet protrusion portion 83A is in close contact with the module side surface 35A and the corner portion at the sheet top surface 46. Further, the sheet protrusion portion 83B forms a close contact portion that is in close contact with the module side surface 35B and a corner portion between the module bottom surface 32 and the module side surface 35B. In the close contact portion formed by the sheet protrusion portion 83B, the layer 51 is in close contact with (adheres to) the module side surface 35B and the corner portion. Further, the sheet protrusion portion 83B is in close contact with the module side surface 35B and the corner portion at the sheet top surface 46.

In the battery pack 30 of the present embodiment, a bottom plate (support member) 48 is attached to the frame 40 from the side toward which the module bottom surface 32 faces in the height direction of the battery pack 30. The bottom plate 48 supports the battery module 31 and the sheet member 45 from the side to which the module bottom surface 32 is directed in the height direction of the battery pack 30. In the present embodiment, the bottom plate 48 abuts on the sheet body 81 of the sheet member 45 from the side opposite to the side where the battery module 31 is located in the height direction of the battery pack 30. In the sheet body 81, the layer 51 adheres to the bottom plate 48. The sheet body 81 is in close contact with the bottom plate 48 at the sheet bottom surface 47. In the present embodiment, heat generated in the battery module 31 is transmitted to the bottom plate 48 through the sheet member 45.

Figure 23:
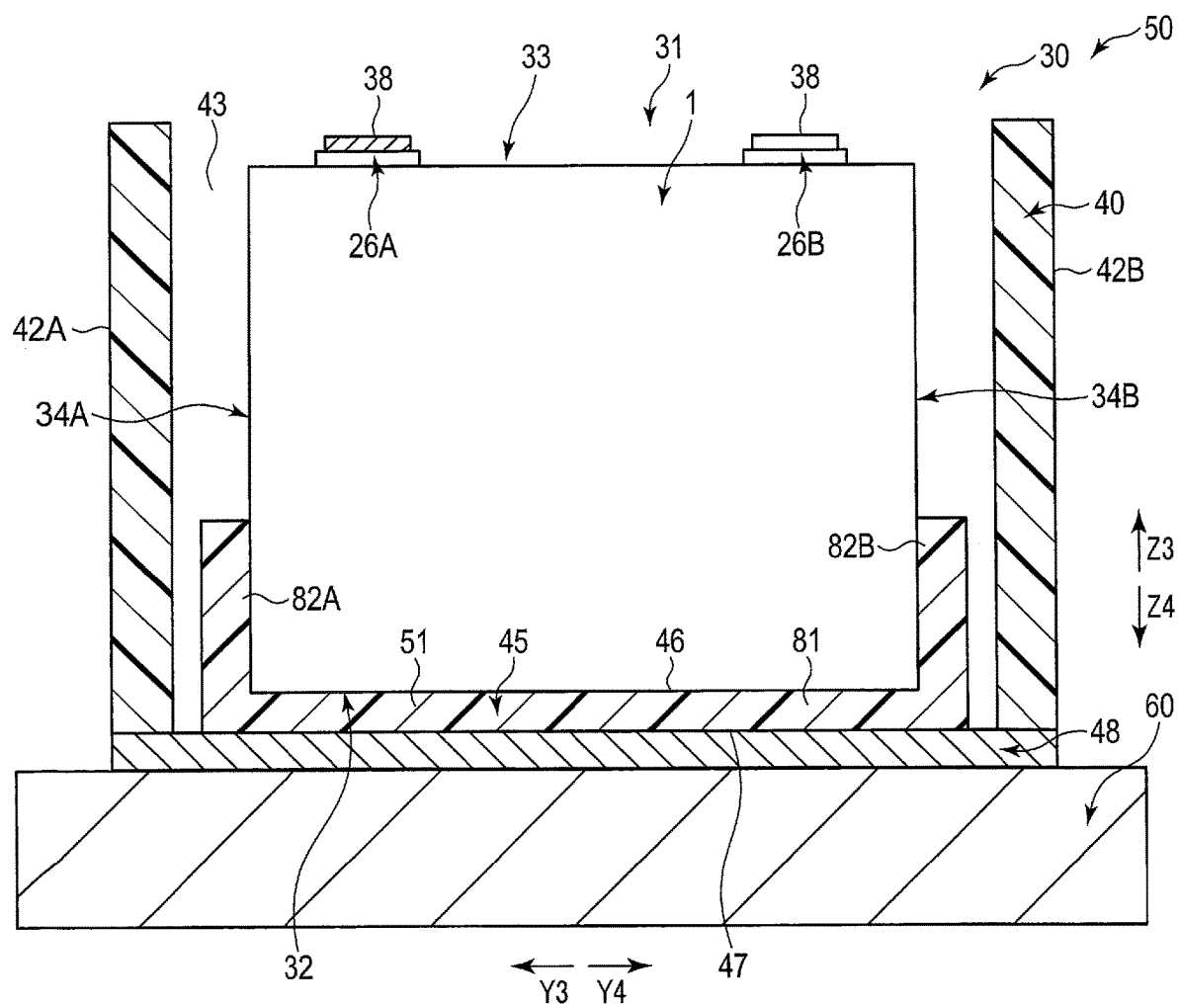
FIG. 23 is a schematic view illustrating an example of a battery system to which the battery pack according to the second embodiment is applied.

As illustrated in FIG. 23, the battery pack 30 of the present embodiment can also be used for a battery system 50 including a cooling plate 60 described above. That is, the battery pack 30 of the present embodiment is installed on an outer surface of the cooling plate 60. In the present embodiment, the bottom plate 48 abuts on the cooling plate 60. Therefore, the cooling plate 60 is provided on the side opposite to the side where the battery module 31 is located with respect to the sheet member 45 in the height direction of the battery pack 30.

In the present embodiment, the heat generated in the battery module 31 is transmitted to the cooling plate 60 via a transmission path passing through the sheet member 45 and the bottom plate 48. The layer 51 of the sheet member 45 has higher thermal conductivity than the frame 40 and the partition plate 36. The sheet member 45 of the present embodiment is formed of only the layer 51. Therefore, the heat from the battery module 31 is appropriately transmitted to the cooling plate 60 through the sheet member 45 and the bottom plate 48. Therefore, in the battery pack 30, the heat is appropriately released from the battery module 31 to the cooling plate 60.

In the present embodiment, since the sheet member 45 is provided with the sheet protrusion portions 82A, 82B, 83A, and 83B, the sheet member 45 is in close contact with not only the module bottom surface 32 but also the module side surfaces 34A, 34B, 35A, and 35B and the corner portions between each of the module side surfaces 34A, 34B, 35A, and 35B and the module bottom surface 32. Therefore, the heat generated in the battery module 31 is transmitted to the sheet member 45 not only from the module bottom surface 32 but also from the module side surfaces 34A, 34B, 35A, and 35B and the corner portions between each of the module side surfaces 34A, 34B, 35A, and 35B and the module bottom surface 32. Therefore, in the battery pack 30, heat dissipation from the battery module 31 to the cooling plate 60 is improved.

In the battery pack 30 of the present embodiment, the frame sidewalls 41A, 41B, 42A, and 42B surrounding the battery module 31 are formed of a material having a high electrical insulating property. The sheet member 45 in close contact with the module bottom surface 32 and the module side surfaces 34A, 34B, 35A, and 35B is also formed of a material having a high electrical insulating property. Therefore, in the battery system 50, an insulating structure having high withstand voltage (dielectric strength) is appropriately formed by the battery pack 30.

In the present embodiment, an insulation distance between the plurality of batteries 1 of the battery module 31 and the bottom plate 48 can be increased by the sheet protrusion portions 82A, 82B, 83A, and 83B. By increasing the insulation distance between the plurality of batteries 1 of the battery module 31 and the bottom plate 48, an insulating structure having higher withstand voltage (dielectric strength) is formed.

Modification of Second Embodiment

In a modification, as described above in the modification of the first embodiment, the sheet member 45 is formed in a multi-layer structure such as a three-layer structure including the layers 51 to 53. In this case, each of the layers (for example, 51 to 53) is formed over the sheet body 81 and the sheet protrusion portions 82A, 82B, 83A, and 83B. Therefore, each of the layers (for example, 51 to 53) is formed over the entire range in which the sheet body 81 and the sheet protrusion portions 82A, 82B, 83A, and 83B extend in the sheet member 45.

In the above-described embodiment and the like, all of the sheet protrusion portions 82A, 82B, 83A, and 83B are provided in the sheet member 45, but at least one of the sheet protrusion portions 82A, 82B, 83A, and 83B may be provided in the sheet member 45.

In a first modification of the second embodiment illustrated in FIG. 24, as described above in the modification of the first embodiment, the battery pack 30 includes an insulating layer 71 (stacked portion). The insulating layer 71 to be the stacked portion is stacked with respect to the bottom plate 48 on the side where the battery module 31 is located in the height direction of the battery pack 30.

In the present modification, the insulating layer 71 abuts on the sheet body 81 of the sheet member 45 from the side opposite to the side where the battery module 31 is located in the height direction of the battery pack 30. The sheet body 81 is in close contact with the insulating layer 71 at the sheet bottom surface 47. Therefore, the insulating layer 71 is sandwiched between the bottom plate 48 and the sheet body 81 of the sheet member 45. The sheet body 81 of the sheet member 45 is disposed on a surface of the insulating layer 71 (stacked portion). Note that the stacked portion 71 may be formed integrally with the bottom plate 48.

In a second modification of the second embodiment illustrated in FIG. 25, as described above in the modification of the first embodiment, the bottom plate 48 is not provided in the battery pack 30. The battery pack 30 of the present modification can also be used for the battery system 50 including the cooling plate 60 described above. In the battery system 50 using the battery pack 30 of the present modification, the lower ends (one end) of the frame sidewalls 41A, 41B, 42A, and 42B of the frame 40 abut on the cooling plate 60. The battery pack 30 is installed on an outer surface of the cooling plate 60.

In the battery system 50 using the battery pack 30 of the present modification, the sheet body 81 of the sheet member 45 is in close contact with (adheres to) the cooling plate 60. The sheet body 81 is in close contact with the cooling plate 60 at the sheet bottom surface 47. Even in the present modification, the heat from the battery module is appropriately transmitted to the cooling plate 60 through the sheet member 45. In addition, since the sheet member 45 is provided even in the battery pack 30 of the present modification, an insulating structure having high withstand voltage (dielectric strength) is appropriately formed by the battery pack 30.

Figure 26:
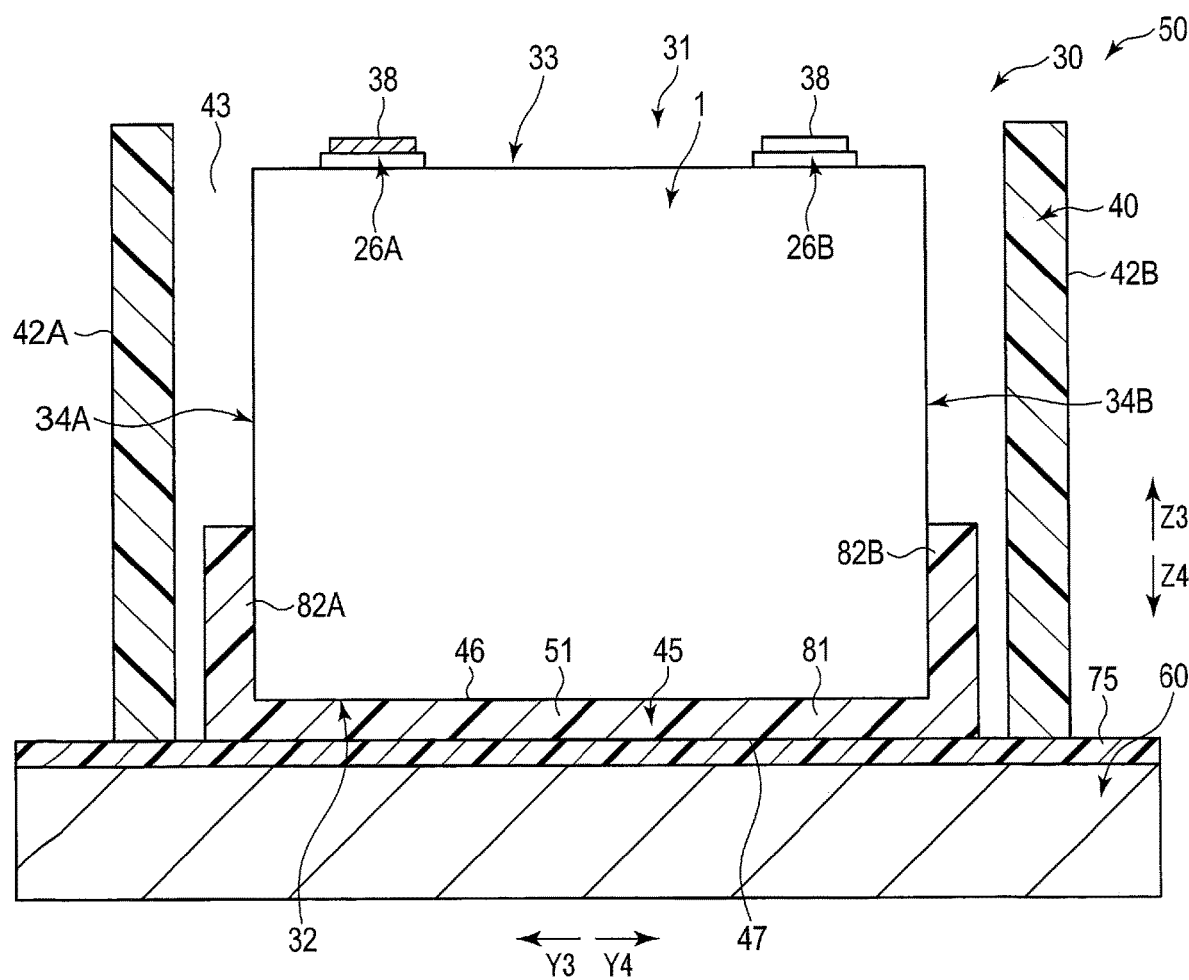
FIG. 26 is a schematic view illustrating an example of a battery system to which a battery pack according to a third modification of the second embodiment is applied.

Even in a third modification of the second embodiment illustrated in FIG. 26, similarly to the second modification, the bottom plate 48 is not provided in the battery pack 30. However, in the battery system 50 of the present modification, the insulating layer 75 is formed as described above in the modification of the first embodiment. The insulating layer 75 to be the stacked portion is stacked with respect to the cooling plate 60 on the side where the battery module 31 is located in the height direction of the battery pack 30.

In the present modification, the insulating layer 75 abuts on the sheet body 81 of the sheet member 45 from the side opposite to the side where the battery module 31 is located in the height direction of the battery pack 30. The sheet body 81 is in close contact with the insulating layer at the sheet bottom surface 47. Therefore, the insulating layer 75 is sandwiched between the cooling plate 60 and the sheet body 81 of the sheet member 45. The sheet body 81 of the sheet member 45 is disposed on a surface of the insulating layer 71 (stacked portion).

In a modification, as described above in the modification of the first embodiment, a plurality of battery modules (for example, 31A to 31C) are provided in the battery pack 30, and the same number of sheet members (for example, 45A to 45C) as the battery modules (31A to 31C) are provided. In the present modification, each of the sheet members (45A to 45C) includes the sheet body 81 and any one of the sheet protrusion portions 82A, 82B, 83A, and 83B, similarly to the sheet member 45 of the second embodiment and the like. In the present modification, each of the sheet members (45A to 45C) is in close contact with a corresponding one of the battery modules (31A to 31C), similarly to the close contact of the sheet member 45 to the battery module 31 in the second embodiment and the like.

In a fourth modification of the second embodiment illustrated in FIG. 27, the sheet member 45 is not provided with the sheet protrusion portions 82A, 82B, 83A, and 83B, and the sheet member 45 is formed of only the sheet body 81. Even in the present modification, the sheet body 81 is in close contact with the module bottom surface 32 of the battery module 31. In the present modification, similarly to the first modification of the second embodiment and the like, the insulating layer 71 to be a stacked portion is stacked with respect to the bottom plate 48 on the side where the battery module 31 is located in the height direction of the battery pack 30. The insulating layer 71 abuts on the sheet body 81 of the sheet member 45 from the side opposite to the side where the battery module 31 is located in the height direction of the battery pack 30. Therefore, the insulating layer 71 is sandwiched between the bottom plate 48 and the sheet body 81 of the sheet member 45.

In the present modification, the battery pack 30 is provided with insulating sheets 85A and 85B formed of a material having an electrical insulating property. Each of the insulating sheets 85A and 85B is a separated body from the frame 40 and the sheet member 45. The insulating sheets 85A and 85B are disposed on the outer peripheral side with respect to the sheet member 45 in the storage space 43 of the battery module 31. The insulating sheet 85A is adjacent to the sheet member 45 on one side in the width direction of the battery pack 30. The insulating sheet 85B is adjacent to the sheet member 45 on the other side in the width direction of the battery pack 30. Therefore, each of the insulating sheets 85A and 85B is adjacent to the outer side with respect to the sheet member 45 in the width direction of the battery pack 30.

Each of the insulating sheets 85A and 85B is in close contact with the module bottom surface 32 of the battery module 31 at a portion located on the outer peripheral side of the storage space 43 with respect to the sheet member 45. The insulating sheet 85A forms a close contact portion that is in close contact with the module side surface 34A and a corner portion between the module bottom surface 32 and the module side surface 34A. Further, the insulating sheet 85B forms a close contact portion that is in close contact with the module side surface 34B and a corner portion between the module bottom surface 32 and the module side surface 34B.

Each of the insulating sheets 85A and 85B has a higher tracking index in a tracking resistance test of an IEC standard than the frame 40. In an example, in each of the insulating sheets 85A and 85B, the tracking index in the tracking resistance test of the IEC standard is 400 V or more. When the tracking index in the tracking resistance test of the IEC standard is 400 V or more, the material forming each of the insulating sheets 85A and 85B includes, for example, polybutylene terephthalate (PBT). In the present modification, even in the insulating layer 71, the tracking index in the tracking resistance test of the IEC standard is 400 V or more.

In the present modification, as described above, the insulating layer 71 is provided, and the insulating sheets 85A and 85B having a high tracking index in the tracking resistance test of the IEC standard are provided.

Therefore, even if the insulation distance between the plurality of batteries 1 of the battery module 31 and the bottom plate 48 is decreased, for example, by reducing the thickness of the frame sidewalls 42A and 42B, an insulating structure having high withstand voltage (dielectric strength) is formed by the battery pack 30. In addition, since the insulating sheets 85A and 85B having a high tracking index in the tracking resistance test of the IEC standard are provided, a material having a low tracking index (for example, 175 V or less) in the tracking resistance test of the IEC standard can be used as the resin for forming the frame 40. As a result, options of materials for forming the frame 40 are widened.

In a modification, at least one of the insulating sheets 85A and 85B is in close contact with the module side surface 35A and a corner portion between the module bottom surface 32 and the module side surface 35A to form a close contact portion. In addition, at least one of the insulating sheets 85A and 85B is in close contact with the module side surface 35B and a corner portion between the module bottom surface 32 and the module side surface 35B to form a close contact portion.

In another modification, the battery pack 30 is provided with an insulating sheet in which the tracking index in the tracking resistance test of the IEC standard is almost equal to those of the insulating sheets 85A and 85B, in addition to the insulating sheets 85A and 85B. The insulating sheet to be additionally provided is disposed on the outer peripheral side with respect to the sheet member 45 in the storage space 43 of the battery module 31, and is adjacent to the outer side with respect to the sheet member 45 in the depth direction of the battery pack 30. The insulating sheet to be additionally provided is in close contact with the module side surface 35A and a corner portion between the module bottom surface 32 and the module side surface 35A to form a close contact portion. Further, the insulating sheet to be additionally provided is in close contact with the module side surface 35B and a corner portion between the module bottom surface 32 and the module side surface 35B to form a close contact portion.

Further, in a modification, the bottom plate 48 is not provided in the configuration in which the insulating sheets 85A, 85B and the like are provided as in the fourth modification of the second embodiment. In this case, the insulating layer 75 (stacked portion) described above is formed on the outer surface of the cooling plate 60.

Further, even in a fifth modification of the second embodiment illustrated in FIG. 28, similarly to the fourth modification of the second embodiment, the insulating sheets 85A and 85B are provided. However, in the present modification, an adhesive layer 56 is formed between the sheet member 45 and each of the insulating sheets 85A and 85B in the width direction of the battery module 31. The module bottom surface 32 of the battery module 31 is adhered to the insulating layer 71 by the adhesive layer 56. In the present modification, the module side surface 34A is adhered to the frame sidewall 42A of the frame 40 by the adhesive layer 56, and the module side surface 34B is adhered to the frame sidewall 42B of the frame 40 by the adhesive layer 56. On the module side surface 34A, the adhesive layer 56 is disposed on the side where the module top surface 33 is located with respect to the insulating sheet 85A. On the module side surface 34B, the adhesive layer 56 is disposed on the side where the module top surface 33 is located with respect to the insulating sheet 85B. In a modification, the adhesive layer 56 may be formed only at any one, two, or three of the four positions illustrated in the modification of FIG. 28.

In a modification, as described above in the modification of the first embodiment, a plurality of battery modules (for example, 31A to 31C) are provided in the battery pack 30, and the same number of sheet members (for example, 45A to 45C) as the battery modules (31A to 31C) are provided. In the present modification, in each of storage spaces (for example, 43A to 43C) in which a corresponding one of the sheet members (45A to 45C) is disposed, the insulating sheets 85A and 85B described above in the fourth modification of the second embodiment and the like are provided on the outer peripheral side with respect to the corresponding one of the sheet members (45A to 45C). Each of the insulating sheets 85A and 85B and the like is in close contact with a corresponding one of the battery modules (31A to 31C), similarly to the close contact of the insulating sheets 85A and 85B to the battery module 31 in the fourth modification of the second embodiment and the like.

In a modification, in the configuration in which any one of the sheet protrusion portions 82A, 82B, 83A, and 83B is provided as in the second embodiment and the like, as described above in the modification of the first embodiment, the partition plate 36 includes a partition plate body 76 made of a metal, and a surface insulating layer 77 surface-treated with the metal forming the partition plate body 76. In another modification, in the configuration in which the insulating sheets 85A and 85B and the like are provided as in the fourth modification of the second embodiment and the like, the partition plate 36 includes the partition plate body 76 and the surface insulating layer 77 as described above in the modification of the first embodiment.

Third Embodiment

Next, a battery pack 30 according to a third embodiment will be described with reference to FIGS. 29 and 30. As illustrated in FIG. 29, even in the present embodiment, a battery module 31 is formed, similarly to the above-described embodiment and the like. In addition, a storage space 43 of a battery module 31 is formed by frame sidewalls 41A, 41B, 42A, and 42B of a frame 40. The battery module 31 has a module bottom surface 32, a module top surface 33, and module side surfaces 34A, 34B, 35A, and 35B as in the above-described embodiment and the like, and is disposed in the storage space 43 as in the above-described embodiment and the like. FIG. 29 schematically illustrates the battery pack 30 in a cross section perpendicular or substantially perpendicular to an array direction of batteries 1 (a direction indicated by an arrow X3 and an arrow X4).

In the present embodiment, unlike the above-described embodiment and the like, a sheet member 45 is not provided. In addition, the frame 40 is not provided with a frame protrusion portion 54. In the present embodiment, the frame includes a frame protrusion portion 86. The frame protrusion portion 86 protrudes to the outer peripheral side from one end (lower end) of each of the frame sidewalls 41A, 41B, 42A, and 42B. Therefore, the frame protrusion portion 86 protrudes from the frame sidewalls 41A, 41B, 42A, and 42B to the side opposite to the side where the storage space 43 is located. In each of the frame sidewalls 41A, 41B, 42A, and 42B, the frame protrusion portion 86 protrudes from an end on the side toward which the module bottom surface 32 faces in a height direction of the battery pack 30. In the present embodiment, a protrusion end T of the frame protrusion portion 86 forms an outer peripheral end (outer end) of the frame 40.

In the present embodiment, similarly to the first embodiment and the like, the bottom plate 48 is provided in the battery pack 30. As described above in the modification of the first embodiment and the like, an insulating layer (stacked portion) is stacked on the side where the battery module 31 is located with respect to the bottom plate 48 in the height direction of the battery pack 30. Therefore, the module bottom surface 32 of the battery module 31 faces toward the side where the insulating layer is located in the height direction. In the present embodiment, the module bottom surface 32 of the battery module 31 is adhered to the insulating layer 71 by an adhesive layer 87. As a result, the battery module 31 is installed on a surface (outer surface) of the insulating layer 71. Further, heat generated in the battery module 31 is transmitted to the bottom plate 48 through the adhesive layer 87 and the insulating layer 71.

In an example, the adhesive layer 87 is formed of a material similar to that of the adhesive layer 56 described above. Further, each of the insulating layer 71 and the adhesive layer 87 is formed to be much thinner than each of the frame sidewalls 41A, 41B, 42A, and 42B. In an example, the layer thickness of each of the insulating layer 71 and the adhesive layer 87 is 1 mm or less.

The insulating layer 71 abuts on the frame protrusion portion 86 of the frame 40. The insulating layer 71 is sandwiched between the bottom plate 48 and the frame protrusion portion 86. Therefore, the frame protrusion portion 86 is disposed on the surface (outer surface) of the insulating layer 71. In the present embodiment, an outer peripheral end (outer end) of the battery pack 30 is formed by the protrusion end T of the frame protrusion portion 86 and an outer edge of each of the bottom plate 48 and the insulating layer 71.

As illustrated in FIG. 30, the battery pack 30 of the present embodiment can also be used for a battery system 50 including a cooling plate 60 described above. That is, the battery pack 30 of the present embodiment is installed on an outer surface of the cooling plate 60. In the present embodiment, the bottom plate 48 abuts on the cooling plate 60. Therefore, the cooling plate 60 is provided on the side opposite to the side where the battery module 31 is located with respect to the insulating layer 71 in the height direction of the battery pack 30. That is, the cooling plate 60 is provided on the side toward which the module bottom surface 32 faces with respect to the battery module 31.

In the present embodiment, heat generated in the battery module 31 is transmitted to the cooling plate 60 via a transmission path passing through the adhesive layer 87, the insulating layer 71, and the bottom plate 48. The layer thickness of each of the insulating layer 71 and the adhesive layer 87 is small as described above. Therefore, the heat from the battery module 31 is appropriately transmitted to the cooling plate 60 through the bottom plate 48 and the like. Therefore, in the battery pack 30, the heat is appropriately released from the battery module 31 to the cooling plate 60.

In the battery pack 30 of the present embodiment, the frame sidewalls 41A, 41B, 42A, and 42B surrounding the battery module 31 are formed of a material having a high electrical insulating property. The insulating layer 71 disposed between the module bottom surface 32 and the bottom plate 48 is also formed of a material having a high electrical insulating property. Therefore, in the battery system 50, an insulating structure having high withstand voltage (dielectric strength) is appropriately formed by the battery pack 30.

In the present embodiment, an insulation distance between the plurality of batteries 1 of the battery module and the bottom plate 48 is increased by the frame protrusion portion 86. Actually, the insulation distance is increased by a dimension from each of the frame sidewalls 41A, 41B, 42A, and 42B to the protrusion end T of the frame protrusion portion 86. By increasing the insulation distance between the plurality of batteries 1 of the battery module 31 and the bottom plate 48, an insulating structure having higher withstand voltage (dielectric strength) is formed.

Modification of Third Embodiment

Further, in a first modification of the third embodiment illustrated in FIG. 31, as described above in the modification of the first embodiment, the modification of the second embodiment, and the like, the bottom plate 48 is not provided in the battery pack 30. The battery pack 30 of the present modification can also be used for the battery system 50 including the cooling plate 60 described above. Further, in the battery system 50 of the present modification, the above-described insulating layer 75 (stacked portion) is formed. The insulating layer 75 to be the stacked portion is stacked with respect to the cooling plate 60 on the side where the battery module 31 is located in the height direction of the battery pack 30.

In the present modification, the module bottom surface of the battery module 31 is adhered to the insulating layer 75 by the adhesive layer 87. As a result, the battery module 31 is installed on the surface (outer surface) of the insulating layer 75. Further, the heat generated in the battery module 31 is transmitted to the bottom plate 48 through the adhesive layer 87 and the insulating layer 75.

The insulating layer 75 abuts on the frame protrusion portion 86 of the frame 40. The insulating layer 75 is sandwiched between the bottom plate 48 and the frame protrusion portion 86. Therefore, the frame protrusion portion 86 is disposed on the surface (outer surface) of the insulating layer 75. In the present embodiment, the outer peripheral end (outer end) of the battery pack 30 is formed by the protrusion end T of the frame protrusion portion 86.

Further, in a modification, in the configuration in which the frame protrusion portion 86 is provided as in the third embodiment and the like, as described above in the modification of the first embodiment, the partition plate 36 includes the partition plate body 76 made of the metal, and the surface insulating layer 77 surface-treated with the metal forming the partition plate body 76.

According to at least one of these embodiments or examples, the frame and the sheet member have an electrical insulating property. The frame protrusion portion of the frame protrudes from the frame sidewall to the inner peripheral side of the storage space, and supports the battery module from the side toward which the module bottom surface faces in the height direction. The frame forms a through-hole having the protrusion end of the frame protrusion portion as at least a part of the edge. The sheet member is in close contact with the module bottom surface of the battery module and forms at least a part of the transmission path of the heat from the battery module to the outside. The transmission path of the heat passes through the solid portion disposed in the through-hole of the frame. As a result, it is possible to provide a battery pack that forms an insulating structure having high withstand voltage in the battery system.

Further, according to at least one of these embodiments or examples, the frame, the sheet member, and the close contact portion have an electrical insulating property. The sheet member is in close contact with the module bottom surface of the battery module. The close contact portion is formed a separated body from the frame, and is in close contact with the corner portion between the module side surface and the module bottom surface, and the module side surface in the battery module. As a result, it is possible to provide a battery pack that forms an insulating structure having high withstand voltage in the battery system.

Further, according to at least one of these embodiments or examples, the frame has an electrical insulating property. In addition, the battery module is installed on the surface of the insulating layer having an electrical insulating property. The frame protrusion portion of the frame protrudes from the frame sidewall to the side opposite to the side where the storage space is located, and is disposed on the surface of the insulating layer described above. As a result, it is possible to provide a battery pack that forms an insulating structure having high withstand voltage in the battery system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery pack comprising:
   a battery module that includes a plurality of arrayed batteries, the battery module including a module bottom surface facing toward one side in a height direction intersecting an array direction of the plurality of batteries, each of the plurality of batteries including an electrode group and a metal exterior container in which the electrode group is stored;
   a frame that has an electrical insulating property, the frame including a frame sidewall extending along the height direction and forming a storage space of the battery module, and a frame protrusion portion protruding from the frame sidewall to an inner peripheral side of the storage space and supporting the battery module from the side toward which the module bottom surface faces in the height direction, the frame forming a through-hole having a protrusion end of the frame protrusion portion as at least a part of an edge;
   a sheet member that includes a first layer having higher thermal conductivity than the frame and that has an electrical insulating property, the first layer being in close contact with the module bottom surface of the battery module and forming at least a part of a transmission path of heat from the battery module to an outside, the transmission path of the heat passing through a solid portion disposed in the through-hole of the frame; and
   a bottom plate that is formed of a metal and that supports the battery module, the frame, and the sheet member from the side toward which the module bottom surface faces in the height direction, the heat being transmitted from the battery module to the bottom plate through the transmission path, wherein the frame protrusion portion of the frame is disposed between the battery module and the bottom plate in the height direction, the bottom plate includes a bottom plate projection protruding with respect to another portion of the bottom plate to a side where the battery module is located in the height direction, and the bottom plate projection of the bottom plate forms the solid portion disposed in the through-hole of the frame in the transmission path of the heat.

2. The battery pack according to claim 1, further comprising:

an insulating layer that is stacked with respect to the bottom plate on a side where the battery module is located in the height direction and that has an electrical insulating property.

3. The battery pack according to claim 1, further comprising:

an adhesive layer that adheres the module bottom surface to the frame protrusion portion.

4. The battery pack according to claim 1, wherein the battery module includes a partition plate disposed between the batteries adjacent to each other in the array direction, at least an outer surface of the partition plate having an electrical insulating property.

5. The battery pack according to claim 4, wherein the partition plate includes:

a partition plate body formed of a metal; and a surface insulating layer surface-modified in a state where the metal forming the partition plate body has an electrical insulating property.

6. A battery system comprising:

the battery pack according to claim 1; and a cooling plate that has an outer surface on which the battery pack is installed, and that is provided on a side opposite to a side where the battery module is located with respect to the frame protrusion portion and the sheet member in the height direction, the heat being transmitted from the battery module to the cooling plate through the transmission path.

7. A battery pack comprising:

a battery module that includes a plurality of arrayed batteries, the battery module including a module bottom surface facing toward one side in a height direction intersecting an array direction of the plurality of batteries, each of the plurality of batteries including an electrode group and a metal exterior container in which the electrode group is stored;

a frame that has an electrical insulating property, the frame including a frame sidewall extending along the height direction and forming a storage space of the battery module, and a frame protrusion portion protruding from the frame sidewall to an inner peripheral side of the storage space and supporting the battery module from the side toward which the module bottom surface faces in the height direction, the frame forming a through-hole having a protrusion end of the frame protrusion portion as at least a part of an edge;

a sheet member that includes a first layer having higher thermal conductivity than the frame and that has an electrical insulating property, the first layer being in close contact with the module bottom surface of the battery module and forming at least a part of a transmission path of heat from the battery module to an outside, the transmission path of the heat passing through a solid portion disposed in the through-hole of the frame; and a relay sheet that has an electrical insulating property and that is in close contact with the sheet member from a side opposite to a side where the battery module is located in the height direction, wherein the relay sheet includes a high conductive layer having higher thermal conductivity than the frame, and the high conductive layer forms the solid portion disposed in the through-hole of the frame in the transmission path of the heat.

8. The battery pack according to claim 7, further comprising:

an adhesive layer that adheres the module bottom surface to the frame protrusion portion.

9. The battery pack according to claim 7, wherein the battery module includes a partition plate disposed between the batteries adjacent to each other in the array direction, at least an outer surface of the partition plate having an electrical insulating property.

10. The battery pack according to claim 9, wherein the partition plate includes:

a partition plate body formed of a metal; and a surface insulating layer surface-modified in a state where the metal forming the partition plate body has an electrical insulating property.

11. A battery system comprising:

the battery pack according to claim 7; and a cooling plate that has an outer surface on which the battery pack is installed, and that is provided on a side opposite to a side where the battery module is located with respect to the frame protrusion portion and the sheet member in the height direction, the heat being transmitted from the battery module to the cooling plate through the transmission path.

12. A battery pack comprising:

a battery module that includes a plurality of arrayed batteries, the battery module including a module bottom surface facing toward one side in a height direction intersecting an array direction of the plurality of batteries, each of the plurality of batteries including an electrode group and a metal exterior container in which the electrode group is stored;

a frame that has an electrical insulating property, the frame including a frame sidewall extending along the height direction and forming a storage space of the battery module, and a frame protrusion portion protruding from the frame sidewall to an inner peripheral side of the storage space and supporting the battery module from the side toward which the module bottom surface faces in the height direction, the frame forming a through-hole having a protrusion end of the frame protrusion portion as at least a part of an edge; and a sheet member that includes a first layer having higher thermal conductivity than the frame and that has an electrical insulating property, the first layer being in close contact with the module bottom surface of the battery module and forming at least a part of a transmission path of heat from the battery module to an outside, the transmission path of the heat passing through a solid portion disposed in the through-hole of the frame, wherein the sheet member includes:

a second layer stacked with respect to the first layer on a side opposite to a side where the battery module is located in the height direction, the second layer having lower compressibility than the first layer; and a third layer stacked with respect to the second layer on a side opposite to a side on which the first layer is stacked, the third layer having higher thermal conductivity than the frame, the third layer having higher compressibility than the second layer.

13. The battery pack according to claim 12, wherein the sheet member forms the solid portion disposed in the through-hole of the frame in the transmission path of the heat.

14. The battery pack according to claim 13, wherein the sheet member includes a sheet projection protruding with respect to another portion of the sheet member to a side opposite to a side where the battery module is located in the height direction, and the sheet projection forms the solid portion disposed in the through-hole of the frame in the transmission path of the heat.

15. The battery pack according to claim 12, further comprising:

an adhesive layer that adheres the module bottom surface to the frame protrusion portion.

16. The battery pack according to claim 12, wherein the battery module includes a partition plate disposed between the batteries adjacent to each other in the array direction, at least an outer surface of the partition plate having an electrical insulating property.

17. The battery pack according to claim 16, wherein the partition plate includes:

a partition plate body formed of a metal; and a surface insulating layer surface-modified in a state where the metal forming the partition plate body has an electrical insulating property.

18. A battery system comprising:

the battery pack according to claim 12; and a cooling plate that has an outer surface on which the battery pack is installed, and that is provided on a side opposite to a side where the battery module is located with respect to the frame protrusion portion and the sheet member in the height direction, the heat being transmitted from the battery module to the cooling plate through the transmission path.

* * * * *